(12) United States Patent
Schmidt et al.

(10) Patent No.: US 7,187,307 B1
(45) Date of Patent: Mar. 6, 2007

(54) METHOD AND SYSTEM FOR ENCAPSULATION OF MULTIPLE LEVELS OF COMMUNICATION PROTOCOL FUNCTIONALITY WITHIN LINE CODES

(75) Inventors: Brian K. Schmidt, Mountain View, CA (US); James G. Hanko, Redwood City, CA (US); J. Duane Northcutt, Menlo Park, CA (US); Alan T. Ruberg, Menlo Park, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 528 days.

(21) Appl. No.: 10/459,989

(22) Filed: Jun. 12, 2003

(51) Int. Cl.
*H03M 7/00* (2006.01)
(52) U.S. Cl. .......................... 341/50; 341/51
(58) Field of Classification Search .................. 341/50, 341/67, 65, 101, 59, 106, 51; 370/389, 392
See application file for complete search history.

(56) References Cited

U.S. PATENT DOCUMENTS

| | | | |
|---|---|---|---|
| 4,486,739 A | 12/1984 | Franaszek et al. | 340/347 |
| 5,144,304 A | 9/1992 | McMahon et al. | 341/58 |
| 5,740,186 A | 4/1998 | Widmer | 371/37.1 |
| 6,198,413 B1 | 3/2001 | Widmer | 341/59 |
| 6,324,602 B1* | 11/2001 | Chen et al. | 710/68 |
| 6,765,916 B1* | 7/2004 | Duvvuru et al. | 370/395.5 |

OTHER PUBLICATIONS

Widmer, Albert X., "*Partitioned DC-Balanced (0,6) 16B/18B Transmission Code*", downloaded from the Internet on Dec. 16, 2002 from http://www.grouper.ieee.org/groups/802/3/10G_study/public/july99/widmer_2_0799.pdf, cover sheet and pp. 1-8.
Zhou, Tao, "*ISO/OSI, IEE 82.02, and TCP/IP, InstantDoc #22*", dated May 1997, downloaded from the Internet on May 21, 2003 from http://www.winnetmag.com/Articles/Print.cfm?ArticleID=22, two pages.

* cited by examiner

*Primary Examiner*—Brian Young
(74) *Attorney, Agent, or Firm*—Girard & Equitz LLP

(57) ABSTRACT

A communication system including two endpoints (transceivers or a transmitter and receiver) and a serial link between them. At least one endpoint is configured to generate encoded data in accordance with a line code and to transmit the encoded data over the link. The line code specifies a block code for encoding cells of application data and control bits, and typically also special characters that do not match bit sequences of encoded cells. Other aspects of the invention are methods for generating (and endpoint devices configured to generate and transmit, or receive and process) such encoded data, and methods for performing functions of multiple layers of a communication protocol in response to such encoded data. In accordance with the invention, multiple levels of communication protocol functionality can be efficiently incorporated within a line code.

109 Claims, 2 Drawing Sheets

METHOD AND SYSTEM FOR ENCAPSULATION OF MULTIPLE LEVELS OF COMMUNICATION PROTOCOL FUNCTIONALITY WITHIN LINE CODES

TECHNICAL FIELD OF THE INVENTION

The invention pertains to methods and systems for transmitting encoded data over a serial link and recovering cells of decoded data from the transmitted data, where each cell includes control bits (having multiple levels of communication protocol functionality) and application data, and to transmitters and receivers for use in such systems. Various embodiments of the invention are useful to implement simplex communication over individual channels (unidirectional links), duplex communication over pairs of coordinated simplex channels (bidirectional links), and routed communication over hierarchical sets of interconnected bidirectional links (networks).

BACKGROUND OF THE INVENTION

Communication protocols are often described in terms of a stack with well-defined interfaces between the layers. For example, the OSI reference model (and the TCP/IP architecture) defines seven protocol layers: application, presentation, session, transport, network, link, and physical. A system having the OSI seven-layer architecture (or the TCP/IP architecture) typically includes application layer circuitry, presentation layer circuitry, session layer circuitry, transport layer circuitry, network layer circuitry, link layer circuitry, and physical layer circuitry.

Line coding techniques are often employed in serial, digital transmission (at the physical layer) to transform the frequency spectrum of the transmitted data stream to adapt to channel characteristics and facilitate clock/data recovery by receiver systems. This is typically accomplished using a block code which encodes a number of user data bits as a larger number of bits, according to some pre-determined table or function. The added bits of overhead typically ensure a high transition density to facilitate clock/data recovery, and accomplish DC balancing to maintain running disparity near zero, which enables the use of AC-coupling. Since the code space is larger than the data space, a modest error detection capability is also afforded.

Various serial links for transmitting data and clock signals over various media (including but not limited to fiber optics and conductors) are well known. One conventional serial link, used primarily for high-speed transmission of video data from a host processor (e.g., a personal computer) to a monitor, is known as a transition minimized differential signaling interface ("TMDS" link). The characteristics of a TMDS link include the following:

1. video data are encoded and then transmitted as encoded words (each 8-bit word of digital video data is converted to an encoded 10-bit word before transmission);
   a. the encoding determines a set of "in-band" words and a set of "out-of-band" words (the encoder can generate only "in-band" words in response to video data, although it can generate "out-of-band" words in response to control or sync signals. Each in-band word is an encoded word resulting from encoding of one input video data word. All words transmitted over the link that are not in-band words are "out-of-band" words);
   b. the encoding of video data is performed such that the in-band words are transition minimized (a sequence of in-band words has a reduced or minimized number of transitions);
   c. the encoding of video data is performed such that the in-band words are DC balanced (the encoding prevents each transmitted voltage waveform that is employed to transmit a sequence of in-band words from deviating by more than a predetermined threshold value from a reference potential. Specifically, the tenth bit of each "in-band" word indicates whether eight of the other nine bits thereof have been inverted during the encoding process to correct for an imbalance between running counts of ones and zeroes in the stream of previously encoded data bits);
2. the encoded video data and a video clock signal are transmitted as differential signals (the video clock and encoded video data are transmitted as differential signals over conductor pairs);
3. three conductor pairs are employed to transmit the encoded video, and a fourth conductor pair is employed to transmit the video clock signal; and
4. signal transmission occurs in one direction, from a transmitter (typically associated with a desktop or portable computer, or other host) to a receiver (typically an element of a monitor or other display device).

A use of the TMDS serial link is the "Digital Visual Interface" interface ("DVI" link) adopted by the Digital Display Working Group. A DVI link can be implemented to include two TMDS links (which share a common conductor pair for transmitting a video clock signal) or one TMDS link, as well as additional control lines between the transmitter and receiver.

A typical DVI link includes a transmitter, a receiver, and a cable between the transmitter and receiver. The transmitter includes three encoder/serializer circuits, and the receiver includes three decoder circuits. The cable includes a conductor pair (Channel 0) for transmitting a stream of serialized data from a first encoder/serializer to a first decoder, a conductor pair (Channel 1) for transmitting another stream of serialized data from a second encoder/serializer to a second decoder, a conductor pair (Channel 2) for transmitting another stream of serialized data from a third encoder/serializer to a third decoder, and a conductor pair (Channel C) for transmitting a video clock from the transmitter to the receiver. The cable also include wires for a Display Data Channel ("DDC") channel (which can be used for bidirectional I2C communication between the transmitter and receiver), a Hot Plug Detect (HPD) line (on which a monitor associated with the receiver transmits a signal that enables a processor associated with the transmitter to identify the monitor's presence), "Analog" lines for analog video transmission from the transmitter to the receiver, and "Power" lines for provision of power from the transmitter to the receiver.

In the transmitter, one encoder/serializer encodes data to be transmitted over Channel 0 (and serializes the encoded bits), another encoder/serializer encodes data to be transmitted over Channel 1 (and serializes the encoded bits), and a third encoder/serializer encodes data to be transmitted over Channel 2 (and serializes the encoded bits). Each encoder/serializer responds to a control signal (an active high binary control signal referred to as a "data enable" or "DE" signal) by selectively encoding either digital video words (in response to DE having a high value) or a control or synchronization signal pair (in response to DE having a low value). Each encoder/serializer receives a different pair of control or synchronization signals: one receives horizontal and vertical synchronization signals (HSYNC and VSYNC); another receives control bits CTL0 and CTL1; and a third receives control bits CTL2 and CTL3. Thus, each encoder/serializer generates in-band words indicative of video data (in response to DE having a high value), the first encoder/serializer generates out-of-band words indicative of the values of HSYNC and VSYNC (in response to DE having a low value), the second encoder/serializer generates out-of-band words indicative of the values of CTL0 and CTL1 (in response to DE having a low value), and the third encoder/serializer generates out-of-band words indicative of the values of CTL2 and CTL3 (in response to DE having a low value). In response to DE having a low value, each of the second and third encoder/serializers generates one of four specific out-of-band words indicative of the values 00, 01, 10, or 11, respectively, of control bits CTL0 and CTL1 (or CTL2 and CTL3).

Another serial link is the "High Definition Multimedia Interface" interface ("HDMI" link) developed by Silicon Image, Inc., Matsushita Electric, Royal Philips Electronics, Sony Corporation, Thomson Multimedia, Toshiba Corporation, and Hitachi. It has been proposed to transmit encrypted video and audio data over an HDMI link.

Another serial link (sometimes referred to as a "SATA" link) complies with the standard known as Serial ATA, Revision 1.0, adopted on Aug. 29, 2001, by the Serial ATA Working Group, for communication between a host and storage device. A host can be coupled to each of one or more storage devices, with a SATA link between the host and each storage device.

Other serial links differ from TMDS links by encoding data as N-bit code words that are not 10-bit TMDS code words, or by transmitting encoded video over more than three or less than three conductor pairs.

The term "transmitter" is used herein in a broad sense to denote any device capable of encoding data and transmitting the encoded data over a serial link (and optionally also performing additional functions, which can include encrypting the data to be transmitted and other operations related to encoding, transmission, or encryption of the data). The term "receiver" is used herein in a broad sense to denote any device capable of receiving and decoding data that has been transmitted over a serial link (and optionally also performing additional functions, which can include decrypting the received data and other operations related to decoding, reception, or decryption of the received data). For example, the term transmitter can denote a transceiver that performs the functions of a receiver as well as the functions of a transmitter. For another example, in a system including two transceivers which communicate via a serial link, each transceiver can be both a receiver and a transmitter.

Some serial links encode input video data (and other data) to be transmitted into encoded words comprising more bits than the incoming data using a coding algorithm other than the specific algorithm used in a TMDS link, and transmit the encoded video data as in-band characters and the other encoded data as out-of-band characters. The characters need not be classified as in-band or out-of-band characters based according to whether they satisfy transition minimization and DC balance criteria. Rather, other classification criteria could be used. An example of an encoding algorithm, other than that used in a TMDS link but which is used in some serial links, is IBM 8b10b coding. The classification (between in-band and out-of-band characters) need not be based on just a high or low number of transitions. For example, the number of transitions of each of the in-band and out-of-band characters could (in some embodiments) be in a single range (e.g., a middle range defined by a minimum and a maximum number of transitions).

The data transmitted between the transmitter and receiver of a serial link can, but need not, be transmitted differentially (over a pair of conductors). Also, although a TMDS link has four differential pairs (in the single pixel version), three for video data and the other for a video clock, other serial links include a different number of conductors or conductor pairs.

Typically, the primary data transmitted by a TMDS link are video data. What is often significant about this is that the video data are not continuous, and instead have blanking intervals. These blanking intervals provide an opportunity for auxiliary data to be transported, and they represent unused bandwidth. However, many serial links do not transmit data having blanking intervals. For example, audio serial links would typically transmit continuous data.

The term "stream" of data, as used herein, denotes that all the data are of the same type and are transmitted with the same clock frequency. The term "channel," as used herein, refers to that portion of a serial link that is employed to transmit data serially (e.g., a particular conductor or conductor pair between a transmitter and receiver over which the data are transmitted, and specific circuitry within the transmitter and/or receiver used for transmitting and/or recovery of the data), where "data" is used in a broad sense to denote any content (e.g., application data, a clock, control information, or other content), and to the technique employed to transmit the data over the link.

SUMMARY OF THE INVENTION

In a class of embodiments of the invention, application data and control bits are encoded in accordance with a line code to generate sequences of code words that, when decoded, are indicative (at a "link" level of communication protocol functionality) of cells of the application data and control bits. The line code provides packet-based (cell-based) communication with multiple logical communication paths (virtual channels). The virtual channels include a virtual channel (a "control" channel) for the control bits (or a control channel for each of two or more subsets of the control bits in each cell) and at least one virtual channel (a "data" channel) for the application data (e.g., a data channel for each of two or more blocks of application data in each cell). Each block of application data in a cell can have a different priority level (indicated by one of the control bits) or can belong to a different virtual channel (specified by one of the control bits). At least some of the control bits have at least one level of communication protocol functionality higher than link level functionality (e.g., are used by network layer circuitry and/or application layer circuitry).

In accordance with preferred embodiments of the invention, M-bit input words comprising application data bits and control bits are encoded using a block code to generate N-bit code words, where M<N. The code words are transmitted in a predetermined sequence, and the transmitted code words can be recognized and decoded by physical layer circuitry in a receiver to generate M-bit decoded words. At a "link" level of communication protocol functionality (i.e., in "link layer" circuitry), a sequence of a predetermined number of the M-bit decoded words is indicative of a cell of the application data and control bits. Each cell has a predetermined structure, so that the position of a bit within the cell determines whether the bit is an application data bit or a control bit and determines the type (function) of each control bit. The control bits in each cell typically have multiple levels of communication protocol functionality. Link layer circuitry in the receiver recognizes the cells in response to the M-bit decoded words (including by determining which of the bits of each cell are data bits and which are control bits), performs link level functions in response to appropriate ones of the control bits, and asserts the decoded application data bits and appropriate ones of the decoded control bits to higher-level circuitry (circuitry that operates at at least one level of communication protocol functionality higher than the link level). The decoded control bits are used by the higher-level circuitry (which can be network layer circuitry and/or application layer circuitry, for example) to implement communication protocol functions at least one level higher than the link level.

In typical embodiments of the inventive system, the line code employed to transmit encoded data over a serial link specifies not only a block code (for encoding cells) but also special characters that are typically transmitted between cells. Preferably, the code words employed to encode cells and the special characters are chosen such that no special character can unintentionally occur in a sequence of code words indicative of a cell (i.e., no special character matches any of the code words, and no sequence of bits from any possible sequence of consecutively transmitted code words matches any of the special characters). In such preferred embodiments, a special character can be transmitted at any time (including at a time that interrupts transmission of a cell).

Typically, each cell includes a small number of blocks (e.g., one or two blocks) of application data, a priority-level-indicating control bit (sometimes referred to herein as an "out-of-band" or "OOB" bit) for each application data block, and other control bits (including cyclic redundancy check bits). The OOB bit for each application data block is indicative of a priority level for the block's application data, and/or specifies a virtual channel to which the block belongs. For example, the OOB can occur as the Nth bit of a cell, and can indicate whether a first block of application data bits are "in band" application data (e.g., video or audio data, or data read from a memory or to be written to a memory) or "out-of-band" application data (e.g., application control bits, which could be sync words, for example). A single OOB bit for one application data block can be indicative of a priority level for the block's application data, and also specify a virtual channel to which the block belongs and also otherwise identify the block's application data.

In a typical embodiment, each cell consists of a base portion (e.g., a base portion consisting of 144 bits, including 128 application data bits and 16 control bits) and an optional extension. The extension can be an L-bit address for the base portion. A receiver recovers the cell from K received ten-bit code words. In some embodiments, K=16 (if the cell has no extension), and each code word is a 10-bit encoded version of a nine-bit input word consisting of eight application data bits concatenated with a control bit. The receiver decodes each sequence of sixteen transmitted code words to recover a sequence of sixteen, 9-bit input words. The receiver identifies these decoded bits as a 144-bit cell (having no extension) if the "J"th bit in the decoded bit sequence indicates that there is no cell extension, determines which bits of each decoded bit sequence are application data bits and which are control bits, and determines the type (and thus the function) of each such control bit by its position in the sequence. In a class of embodiments, the receiver decodes a sequence of K transmitted 10-bit code words to recover a sequence of K nine-bit decoded input words, handles every $9^{th}$ bit of the resulting stream of 9-bit decoded words as a control bit, and handles the other 8-bit quantities of data of the stream of 9-bit words as application data.

In other embodiments, the input words to be encoded include other patterns of application data and control bits, e.g., to improve the efficiency with which the code words can be generated and transmitted by the transmitter and/or processed by the receiver. For example, CRC bits for a cell are determined only once the CRC-bit generating circuitry has seen all the data of the cell, and thus CRC bits are typically the last bits to be generated. Since the CRC bits are control bits, the embodiment described in the previous paragraph would require that transmission of each cell be delayed while the encoding circuitry waits for the CRC bits to be generated, so that all control bits for the cell (including the CRC bits) can be uniformly distributed across the 9-bit input words (one control bit per input word). In applications in which there is a sufficient degree of transmission latency, the control bits of each cell can be distributed among the input words in any convenient pattern for timing. For example, in one embodiment in which a cell consists of 16 control bits and 128 application data bits, the first 9-bit input word of the cell consists of two control bits concatenated with seven application data bits, the next six input words of the cell consist of application data bits, the next input word of the cell consists of two control bits concatenated with seven application data bits, the next six input words of the cell consist of application data bits, the next-to-last input word of the cell consists of six application data bits concatenated with three CRC bits, and the last input word of the cell consists of nine CRC bits. For two other examples, the pattern of control and application data bits of a 144-bit cell can be a repeating pattern of 4 control bits followed by 32 application data bits, or it can be 4 control bits followed by 128 application data bits followed by 12 CRC bits. Many other patterns are possible.

The application data of a cell can be video data, audio data, application control bits, memory data (read from or to be written to a memory), or application data of any other type. The control bits included in a cell (and any transmitted special characters) can be used at any protocol level (layer) of communication protocol functionality (e.g., any layer of the Open Systems Interconnection ("OSI") seven-layer reference model). For example, in a system having the OSI seven-layer architecture (or the TCP/IP architecture), the control bits (and any transmitted special characters) can be used by application layer circuitry, presentation layer circuitry, session layer circuitry, transport layer circuitry, network layer circuitry, link layer circuitry, and/or physical layer circuitry.

An example of a control bit (of the inventive cell) that is used by link layer and network layer circuitry (of a system having the OSI seven-layer architecture) is a bit (sometimes referred to herein as an "XTND" bit) that indicates whether the cell is an extended cell (a cell having an extension of predetermined length). For example, the XTND bit can be the first bit of a cell, and can indicate whether the cell is a 144-bit non-extended cell or a (K*9)-bit extended cell, where K is an integer greater than 16. For example, XTND=1 can indicate that a 9-bit extension follows the first 144 bits of each cell (so that the $145^{th}$ through 153rd bits after the XTND bit are an extension (e.g., an address for use by "network" layer circuitry) that is part of the same cell as the $2^{nd}$ through $144^{th}$ bits after the XTND bit, and XTND=0 can indicate that no extensions are enabled so that each set of consecutive 144 decoded bits belong to a different cell.

Another example of a control bit (of the inventive cell) that is used by network layer circuitry (of a system having the OSI seven-layer architecture) is an address bit (e.g., a bit of an address extension of an extended cell).

An example of a control bit (of the inventive cell) for use by application layer circuitry of a system having the OSI seven-layer architecture is a "Valid" bit that indicates whether or not a specific block of application data is valid. Use of a Valid bit allows cells to contain multiple blocks of application data, not all of which are utilized.

An end-to-end flow control bit (sometimes referred to herein as a "FLOW" bit) of the inventive cell is another example of a control bit used by application layer circuitry of a system that has the OSI seven-layer architecture and includes two transceivers (one referred to as a transmitter and the other as a receiver) connected by a serial link. The FLOW bit is set by the receiver, in a cell transmitted by the receiver to the transmitter, to indicate whether the transmitter should send code words indicative of cells to the receiver. For example, FLOW=1 indicates that the transmitter should enter an "ON" state in which the transmitter sends code words indicative of cells to the receiver, and FLOW=0 indicates that the transmitter should enter an "OFF" state in which the transmitter does not send such code words to the receiver. A FLOW bit can apply to one priority level of application data (e.g., a cell can include two FLOW bits, one for each of two blocks of application data, each block having a different priority, and the transmitter can respond to each FLOW bit by sending or ceasing to send application data of the relevant priority level) or to more than one priority level of application data. If a cell also includes a "Valid" bit (mentioned in the previous paragraph), it is permissible to send empty cells in the OFF state. If a cell includes a Valid bit for each of multiple blocks of application data, it is permissible to send (in each cell) at least one empty block and at least one full block in the OFF state. A FLOW bit can be used in any of several contexts, including to provide end-to-end flow control between applications on different devices that communicate over two or more serial link hops (e.g., devices that communicate via a repeater, over a first serial link between one of the devices and the receiver, and over a second serial link between the receiver and the other device), and to provide end-to-end flow control between directly connected transmitters and receivers that require rate matching due to clock differences or application-level service rates.

The above-mentioned OOB (out-of-band) bit is another example of a control bit (of the inventive cell) that is used by application layer circuitry of a system having the OSI seven-layer architecture. The OOB bit for an application data block can indicate a priority level for the block's application data, or can specify a virtual channel to which the block belongs. OOB bits can be used to create virtual channels, possibly having different priorities.

An example of control bits (of the inventive cell) providing transport layer functionality in a system having the OSI seven-layer architecture are sequence number bits (an ordered set of bits indicative of a sequence number of the current cell being transmitted or of particular cells received from a remote node). CRC (cyclic redundancy check) bits (or other error control bits) in the inventive cell are an example of control bits used by link layer circuitry of a system having the OSI seven-layer architecture to perform error detection and/or error correction on the decoded bits that determine each cell. In the transmitter, the CRC bits can be generated for the entire amount of data (application data and control bits) to be transmitted in a cell (before the application data and control bits undergo spectral encoding), the application data and control bits of the cell (including the CRC bits) then arranged in the proper sequence, and the properly sequenced application data and control bits of the cell then encoded. It is typical to generate twelve CRC bits for each 144-bit cell. Although a shorter length CRC could be used for a cell of this size, the effective error detection probability would be reduced if such a shorter length CRC were used. A longer length CRC could alternatively be used.

Control bits can be inserted into cells so as to enhance the cells' spectral properties. For example, the possible values for a multi-bit field of control bits can be restricted so that transitions (0 to 1 or 1 to 0) within the field are guaranteed. For example, a 2-bit sequence number can be restricted to take on only three values, where 00 and 11 indicate the same value. Thus, 01 and 10 include a transition, and either 00 or 11 is used depending on the preceding or following bit so that a transition is guaranteed.

In accordance with the invention, multiple levels of communication protocol functionality can be efficiently incorporated within a line code, thereby increasing the line code's utility. Physical layer and link layer circuitry transmit and receive data encoded in accordance with the line code. In preferred embodiments, the invention eases the design and reduces the complexity of protocols layered above the physical layer and link layer. In typical embodiments, features of the line code include all or some of the following: 1) guaranteed transition bandwidth, 2) DC balance, 3) simplex link flow control, 4) framing, 5) simplex link error detection, 6) simplex link error correction, 7) duplex link flow control, 8) network addressing, 9) sequenced, reliable connections, 10) end-to-end flow control, and 11) out-of-band signaling. These features can all be incorporated with minimal overhead, e.g., no worse than the 20% overhead of the commonly used 8B/10B coding scheme.

In a class of embodiments, the invention is a communication system including two endpoints (e.g., a transmitter and receiver or two transceivers) and a serial link (having at least one channel) between the endpoints, wherein at least one of the endpoints is configured to generate encoded data in accordance with a line code and transmit the code words over each of one or more channels of the link to the other endpoint, where the line code specifies a block code for encoding cells (including application data and control bits) and typically also specifies special characters that are distinguishable from bit sequences of encoded cells. Another aspect of the invention is an endpoint device (i.e., a transmitter, receiver, or transceiver) configured to generate encoded data in accordance with a line code (where the line code specifies a block code for encoding cells of application data and control bits, and typically also specifies special characters that are distinguishable from bits of encoded cells) and to transmit the encoded data over a serial link, and/or to receive and process (in accordance with the invention) encoded data that have been generated in accordance with such a line code and propagated over a serial link.

Other aspects of the invention are methods for generating encoded data in accordance with a line code (where the line code specifies a block code for encoding cells of application data and control bits, and typically also specifies special characters that are distinguishable from bits of encoded cells) and methods for performing functions of multiple layers of a communication protocol in response to such encoded data.

DETAILED DESCRIPTION OF THE PREFERRED EMBODIMENTS

The present invention provides mechanisms for collapsing functionality provided by at least one higher layer (e.g., the link layer) of a communication protocol into the physical layer, and/or for collapsing functionality provided by at least one layer above the link layer (e.g., the application, transport, and network layers) into the link layer. For example, special characters (e.g., N-bit code words known as "link training" and "state exchange" characters, where N=10 in preferred embodiments) are recognized by physical layer circuitry and used in accordance with the invention by the physical layer circuitry not only for "physical layer" framing to determine the boundaries of N-bit code words to be decoded to produce M-bit decoded words (where M<N) to be utilized by link layer circuitry, but also for "link layer" framing to allow link layer circuitry to determine the boundaries of blocks of application data (and blocks of control bits) within cells of the M-bit decoded words, where the blocks of application data (or control bits) are to be utilized by network layer or higher layer circuitry. For another example, special characters (e.g., N-bit code words known as "idle" characters, where N=10 in preferred embodiments) which can be recognized by physical layer circuitry are used in accordance with the invention by link layer circuitry for flow control.

The functionality collapsing mechanisms mentioned in the previous paragraph yield several benefits including the following: physical and/or link layer circuitry that embodies the invention is imbued with much greater functionality than conventional circuitry of the corresponding type; higher level protocols designed on top of layers that embody the invention can be made much simpler (e.g., transport layer protocols would not require support for handling the re-ordering of cells since link re-training after detection of an uncorrectable error in a transmitted cell can be accomplished in accordance with the invention without the need to re-order cells in a manner to be described herein); and higher level protocol implementations on top of layers that embody the invention can be much more efficient (e.g., error control coding and large packet buffers are not needed to support re-transmission in accordance with the invention in a manner to be described herein, after detection of an uncorrectable error in a transmitted cell).

Figure 1:
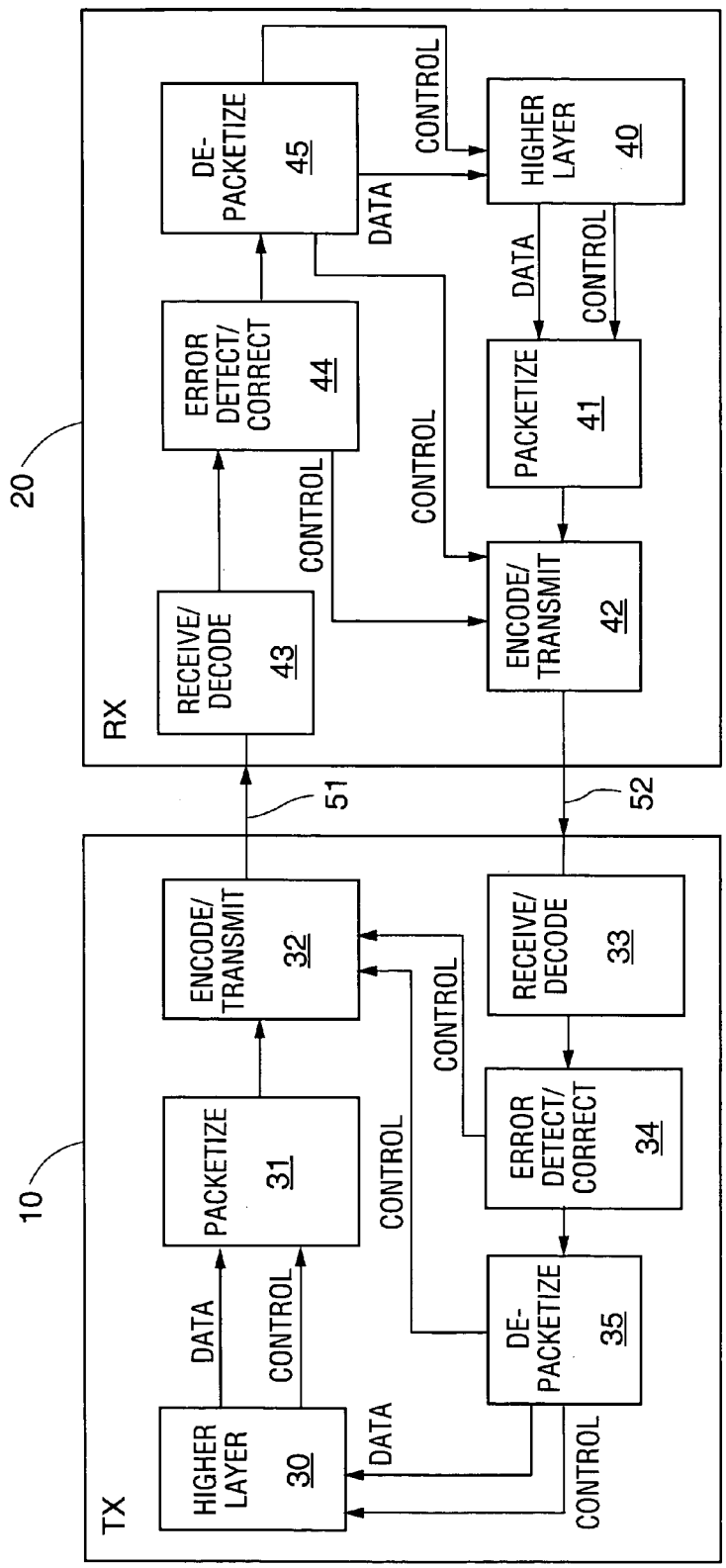
FIG. 1 is a block diagram of an embodiment of the inventive system.

FIG. 1 is a block diagram of a typical system that embodies the invention. The FIG. 1 system includes transceivers 10 and 20, and a serial link between them. The serial link includes primary channel 51 and back channel 52 (and optionally also other channels, not shown). Transceiver 10 will be referred to as a transmitter since it transmits application data to transceiver 20 over the serial link. Transceiver 20 will be referred to as a receiver since it does not transmit application data to transceiver 10 over the serial link, although it does transmit other data to transceiver 10. The FIG. 1 system implements a bidirectional communication path in which primary channel 51 carries application traffic, and back channel 52 (which typically is smaller than channel 51 in the sense that it carries a smaller volume of data than channel 51) carries link management traffic that is not exposed to the application. Primary channel 51 carries code words indicative of control data (e.g., OOB bits) and application data, and typically also special characters (e.g., idle characters used for simplex or duplex link flow control, and link training characters) that are not indicative of application data. Back channel 52 carries information related to error control, end-to-end flow control, and data sequencing. For example, back channel 52 carries code words indicative of control data related to error control, end-to-end flow control, and data sequencing, and typically also special characters (e.g., link training characters). Typically, the same physical layer requirements are applied across both channels 51 and 52. Preferably, a block code is used, and the length of the block code is chosen to ensure that total overhead is comparable to other common line codes while simultaneously minimizing design and implementation complexity.

Some but not all elements of transmitter 10 are shown in FIG. 1. The physical layer and link layer circuitry of transmitter 10 includes packetizing circuit 31, encoding and transmission circuit 32, receiving and decoding circuit 33, error detection and correction circuit 34, and de-packetizing circuit 35, connected as shown. Transmitter 10 also includes higher layer circuitry 30, which typically includes network layer circuitry, transport layer circuitry, and application layer circuitry. In operation, higher layer circuitry 30 provides application data and control data to packetizing circuit 31. For example, the control data provided to circuit 31 by circuitry 30 can determine the XTND, FLOW, OOB1, and OOB2 bits to be described with reference to FIG. 2. In response, packetizing circuit 31 generates (and asserts to circuit 32) sequences of input words (e.g., the 9-bit input words of FIG. 2, each of which comprises eight application data bits and one control bit) that are indicative of cells (e.g., a sequence of code words having the form shown in FIG. 2, with each cell including two 64-bit application data blocks and 16 control bits). In typical implementations, packetizing circuit 31 generates CRC bits for each cell and includes the CRC bits in the input word sequences asserted to circuit 32. Packetizing circuit 31 performs any necessary serialization of the application data and control data from circuitry 30, and asserts the input word sequences as serial data to circuit 32.

Circuit 32 encodes the input words from circuit 31 (e.g., to generate one of the 10-bit code words shown in FIG. 2 in response to each 9-bit input word), and transmits the code words serially over channel 51 to receiver 20. Circuit 32 can also transmit (over channel 51) one or more special characters. In some implementations, circuit 32 transmits each special character before or after a cell of code words (i.e., before or after a sequence of code words indicative of a cell), but does not transmit any special character during a cell. However, in preferred implementations, the set of code words employed to encode cells (for transmission over channel 51) and the special characters are chosen such that no special character can unintentionally occur in a sequence of code words indicative of a cell (i.e., no special character matches any of the code words, and no sequence of bits from any possible sequence of consecutively transmitted code words matches any of the special characters). In such preferred implementations, circuit 32 can transmit any special character at any time (including by interrupting transmission of a cell to transmit the special character), and the circuitry (e.g., circuit 43 of receiver 20) employed for receiving and decoding code words transmitted by circuit 32 can be configured (e.g., can include logic configured) to recognize each transmitted special character, regardless of whether transmission of the special character has or has not interrupted transmission of a cell.

An example of special character transmission by an implementation of circuit 32 is the transmission of special "idle" characters at appropriate times between cells (e.g., for duplex link flow control, in a manner to be described below). For another example, in response to control signals from error detection and correction circuit 34, an implementation of circuit 32 asserts special "link training" characters and special "state exchange" characters with embedded sequence numbers during a link re-training operation (to be described below) initiated by a control signal from circuit 34.

Figure 2:
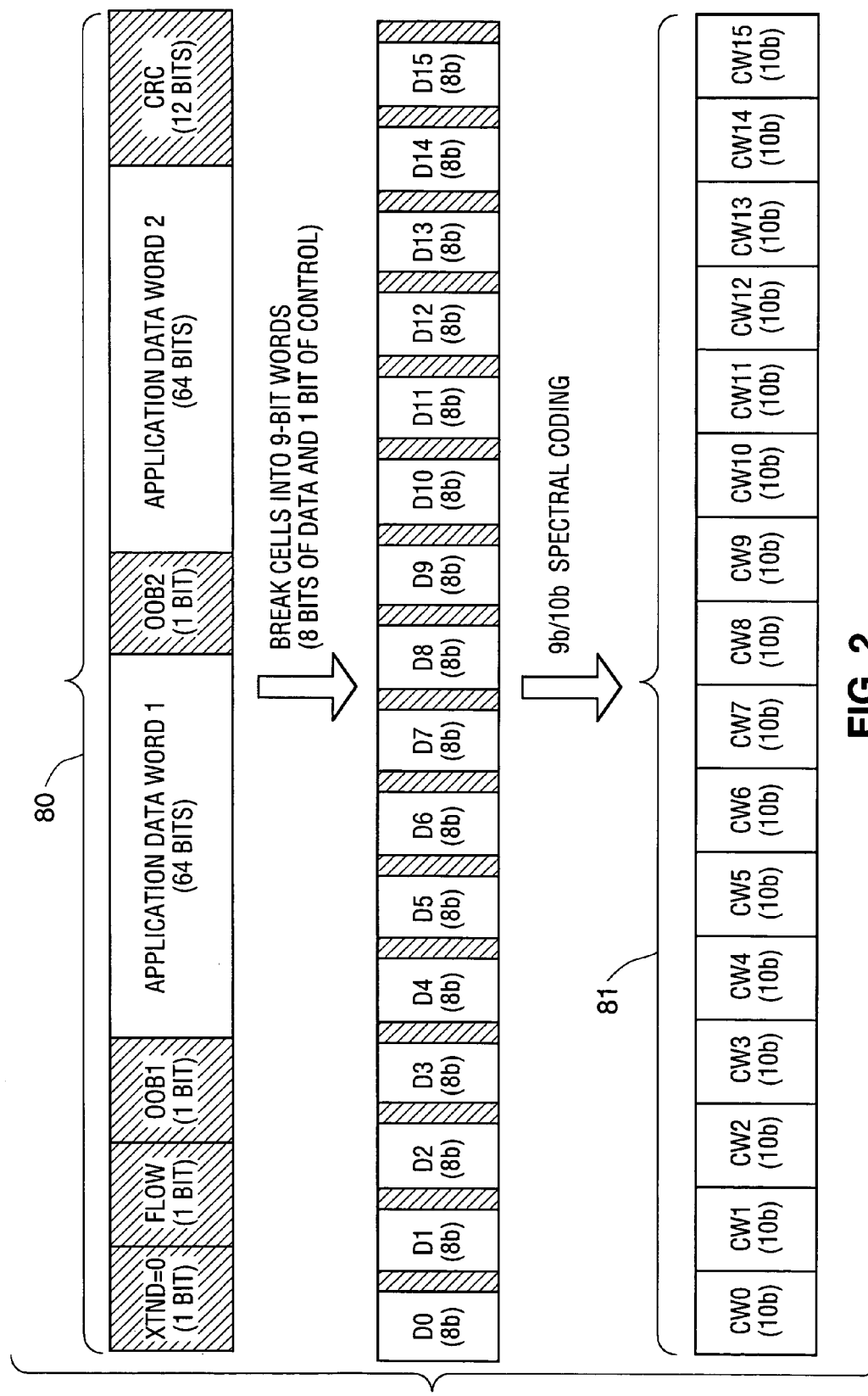
FIG. 2 is a diagram of a cell of data (cell 80), an ordered set of 9-bit words (indicative of the cell) generated in accordance with the invention, and an ordered set (81) of 10-bit code words (indicative of the cell) generated in accordance with the invention.

Receiving and decoding circuit 33 decodes code words received sequentially on back channel 52 to generate a stream of decoded words (e.g., 9-bit words as shown in FIG. 2, each comprising eight application data bits and one control bit). In various implementations of the FIG. 1 system (and variations thereon) which implement different line codes, the decoded words generated by the receiver are M-bit words (where M can be any positive integer, although M is odd in preferred embodiments), and the decoded words of a cell can include any predetermined pattern of application data and control bits (e.g., each cell can include a repeating pattern of four control bits followed by thirty-two application data bits, or can consist of four control bits followed by 128 application data bits followed by twelve CRC bits, or any of many other patterns of application data and control bits).

For another example, each cell can consist of eight, 27-bit subcells, each subcell having the following format: 24 bits of application data, followed by one OOB bit (indicative of a priority level for the application data and/or specifying a virtual channel to which the application data belongs), followed by two CRC bits. Each cell includes 16 CRC bits. For another example, each cell can consist of eight, 36-bit subcells, each subcell having the following format: 32 bits of application data, followed by one OOB bit (indicative of a priority level for the application data and/or specifying a virtual channel to which the application data belongs), followed by another control bit (of any predetermined type), followed by two CRC bits. Each cell also includes 16 CRC bits. When encoded using a 9B/10B block code, these cells have the same overhead as application data encoded using a conventional 8B/10B block code. These cells can be used in a wormhole routing system, in which they are referred to as flits (flow control units), and could be used in a storage network application. In a typical wormhole routing system, credit-based flow control is used, and each flit must be delivered in order over the next serial link hop of a predetermined route. The OOB bit (sometimes referred to as a type field) can distinguish between multiple virtual channels and between header data and other data (in wormhole routing, a packet consists of a train of flits, the first of which contains routing information, that lock down a route through a communication fabric).

For another example, each cell can consist of N, 36-bit subcells (where N is a small positive integer), each subcell having the following format: 32 bits of application data, followed by two OOB bits (indicative of a priority level for the application data and/or specifying a virtual channel to which the application data belongs), followed by two credit bits. These cells include no CRC (or error control) bit, and could be used in a wormhole routing system. When encoded using a 9B/10B block code, these cells also have the same overhead as application data encoded using a conventional 8B/10B block code. The OOB bits could indicate a virtual channel for the application data or could indicate that the application data are control channel data (e.g., for wormhole circuit set-up or exchange of information between communicating nodes in a network). The credit bits would be used to exchange flow control credits between communicating endpoints. Typically, there would be two virtual channels in this scheme.

Another application domain that would utilize larger cells would be to support a network of packet switching. An exemplary cell useful in such application domain cell consists of N, 54-bit subcells (where N is a small positive integer), each subcell having the following format: 48 bits of application data, followed by two CRC bits, followed by one src address bit, followed by one dst address bit, followed by one sequence number bit, followed by one OOB bit (indicative of a priority level for the application data and/or specifying a virtual channel to which the application data belongs). When encoded using a 9B/10B block code, these cells also have the same overhead as application data encoded using a conventional 8B/10B block code. An advantage of use of such cells in the noted application domain is to enable packet switching for relatively small networks, all embedded within the line code.

With reference again to FIG. 1, a typical implementation of error detection and correction circuit 34 identifies CRC bits in the stream of decoded words, uses the CRC bits to perform error detection and correction on a cell of the decoded words (e.g., on a sequence of sixteen 9-bit words having the FIG. 2 format), and asserts the corrected decoded words to de-packetizing circuit 35 (except in the event that circuit 34 identifies an uncorrectable error in a cell).

De-packetizing circuit 35 then determines which of the bits of the corrected, decoded words are application data bits and which are control data bits, and asserts the application data, and appropriate ones of the control bits (separately from the application data) to higher layer circuitry 30 for processing. Circuit 35 performs any necessary deserialization of the data it receives from circuit 34 (e.g., to assert application data and control bits in parallel to circuitry 30).

Some but not all elements of receiver 20 are shown in FIG. 1. The physical layer and link layer circuitry of receiver 20 includes packetizing circuit 41, encoding and transmission circuit 42, receiving and decoding circuit 43, error detection and correction circuit 44, and de-packetizing circuit 45, connected as shown. Receiver 20 also includes higher layer circuitry 40, which typically includes network layer circuitry, transport layer circuitry, and application layer circuitry. In operation, higher layer circuitry 40 can provide application data and control data to packetizing circuit 41. For example, circuitry 40 can provide (to circuit 41) control data (generated by application layer circuitry) that determine the FLOW bits to be described with reference to FIG. 2. In response, packetizing circuit 41 generates (and asserts to circuit 42) sequences of input words (e.g., the 9-bit input words of FIG. 2, each of which comprises eight application data bits and one control bit) that are indicative of cells (e.g., a sequence of code words having the form shown in FIG. 2, with each cell including two 64-bit application data blocks, and 16 control bits). In typical implementations, packetizing circuit 41 generates CRC bits for each cell and includes the CRC bits in the input word sequences asserted to circuit 42. Packetizing circuit 41 performs any necessary serialization of the application data and control data from circuitry 40, and asserts the input word sequences as serial data to circuit 42.

Circuit 42 encodes the input words from circuit 41 (e.g., to generate one of the 10-bit code words shown in FIG. 2 in response to each 9-bit input word), and transmits the code words serially over channel 52 to transmitter 10. Circuit 42 can also transmit one or more special characters over channel 52. In some implementations, circuit 42 transmits each special character before or after a cell of code words (i.e., before or after a sequence of code words indicative of a cell), but does not transmit any special character during a cell. However, in preferred implementations, the set of code words employed to encode cells (for transmission over channel 52) and the special characters are chosen such that no special character can unintentionally occur in a sequence of code words indicative of a cell (i.e., no special character matches any of the code words, and no sequence of bits from any possible sequence of consecutively transmitted code words matches any of the special characters). In such preferred implementations, circuit 42 can transmit any special character at any time (including by interrupting transmission of a cell to transmit the special character), and the circuitry (e.g., circuit 33 of transmitter 10) employed for receiving and decoding code words transmitted by circuit 42 can be configured (e.g., can include logic configured) to recognize each transmitted special character, regardless of whether transmission of the special character has or has not interrupted transmission of a cell.

An example of special character transmission by an implementation of circuit 42 is the transmission of special "idle" characters at appropriate times between cells (in a manner to be described below). For another example, in response to control signals from error detection and correction circuit 44, an implementation of circuit 42 asserts special "link training" characters and special "state exchange" characters with embedded sequence numbers during a link re-training operation (to be described below) initiated by a control signal from circuit 44.

Receiving and decoding circuit 43 (of receiver 40) decodes code words received sequentially on channel 51 to generate a stream of decoded words (e.g., 9-bit words as shown in FIG. 2, each comprising eight application data bits and one control bit). In a typical implementation, error detection and correction circuit 44 identifies CRC bits in the stream of decoded words, uses the CRC bits to perform error detection and correction on a cell of the decoded words (e.g., on a sequence of sixteen 9-bit words having the FIG. 2 format), and asserts the corrected decoded words to de-packetizing circuit 45 (except in the event that circuit 44 identifies an uncorrectable error in a cell). De-packetizing circuit 45 then determines which of the bits of the corrected, decoded words are application data bits and which are control data bits, and asserts the application data, and appropriate ones of the control bits (separately from the application data) to higher layer circuitry 40 for processing. Circuit 45 performs any necessary deserialization of the data it receives from circuit 44 (e.g., to assert application data and control bits in parallel to circuitry 40).

In a class of preferred embodiments, code words indicative of cells (of application data and control data) having the format shown in FIG. 2 are transmitted over a serial link. The following steps are performed to accomplish this.

First, logical blocks of application data are defined (e.g. 64-bit blocks as shown in FIG. 2, or 32-bit blocks). This can be accomplished, for example, by application layer circuitry within circuitry 30 (or circuitry 40) of FIG. 1. For each application data block, an out-of-band ("OOB") bit is provided to indicate the priority level of the block, or to specify a virtual channel to which the block belongs. For example, the "OOB1" bit in FIG. 2 can indicate whether the block labeled "Application Data Word 1" consists of low priority data (e.g., application data) or high priority data (e.g., control data), and the "OOB2" bit can similarly indicate whether the block labeled "Application Data Word 2" consists of low priority data (e.g., application data) or high priority data (e.g., control data).

The application data blocks (sometimes referred to as words) are grouped into cells (e.g., by packetizing circuit 31 or 41 of FIG. 1). To minimize latency associated with re-transmission (e.g., after an uncorrectable error during transmission), the number of application data words per cell should be minimized (e.g., there are only two words per cell). A flow control bit (identified as "FLOW" in FIG. 2) is included in each cell. The flow control bits and application data blocks are the only data visible to the application. In each cell, at least one additional control bit (e.g., the XTND control bit of FIG. 2) is included, and additional bits (e.g., an address extension) can be included to provide optional functionality, such as network addressing. Also, error control bits (e.g., parity bits, or the CRC bits of FIG. 2) are generated for (and included in) each cell to enable error detection and/or correction. FIG. 2 shows an example of such a cell, consisting of 144 bits and not including an extension.

The bits of each cell are grouped into input words (e.g., in packetizing circuit 31 or 41 of FIG. 1). For example, the 144 bits of cell 80 of FIG. 2 are grouped into the sixteen 9-bit input words shown in FIG. 2, each comprising eight application data bits (D0, D1, D2, D3, D4, D5, D6, D7, D8, D9, D10, D11, D12, D13, D14, or D15) and one control bit.

Finally, the input words indicative of each cell are encoded, preferably to transform the frequency spectrum of the serial data stream so as to adapt to channel requirements. For example, each code word indicative of a 9-bit input word can be a 10-bit code word having enhanced spectral properties. Preferably a block code is used which limits the length of runs without transitions in the encoded data stream (to meet requirements) and allows the encoded data to be transmitted in DC balanced fashion to avoid baseline wander. Different codebooks (mappings between input words and code words) can be used to perform the encoding, depending on the spectral properties of the previously encoded values (e.g., one code book can be used when the current running disparity is negative, and a different codebook used when the current running disparity is non-negative).

In the FIG. 2 example, the sixteen 9-bit input words indicative of cell 80 are encoded (e.g., by circuit 32 or 42 of FIG. 1) using a 9-Bit-to-10-Bit ("9B/10B") block code to produce the sixteen 10-bit code words (CW0–CW15) shown in FIG. 2. The code words are transmitted in an appropriate sequence over a serial link. Thus, an ordered set of 160 code word bits (identified by reference numeral 81 in FIG. 2) is indicative of the 144-bit cell identified by reference numeral 80 in FIG. 2. Cell 80 includes a control bit (denoted as "XTND" in FIG. 2) that indicates whether the cell has an extension. The value XTND=0 indicates that cell 80 has no extension. The value XTND=1 would indicate that the cell has an extension of predetermined length (e.g., an extension of M*9 bits, where M is a small integer). The XTND bit can be the first bit of the cell, and can indicate whether the cell is a 144-bit non-extended cell or a (N*9)-bit extended cell, where N is an integer greater than 16. For example, XTND=1 can indicate that a 9-bit extension follows the first 144 bits of each cell (so that the $145^{th}$ through 153rd bits after the XTND bit are an extension (e.g., an address for use by "network" layer circuitry) that is part of the same cell as the $2^{nd}$ through $144^{th}$ bits after the XTND bit.

The extension for a cell can serve any of various functions, and can include bits that indicate what functionality is enabled (by the extension) as well as bits of additional protocol fields. For example, a 9-bit extension field could be added to cell 80 of FIG. 1 (if the XTND bit is set to XTND=1), to provide a network address or connection identifier for routing the cell. After coding, the extended cell's size would be 170 bits.

Cell 80 also includes an end-to-end flow control bit (the bit identified as "FLOW") for use by application layer circuitry (e.g., application circuitry within circuitry 30 of transmitter 10 of FIG. 1). In typical implementations of the FIG. 1 system, circuitry 40 in receiver 20 ignores the FLOW bits in cells received on channel 51 from transmitter 10, and when generating data to be transmitted (by circuit 42) in cells over channel 52, circuitry 40 sets the FLOW bit of such data to one or zero to cause transmitter 10 to respond to the cells by continuing or ceasing transmission of data over channel 51 to receiver 20. In response to reception (at transmitter 10) of a cell that has propagated over channel 52, the transmitter's de-packetizing circuit 35 identifies the FLOW bit in the cell, and asserts a signal indicative of the FLOW bit's value to circuitry 30. In response to FLOW=1, application circuitry within circuitry 30 causes transmitter 10 to enter a data transmitting state (an "ON" state) in which transmitter 10 sends code words indicative of cells to receiver 20 over channel 51. In response to FLOW=0, application circuitry within circuitry 30 causes transmitter 10 to enter a state (an "OFF" state) in which transmitter 10 does not send such code words to receiver 20 over channel 51. In some embodiments, transmitter 10 transmits "idle" characters (of the type discussed below) while in the OFF state. In other embodiments, transmitter 10 transmits empty cells (i.e., cells in which one or more "Valid" bits are set to indicate that the cells include no valid application data) while in the OFF state. In other embodiments, each cell includes a "Valid" bit for each of two or more blocks of application data, and a FLOW bit for each priority level (or virtual channel) of application data. For example, the "XTND" bit of FIG. 2 can function as a "Valid" bit, rather than as an extension-indicating bit as described above. In the latter embodiments, in response to one of the FLOW bits (in a cell sent by receiver 20) having a value indicating an OFF state for one priority level (or virtual channel) of application data, transmitter 10 transmits cells each having an empty block of application data of the relevant type (as indicated by a Valid bit having a first value) and at least one full block of application data of another type (each such block indicated by a Valid bit having a second value).

Cell 80 also includes twelve cyclic redundancy check (CRC) bits. Preferably, the CRC bits are generated for the entire cell (e.g., by packetizing circuit 31 or 41 of FIG. 1) before the data comprising the cell are encoded, and later applied (e.g., by circuit 44 or 34) to the entire cell after the data comprising the cell have been transmitted and decoded. After the CRC bits are generated, the control bits (including the CRC bits) and application data of the cell are asserted in the proper sequence (e.g., by packetizing circuit 31 or 41) to encoding circuitry (e.g., within circuit 32 or 42) in which the properly sequenced application data and control bits are encoded for transmission. In such preferred embodiments, because the CRC is applied to the contents of each cell before spectral encoding, burst errors will be magnified. Thus, in such embodiments, it is typical to use a relatively long length CRC (i.e., twelve CRC bits for each 144-bit cell). Although a shorter length CRC could be used for a cell (e.g., less than twelve CRC bits for each 144-bit cell), the effective error detection probability would be reduced if a shorter length CRC were used.

In different embodiments of the invention, the sizes of words, cells, blocks of CRC bits (or other error control bits), and other parameters are adjusted according to desired features and coding efficiency. For a cell having the FIG. 2 format, the above-described coding method provides 131 bits of application information (128 bits of application data, two OOB bits, and one FLOW bit) with 29 bits of protocol overhead per cell, which gives an 82% coding efficiency. The commonly used conventional 8B/10B coding scheme achieves only 80% efficiency for the physical layer alone.

In many contemplated embodiments, code words indicative of cells (of application data and control data) having format other than that shown in FIG. 2 are transmitted. For example, in some embodiments the XTND bit discussed with reference to FIG. 2 is replaced by a second FLOW bit so that there is a FLOW bit for each application data block. In other exemplary embodiments, the FLOW bit of FIG. 2 is removed and replaced by a "Valid" bit that indicates whether or not the second 64-bit block of application data in the cell contains valid data (in such embodiments the first 64-bit application data block is always valid; otherwise, the transmitter would transmit "idle" characters, of the type mentioned above and discussed further below, rather than code words indicative of cells). The line code employed in some embodiments of the invention has a coding efficiency of less than 80%, although many other embodiments have a coding efficiency greater than 80%.

We next describe examples of special characters that can be transmitted in accordance with the invention. In some implementations, the circuitry (e.g., circuit 32 or 42 of FIG. 1) employed to transmit each special character can transmit a special character before or after a cell of code words (i.e., before or after a sequence of code words indicative of a cell), but does not interrupt transmission of a cell to transmit any special character. However, in preferred implementations, the set of code words employed to encode cells for transmission in accordance with the invention is such that no special character (in a set of special characters) can occur in a sequence of code words indicative of a cell. In such preferred embodiments, the special character transmission circuitry can transmit any special character in the set at any time (including by interrupting transmission of a cell to transmit the special character), and the circuitry (e.g., circuit 33 or 43 of FIG. 1) employed for receiving and decoding transmitted code words is configured (e.g., includes logic configured) to recognize each transmitted special character, regardless of whether transmission of the special character has or has not interrupted transmission of a cell.

In preferred embodiments of the invention in which N-bit code words indicative of cells are transmitted, each special character transmitted is an N-bit word or a sequence of a small number of N-bit words (e.g., two or three N-bit words). Examples of special characters are "link training," "state exchange" (or "synchronization"), and "idle" characters.

Special characters ideally include some inherent redundancy to protect against errors in transmission. For example, bit errors in a state exchange character should not should cause the system to interpret it as another valid state exchange character. Thus, the special character should be resilient to errors, or it can be transmitted repeatedly a small number of times (e.g. two or three times) to ensure proper delivery.

To establish symbol framing upon startup or after a link error during operation of typical implementations of the FIG. 1 system, transmitter 10 and receiver 20 transmit at least one special "link training" character (sometimes referred to herein as a training character "T") and optionally also at least one special "synchronization" or "state exchange" character. State exchange characters are sometimes denoted herein as "Si" characters, where the notation "Si" indicates that there are "i" different state exchange characters. For example, the "i"th state exchange character can communicate the value "i" to the endpoint that receives it, in order to exchange state information. The endpoint that receives a state exchange character "Si" interprets its value "i" in a predetermined manner. For example, the value "i" can be a sequence number which takes on the values 0,1, . . . ,7. In some contemplated embodiments of the invention, less than ten different "Si" characters would be needed.

Preferably, no link training (or state exchange) character appears in any valid stream of code words that is indicative of a cell, and each such special character is self-identifying. Preferably, each such special character includes a preamble used for link training (e.g., to establish framing) and also a discriminant pattern that distinguishes the character from other characters. The discriminant pattern can be indicative of state information (e.g., state information useful for recovery from a link error).

In a class of implementations of the FIG. 1 system, upon startup or after a link error, a communications endpoint (e.g., transmitter 10 upon startup, or receiver 20 after a link error) enters a link training phase (or training "mode" or "state") having an initial handshake phase. In response to one or more special characters sent by one endpoint in the handshake phase, the other endpoint enters the link training phase and participates in the handshake phase. During the handshake phase (which is implemented at the physical level), the endpoints establish symbol alignment (typically by exchanging one or more link training characters). After the handshake phase (during or after the link training phase), the endpoints exchange state information and establish cell alignment.

In typical implementations in this class, at least one state exchange character is sent (potentially with redundancy to guard against link errors) after the handshake phase. Typically, both endpoints exchange state information after the handshake phase (i.e., each endpoint sends one state exchange character, or a number of state exchange characters, to the other endpoint). Ideally, each state exchange character contains the same preamble as does each link training character sent during the handshake phase, or has some other unique property that enables link training to occur.

In some implementations, each state exchange character indicates state information regarding the endpoint that sends it. For example, one state exchange character identifies the last cell successfully received (by the endpoint that sends the state exchange character) before the link training operation, or a sequence of state exchange characters (which need not all be identical) identifies the last cell successfully received (by the endpoint that sends the state exchange character) before the link training operation. For example, each state exchange character can include a preamble (for framing) and a sequence number indicative of the last cell successfully received (by the endpoint that sends the state exchange character) before the link training operation.

In other implementations in this class, at least one state exchange character sent (potentially with redundancy to guard against link errors) after the handshake phase indicates that the first cell of normal data to be transmitted after the link training operation contains state information to be exchanged, and optionally indicates a number of cells (after such first cell) that contain additional state information. Alternatively, some portion of the first cell indicates the total number of cells that contain state information.

In other implementations in this class, no state exchange character is sent after the handshake phase. Instead, by convention, the first cell (or each of the first few cells) sent after the handshake phase contains state information to be exchanged.

In some implementations, after the handshake phase of a link training operation, at least one endpoint sends a sequence of state exchange characters, rather than a single state exchange character, whenever it sends a state exchange character. For example, a first endpoint can send a sequence of a predetermined number of Si characters (e.g., X "Si" characters, each "Si" character including a sequence number indicative of the last cell received by the first endpoint from the second endpoint). Each such sequence can be indicative of arbitrary state information. For example, such a sequence can be indicative of the sequence number of the last cell received by the endpoint that sends the state exchange character sequence (e.g., if each state exchange character in the sequence is indicative of a binary "1" or "0" and the sequence consists of N characters, the sequence number of the cell can be an N-bit binary number determined by the N-character sequence).

Transmission of code word sequences indicative of cells (and special characters that are distinguishable from the bit sequences that can occur in such code word sequences) in accordance with the invention allows transmitters and receivers to implement multiple levels (layers) of communication protocol functionality in an improved manner. In preferred embodiments of the invention, the control bits included in a cell can be used at more than one level (layer) of communication protocol functionality. For example, in a system having the OSI seven-layer architecture (or the TCP/IP architecture), the control bits can be used by two or more of application layer circuitry, presentation layer circuitry, session layer circuitry, transport layer circuitry, network layer circuitry, link layer circuitry, and physical layer circuitry.

In a system having the OSI seven-layer (or TCP/IP) architecture, transmission in accordance with the invention of code word sequences indicative of cells, and special characters that are distinguishable from the bit sequences that can occur in such code word sequences, allows transmitters and receivers to provide improved physical layer functionality. We next describe this improved physical layer functionality.

The goal of a line code is to transform the frequency spectrum of a serial data stream so as to adapt to channel requirements, for example by limiting the length of runs without transitions to improve CDR (clock/data recovery), transmitting the data in DC balanced fashion to avoid baseline wander, and providing specialized patterns for symbol framing. Preferred embodiments of the invention employ a low overhead block code, such as an N-bit-to-(N+1)-bit code in which N bit words are encoded as (N+1) bit code words to meet these requirements. For example, the block code employed to generate the code words described with reference to FIG. 2 is a 9-bit-to-10-bit code in which 9 bit words are encoded as 10 bit code words to meet these requirements. Alternatively, a 7-bit-to-8-bit code in which 7 bit words are encoded as 8 bit code words block code could be employed to generate the code words transmitted in accordance with the invention.

Another class of embodiments uses a low overhead block code in which K-bit words (where K=L+M) are broken into L-bit and M-bit fragments, each L-bit fragment is encoded as an (L+1)-bit code using an L-bit-to-(L+1)-bit block code, each M-bit fragment is encoded as an (M+1)-bit code using an M-bit-to-(M+1)-bit block code, and the (L+1)-bit and (M+1)-bit codes are concatenated to produce (L+M+2)-bit code words which are transmitted in an appropriate sequence (indicative of a cell) over a serial link. For example, L and M can satisfy L=7 and M=9, giving a total of 16 bits encoded into 18 bits.

In some N-bit-to-(N+1)-bit block codes that can be employed to implement the invention, a mapping is defined from N-bit input words to a "positive" codebook containing only (N+1)-bit code words of neutral or positive disparity, where a word of "positive disparity" includes more ones than zeros and a word of "neutral disparity" has an equal number of ones and zeros. The mapping of each code word of the positive codebook to a code word of a corresponding "negative" codebook is determined simply by complementing the former code word to generate the latter code word. Ideally, a mapping function from input words to the code words of the positive codebook (or the negative codebook) is found that is bijective and simple to implement as logic circuitry. However, even if such an ideal mapping function cannot be found, a simple mapping function can typically be identified that covers a large subset of the input symbol space, and the remaining input symbols are handled as special cases (e.g., special input symbols for which encoding must be accomplished using table lookup circuitry or other "secondary" encoding circuitry).

Throughout the disclosure, the expression "table lookup" denotes a mapping operation that is implemented in any manner (not necessarily by searching a ROM or CAM type memory for an output value in response to an input value). For example, table lookup can be implemented using a memory-based lookup table or a logic-based lookup table, as a complex logic function (that performs the equivalent of a memory-based table lookup), as a logic truth table/Karnaugh map, or in any other suitable manner.

For many applications, full lookup tables (for encoding or decoding) are not practical implementation choices. Preferred embodiments for such applications use a systematic mapping technique implemented by simple logic circuitry without any table lookup circuitry (or with circuitry implementing only a small lookup table for handling a small subset of the full set of input words) for encoding and decoding. The encoder in each of circuit 32 and 42 of the FIG. 1 system preferably implements such a systematic mapping technique.

We next provide examples of low overhead block codes that can be employed to implement preferred embodiments of the invention. One such block code is a 9B/10B code defined by the positive and negative codebooks set forth as Table 1, another is a 9B/10B code defined by the positive and negative codebooks set forth as Table 4, another is a 9B/10B code defined by the positive and negative codebooks set forth as Table 5, and another such block code is a 7B/8B code defined by the positive and negative codebooks set forth as Table 3. Table 2 sets forth special characters that are suitable for use with the 10-bit code words set forth in Table 1.

We first describe the 9B/10B code whose code words are set forth as Table 1.

TABLE 1

| Symbol | Positive Code | Positive Disparity | Negative Code | Negative Disparity | Primary Mapping? |
|---|---|---|---|---|---|
| 0 | 1001000111 | 0 | 0110111000 | 0 | |
| 1 | 1000011110 | 0 | 0111100001 | 0 | |
| 2 | 1000011101 | 0 | 0111100010 | 0 | |
| 3 | 1110011000 | 0 | 0001100111 | 0 | |
| 4 | 1000011011 | 0 | 0111100100 | 0 | |
| 5 | 1110100010 | 0 | 0001011101 | 0 | |
| 6 | 1100010101 | 0 | 0011101010 | 0 | |
| 7 | 1110101000 | 0 | 0001010111 | 0 | |
| 8 | 1000010111 | 0 | 0111101000 | 0 | |
| 9 | 1110000110 | 0 | 0001111001 | 0 | |
| 10 | 1110000101 | 0 | 0001111010 | 0 | |
| 11 | 1110110000 | 0 | 0001001111 | 0 | |
| 12 | 1100100011 | 0 | 0011011100 | 0 | |
| 13 | 1100010110 | 0 | 0011101001 | 0 | |
| 14 | 1100100101 | 0 | 0011011010 | 0 | |
| 15 | 1100011010 | 0 | 0011100101 | 0 | |
| 16 | 1000101011 | 0 | 0111010100 | 0 | |
| 17 | 1100001110 | 0 | 0011110001 | 0 | |
| 18 | 1100001101 | 0 | 0011110010 | 0 | |
| 19 | 1100100110 | 0 | 0011011001 | 0 | |
| 20 | 1100001011 | 0 | 0011110100 | 0 | |
| 21 | 1100101010 | 0 | 0011010101 | 0 | |
| 22 | 1100101001 | 0 | 0011010110 | 0 | |
| 23 | 1100101100 | 0 | 0011010011 | 0 | |
| 24 | 1001001011 | 0 | 0110110100 | 0 | |
| 25 | 1100110010 | 0 | 0011001101 | 0 | |
| 26 | 1100110001 | 0 | 0011001110 | 0 | |
| 27 | 1100110100 | 0 | 0011001011 | 0 | |
| 28 | 1001010011 | 0 | 0110101100 | 0 | |
| 29 | 1101010010 | 0 | 0010101101 | 0 | |
| 30 | 1000101101 | 0 | 0111010010 | 0 | |
| 31 | 1101010010 | 0 | 0010101101 | 0 | |
| 32 | 1001100011 | 0 | 0110011100 | 0 | |
| 33 | 1101010100 | 0 | 0010101011 | 0 | |
| 34 | 1000110101 | 0 | 0111001010 | 0 | |
| 35 | 1101011000 | 0 | 0010100111 | 0 | |
| 36 | 1010001011 | 0 | 0101110100 | 0 | |
| 37 | 1101100010 | 0 | 0010011101 | 0 | |
| 38 | 1001001101 | 0 | 0110110010 | 0 | |
| 39 | 1101101000 | 0 | 0010010111 | 0 | |
| 40 | 1010010011 | 0 | 0101101100 | 0 | |
| 41 | 1101110000 | 0 | 0010001111 | 0 | |
| 42 | 1001010101 | 0 | 0110101010 | 0 | |
| 43 | 1000101110 | 0 | 0111010001 | 0 | |
| 44 | 1010100011 | 0 | 0101011100 | 0 | |
| 45 | 1000110110 | 0 | 0111001001 | 0 | |
| 46 | 1001011001 | 0 | 0110100110 | 0 | |
| 47 | 1000111010 | 0 | 0111000101 | 0 | |
| 48 | 1001100101 | 0 | 0110011010 | 0 | |
| 49 | 1001001110 | 0 | 0110110001 | 0 | |
| 50 | 1001101001 | 0 | 0110010110 | 0 | |
| 51 | 1001010110 | 0 | 0110101001 | 0 | |
| 52 | 1001110001 | 0 | 0110001110 | 0 | |
| 53 | 1001011010 | 0 | 0110100101 | 0 | |
| 54 | 1010001101 | 0 | 0101110010 | 0 | |
| 55 | 1001100110 | 0 | 0110011001 | 0 | |
| 56 | 1010010101 | 0 | 0101101010 | 0 | |
| 57 | 1001101010 | 0 | 0110010101 | 0 | |
| 58 | 1010011001 | 0 | 0101100110 | 0 | |
| 59 | 1001110010 | 0 | 0110001101 | 0 | |
| 60 | 1010100101 | 0 | 0101011010 | 0 | |
| 61 | 1001110100 | 0 | 0110001011 | 0 | |
| 62 | 1010101001 | 0 | 0101010110 | 0 | |
| 63 | 1010001110 | 0 | 0101110001 | 0 | |
| 64 | 1110100001 | 0 | 0001011110 | 0 | |
| 65 | 1110111110 | 6 | 0001000001 | −6 | Y |
| 66 | 1110111101 | 6 | 0001000010 | −6 | Y |
| 67 | 1110111100 | 4 | 0001000011 | −4 | Y |
| 68 | 1110111011 | 6 | 0001000100 | −6 | Y |
| 69 | 1110111010 | 4 | 0001000101 | −4 | Y |
| 70 | 1110111001 | 4 | 0001000110 | −4 | Y |
| 71 | 1110111000 | 2 | 0001000111 | −2 | Y |
| 72 | 1110110111 | 6 | 0001001000 | −6 | Y |
| 73 | 1110110110 | 4 | 0001001001 | −4 | Y |
| 74 | 1110110101 | 4 | 0001001010 | −4 | Y |
| 75 | 1110110100 | 2 | 0001001011 | −2 | Y |

TABLE 1-continued

| Symbol | Positive Code | Positive Disparity | Negative Code | Negative Disparity | Primary Mapping? |
|---|---|---|---|---|---|
| 76 | 1110110011 | 4 | 0001001100 | −4 | Y |
| 77 | 1110110010 | 2 | 0001001101 | 2 | Y |
| 78 | 1110110001 | 2 | 0001001110 | −2 | Y |
| 79 | 0001001111 | 0 | 1110110000 | 0 | Y |
| 80 | 1110101111 | 6 | 0001010000 | −6 | Y |
| 81 | 1110101110 | 4 | 0001010001 | −4 | Y |
| 82 | 1110101101 | 4 | 0001010010 | −4 | Y |
| 83 | 1110101100 | 2 | 0001010011 | −2 | Y |
| 84 | 1110101011 | 4 | 0001010100 | −4 | Y |
| 85 | 1110101010 | 2 | 0001010101 | −2 | Y |
| 86 | 1110101001 | 2 | 0001010110 | −2 | Y |
| 87 | 0001010111 | 0 | 1110101000 | 0 | Y |
| 88 | 1110100111 | 4 | 0001011000 | −4 | Y |
| 89 | 1110100110 | 2 | 0001011001 | −2 | Y |
| 90 | 1110100101 | 2 | 0001011010 | −2 | Y |
| 91 | 0001011011 | 0 | 1110100100 | 0 | Y |
| 92 | 1110100011 | 2 | 0001011100 | −2 | Y |
| 93 | 0001011101 | 0 | 1110100010 | 0 | Y |
| 94 | 0001011110 | 0 | 1110100001 | 0 | Y |
| 95 | 1110100100 | 0 | 0001011011 | 0 | |
| 96 | 1110010001 | 0 | 0001101110 | 0 | |
| 97 | 1110011110 | 4 | 0001100001 | −4 | Y |
| 98 | 1110011101 | 4 | 0001100010 | −4 | Y |
| 99 | 1110011100 | 2 | 0001100011 | −2 | Y |
| 100 | 1110011011 | 4 | 0001100100 | −4 | Y |
| 101 | 1110011010 | 2 | 0001100101 | −2 | Y |
| 102 | 1110011001 | 2 | 0001100110 | −2 | Y |
| 103 | 0001100111 | 0 | 1110011000 | 0 | Y |
| 104 | 1110010111 | 4 | 0001101000 | −4 | Y |
| 105 | 1110010110 | 2 | 0001101001 | −2 | Y |
| 106 | 1110010101 | 2 | 0001101010 | −2 | Y |
| 107 | 0001101011 | 0 | 1110010100 | 0 | Y |
| 108 | 1110010011 | 2 | 0001101100 | −2 | Y |
| 109 | 0001101101 | 0 | 1110010010 | 0 | Y |
| 110 | 0001101110 | 0 | 1110010001 | 0 | Y |
| 111 | 0001101111 | 2 | 1110010000 | −2 | Y |
| 112 | 1110001010 | 0 | 0001110101 | 0 | |
| 113 | 1110001110 | 2 | 0001110001 | −2 | Y |
| 114 | 1110001101 | 2 | 0001110010 | −2 | Y |
| 115 | 0001110011 | 0 | 1110001100 | 0 | Y |
| 116 | 1110001011 | 2 | 0001110100 | −2 | Y |
| 117 | 0001110101 | 0 | 1110001010 | 0 | Y |
| 118 | 0001110110 | 0 | 1110001001 | 0 | Y |
| 119 | 0001110111 | 2 | 1110001000 | −2 | Y |
| 120 | 1110010010 | 0 | 0001101101 | 0 | |
| 121 | 0001111001 | 0 | 1110000110 | 0 | Y |
| 122 | 0001111010 | 0 | 1110000101 | 0 | Y |
| 123 | 0001111011 | 2 | 1110000100 | −2 | Y |
| 124 | 1110010100 | 0 | 0001101011 | 0 | |
| 125 | 0001111101 | 2 | 1110000010 | −2 | Y |
| 126 | 1110001001 | 0 | 0001110110 | 0 | |
| 127 | 1110001100 | 0 | 0001110011 | 0 | |
| 128 | 1101000011 | 0 | 0010111100 | 0 | |
| 129 | 1101111110 | 6 | 0010000001 | −6 | Y |
| 130 | 1101111101 | 6 | 0010000010 | −6 | Y |
| 131 | 1101111100 | 4 | 0010000011 | −4 | Y |
| 132 | 1101111011 | 6 | 0010000100 | −6 | Y |
| 133 | 1101111010 | 4 | 0010000101 | −4 | Y |
| 134 | 1101111001 | 4 | 0010000110 | −4 | Y |
| 135 | 1101111000 | 2 | 0010000111 | −2 | Y |
| 136 | 1101110111 | 6 | 0010001000 | −6 | Y |
| 137 | 1101110110 | 4 | 0010001001 | −4 | Y |
| 138 | 1101110101 | 4 | 0010001010 | −4 | Y |
| 139 | 1101110100 | 2 | 0010001011 | −2 | Y |
| 140 | 1101110011 | 4 | 0010001100 | −4 | Y |
| 141 | 1101110010 | 2 | 0010001101 | −2 | Y |
| 142 | 1101110001 | 2 | 0010001110 | −2 | Y |
| 143 | 0010001111 | 0 | 1101110000 | 0 | Y |
| 144 | 1101101111 | 6 | 0010010000 | −6 | Y |
| 145 | 1101101110 | 4 | 0010010001 | −4 | Y |
| 146 | 1101101101 | 4 | 0010010010 | −4 | Y |
| 147 | 1101101100 | 2 | 0010010011 | −2 | Y |
| 148 | 1101101011 | 4 | 0010010100 | −4 | Y |
| 149 | 1101101010 | 2 | 0010010101 | −2 | Y |
| 150 | 1101101001 | 2 | 0010010110 | −2 | Y |
| 151 | 0010010111 | 0 | 1101101000 | 0 | Y |
| 152 | 1101100111 | 4 | 0010011000 | −4 | Y |
| 153 | 1101100110 | 2 | 0010011001 | −2 | Y |
| 154 | 1101100101 | 2 | 0010011010 | −2 | Y |
| 155 | 0010011011 | 0 | 1101100100 | 0 | Y |
| 156 | 1101100011 | 2 | 0010011100 | −2 | Y |
| 157 | 0010011101 | 0 | 1101100010 | 0 | Y |
| 158 | 0010011110 | 0 | 1101100001 | 0 | Y |
| 159 | 1101100100 | 0 | 0010011011 | 0 | |
| 160 | 1101100001 | 0 | 0010111010 | 0 | |
| 161 | 1101011110 | 4 | 0010100001 | −4 | Y |
| 162 | 1101011101 | 4 | 0010100010 | −4 | Y |
| 163 | 1101011100 | 2 | 0010100011 | −2 | Y |
| 164 | 1101011011 | 4 | 0010100100 | −4 | Y |
| 165 | 1101011010 | 2 | 0010100101 | −2 | Y |
| 166 | 1101011001 | 2 | 0010100110 | −2 | Y |
| 167 | 0010100111 | 0 | 1101011000 | 0 | Y |
| 168 | 1101010111 | 4 | 0010101000 | −4 | Y |
| 169 | 1101010110 | 2 | 0010101001 | −2 | Y |
| 170 | 1101010101 | 2 | 0010101010 | −2 | Y |
| 171 | 0010101011 | 0 | 1101010100 | 0 | Y |
| 172 | 1101010011 | 2 | 0010101100 | −2 | Y |
| 173 | 0010101101 | 0 | 1101010010 | 0 | Y |
| 174 | 0010101110 | 0 | 1101010001 | 0 | Y |
| 175 | 0010101111 | 2 | 1101010000 | −2 | Y |
| 176 | 1101001111 | 4 | 0010110000 | −4 | Y |
| 177 | 1101001110 | 2 | 0010110001 | −2 | Y |
| 178 | 1101001101 | 2 | 0010110010 | −2 | Y |
| 179 | 0010110011 | 0 | 1101001100 | 0 | Y |
| 180 | 1101001011 | 2 | 0010110100 | −2 | Y |
| 181 | 0010110101 | 0 | 1101001010 | 0 | Y |
| 182 | 0010110110 | 0 | 1101001001 | 0 | Y |
| 183 | 0010110111 | 2 | 1101001000 | −2 | Y |
| 184 | 1101000111 | 2 | 0010111000 | −2 | Y |
| 185 | 0010111001 | 0 | 1101000110 | 0 | Y |
| 186 | 0010111010 | 0 | 1101000101 | 0 | Y |
| 187 | 0010111011 | 2 | 1101000100 | −2 | Y |
| 188 | 0010111100 | 0 | 1101000011 | 0 | Y |
| 189 | 0010111101 | 2 | 1101000010 | −2 | Y |
| 190 | 0010111110 | 2 | 1101000001 | −2 | Y |
| 191 | 1101001100 | 0 | 0010110011 | 0 | |
| 192 | 1101001001 | 0 | 0010110110 | 0 | |
| 193 | 1100111110 | 4 | 0011000001 | −4 | Y |
| 194 | 1100111101 | 4 | 0011000010 | −4 | Y |
| 195 | 1100111100 | 2 | 0011000011 | −2 | Y |
| 196 | 1100111011 | 4 | 0011000100 | −4 | Y |
| 197 | 1100111010 | 2 | 0011000101 | −2 | Y |
| 198 | 1100111001 | 2 | 0011000110 | −2 | Y |
| 199 | 0011000111 | 0 | 1100111000 | 0 | Y |
| 200 | 1100110111 | 4 | 0011001000 | −4 | Y |
| 201 | 1100110110 | 2 | 0011001001 | −2 | Y |
| 202 | 1100110101 | 2 | 0011001010 | −2 | Y |
| 203 | 0011001011 | 0 | 1100110100 | 0 | Y |
| 204 | 1100110011 | 2 | 0011001100 | −2 | Y |
| 205 | 0011001101 | 0 | 1100110010 | 0 | Y |
| 206 | 0011001110 | 0 | 1100110001 | 0 | Y |
| 207 | 0011001111 | 2 | 1100110000 | −2 | Y |
| 208 | 1100101111 | 4 | 0011010000 | −4 | Y |
| 209 | 1100101110 | 2 | 0011010001 | −2 | Y |
| 210 | 1100101101 | 2 | 0011010010 | −2 | Y |
| 211 | 0011010011 | 0 | 1100101100 | 0 | Y |
| 212 | 1100101011 | 2 | 0011010100 | −2 | Y |
| 213 | 0011010101 | 0 | 1100101010 | 0 | Y |
| 214 | 0011010110 | 0 | 1100101001 | 0 | Y |
| 215 | 0011010111 | 2 | 1100101000 | −2 | Y |
| 216 | 1100100111 | 2 | 0011011000 | −2 | Y |
| 217 | 0011011001 | 0 | 1100100110 | 0 | Y |
| 218 | 0011011010 | 0 | 1100100101 | 0 | Y |
| 219 | 0011011011 | 2 | 1100100100 | −2 | Y |
| 220 | 0011011100 | 0 | 1100100011 | 0 | Y |
| 221 | 0011011101 | 2 | 1100100010 | −2 | Y |
| 222 | 0011011110 | 2 | 1100100001 | −2 | Y |
| 223 | 1100111000 | 0 | 0011000111 | 0 | |
| 224 | 1101010001 | 0 | 0010101110 | 0 | |
| 225 | 1100011110 | 2 | 0011100001 | −2 | Y |
| 226 | 1100011101 | 2 | 0011100010 | −2 | Y |
| 227 | 0011100011 | 0 | 1100011100 | 0 | Y |

TABLE 1-continued

| Symbol | Positive Code | Positive Disparity | Negative Code | Negative Disparity | Primary Mapping? |
|---|---|---|---|---|---|
| 228 | 1100011011 | 2 | 0011100100 | −2 | Y |
| 229 | 0011100101 | 0 | 1100011010 | 0 | Y |
| 230 | 0011100110 | 0 | 1100011001 | 0 | Y |
| 231 | 0011100111 | 2 | 1100011000 | −2 | Y |
| 232 | 1100010111 | 2 | 0011101000 | −2 | Y |
| 233 | 0011101001 | 0 | 1100010110 | 0 | Y |
| 234 | 0011101010 | 0 | 1100010101 | 0 | Y |
| 235 | 0011101011 | 2 | 1100010100 | −2 | Y |
| 236 | 0011101100 | 0 | 1100010011 | 0 | Y |
| 237 | 0011101101 | 2 | 1100010010 | −2 | Y |
| 238 | 0011101110 | 2 | 1100010001 | −2 | Y |
| 239 | 0011101111 | 4 | 1100010000 | −4 | Y |
| 240 | 1101100001 | 0 | 0010111110 | 0 | |
| 241 | 0011110001 | 0 | 1100001110 | 0 | Y |
| 242 | 0011110010 | 0 | 1100001101 | 0 | Y |
| 243 | 0011110011 | 2 | 1100001100 | −2 | Y |
| 244 | 0011110100 | 0 | 1100001011 | 0 | Y |
| 245 | 0011110101 | 2 | 1100001010 | −2 | Y |
| 246 | 0011110110 | 2 | 1100001001 | −2 | Y |
| 247 | 0011110111 | 4 | 1100001000 | −4 | Y |
| 248 | 1101100110 | 0 | 0010111001 | 0 | |
| 249 | 0011111001 | 2 | 1100000110 | −2 | Y |
| 250 | 0011111010 | 2 | 1100000101 | −2 | Y |
| 251 | 0011111011 | 4 | 1100000100 | −4 | Y |
| 252 | 1100010011 | 0 | 0011101100 | 0 | |
| 253 | 0011111101 | 4 | 1100000010 | −4 | Y |
| 254 | 1100011001 | 0 | 0011100110 | 0 | |
| 255 | 1100011100 | 0 | 0011100011 | 0 | |
| 256 | 1010000111 | 0 | 0101111000 | 0 | |
| 257 | 1011111110 | 6 | 0100000001 | −6 | Y |
| 258 | 1011111101 | 6 | 0100000010 | −6 | Y |
| 259 | 1011111100 | 4 | 0100000011 | −4 | Y |
| 260 | 1011111011 | 6 | 0100000100 | −6 | Y |
| 261 | 1011111010 | 4 | 0100000101 | −4 | Y |
| 262 | 1011111001 | 4 | 0100000110 | −4 | Y |
| 263 | 1011111000 | 2 | 0100000111 | −2 | Y |
| 264 | 1011110111 | 6 | 0100001000 | −6 | Y |
| 265 | 1011110110 | 4 | 0100001001 | −4 | Y |
| 266 | 1011110101 | 4 | 0100001010 | −4 | Y |
| 267 | 1011110100 | 2 | 0100001011 | −2 | Y |
| 268 | 1011110011 | 4 | 0100001100 | −4 | Y |
| 269 | 1011110010 | 2 | 0100001101 | −2 | Y |
| 270 | 1011110001 | 2 | 0100001110 | −2 | Y |
| 271 | 0100001111 | 0 | 1011110000 | 0 | Y |
| 272 | 1011101111 | 6 | 0100010000 | −6 | Y |
| 273 | 1011101110 | 4 | 0100010001 | −4 | Y |
| 274 | 1011101101 | 4 | 0100010010 | −4 | Y |
| 275 | 1011101100 | 2 | 0100010011 | −2 | Y |
| 276 | 1011101011 | 4 | 0100010100 | −4 | Y |
| 277 | 1011101010 | 2 | 0100010101 | −2 | Y |
| 278 | 1011101001 | 2 | 0100010110 | −2 | Y |
| 279 | 0100010111 | 0 | 1011101000 | 0 | Y |
| 280 | 1011100111 | 4 | 0100011000 | −4 | Y |
| 281 | 1011100110 | 2 | 0100011001 | −2 | Y |
| 282 | 1011100101 | 2 | 0100011010 | −2 | Y |
| 283 | 0100011011 | 0 | 1011100100 | 0 | Y |
| 284 | 1011100011 | 2 | 0100011100 | −2 | Y |
| 285 | 0100011101 | 0 | 1011100010 | 0 | Y |
| 286 | 0100011110 | 0 | 1011100001 | 0 | Y |
| 287 | 1011100100 | 0 | 0100011011 | 0 | |
| 288 | 1011000011 | 0 | 0100111100 | 0 | |
| 289 | 1011011110 | 4 | 0100100001 | −4 | Y |
| 290 | 1011011101 | 4 | 0100100010 | −4 | Y |
| 291 | 1011011100 | 2 | 0100100011 | −2 | Y |
| 292 | 1011011011 | 4 | 0100100100 | −4 | Y |
| 293 | 1011011010 | 2 | 0100100101 | −2 | Y |
| 294 | 1011011001 | 2 | 0100100110 | −2 | Y |
| 295 | 0100100111 | 0 | 1011011000 | 0 | Y |
| 296 | 1011010111 | 4 | 0100101000 | −4 | Y |
| 297 | 1011010110 | 2 | 0100101001 | −2 | Y |
| 298 | 1011010101 | 2 | 0100101010 | −2 | Y |
| 299 | 0100101011 | 0 | 1011010100 | 0 | Y |
| 300 | 1011010011 | 2 | 0100101100 | −2 | Y |
| 301 | 0100101101 | 0 | 1011010010 | 0 | Y |
| 302 | 0100101110 | 0 | 1011010001 | 0 | Y |
| 303 | 0100101111 | 2 | 1011010000 | −2 | Y |
| 304 | 1011001111 | 4 | 0100110000 | −4 | Y |
| 305 | 1011001110 | 2 | 0100110001 | −2 | Y |
| 306 | 1011001101 | 2 | 0100110010 | −2 | Y |
| 307 | 0100110011 | 0 | 1011001100 | 0 | Y |
| 308 | 1011001011 | 2 | 0100110100 | −2 | Y |
| 309 | 0100110101 | 0 | 1011001010 | 0 | Y |
| 310 | 0100110110 | 0 | 1011001001 | 0 | Y |
| 311 | 0100110111 | 2 | 1011001000 | −2 | Y |
| 312 | 1011000111 | 2 | 0100111000 | −2 | Y |
| 313 | 0100111001 | 0 | 1011000110 | 0 | Y |
| 314 | 0100111010 | 0 | 1011000101 | 0 | Y |
| 315 | 0100111011 | 2 | 1011000100 | −2 | Y |
| 316 | 0100111100 | 0 | 1011000011 | 0 | Y |
| 317 | 0100111101 | 2 | 1011000010 | −2 | Y |
| 318 | 0100111110 | 2 | 1011000001 | −2 | Y |
| 319 | 1011001100 | 0 | 0100110011 | 0 | |
| 320 | 1011000101 | 0 | 0100111010 | 0 | |
| 321 | 1010111110 | 4 | 0101000001 | −4 | Y |
| 322 | 1010111101 | 4 | 0101000010 | −4 | Y |
| 323 | 1010111100 | 2 | 0101000011 | −2 | Y |
| 324 | 1010111011 | 4 | 0101000100 | −4 | Y |
| 325 | 1010111010 | 2 | 0101000101 | −2 | Y |
| 326 | 1010111001 | 2 | 0101000110 | −2 | Y |
| 327 | 0101000111 | 0 | 1010111000 | 0 | Y |
| 328 | 1010110111 | 4 | 0101001000 | −4 | Y |
| 329 | 1010110110 | 2 | 0101001001 | −2 | Y |
| 330 | 1010110101 | 2 | 0101001010 | −2 | Y |
| 331 | 0101001011 | 0 | 1010110100 | 0 | Y |
| 332 | 1010110011 | 2 | 0101001100 | −2 | Y |
| 333 | 0101001101 | 0 | 1010110010 | 0 | Y |
| 334 | 0101001110 | 0 | 1010110001 | 0 | Y |
| 335 | 0101001111 | 2 | 1010110000 | −2 | Y |
| 336 | 1010101111 | 4 | 0101010000 | −4 | Y |
| 337 | 1010101110 | 2 | 0101010001 | −2 | Y |
| 338 | 1010101101 | 2 | 0101010010 | −2 | Y |
| 339 | 0101010011 | 0 | 1010101100 | 0 | Y |
| 340 | 1010101011 | 2 | 0101010100 | −2 | Y |
| 341 | 0101010101 | 0 | 1010101010 | 0 | Y |
| 342 | 0101010110 | 0 | 1010101001 | 0 | Y |
| 343 | 0101010111 | 2 | 1010101000 | −2 | Y |
| 344 | 1010100111 | 2 | 0101011000 | −2 | Y |
| 345 | 0101011001 | 0 | 1010100110 | 0 | Y |
| 346 | 0101011010 | 0 | 1010100101 | 0 | Y |
| 347 | 0101011011 | 2 | 1010100100 | −2 | Y |
| 348 | 0101011100 | 0 | 1010100011 | 0 | Y |
| 349 | 0101011101 | 2 | 1010100010 | −2 | Y |
| 350 | 0101011110 | 2 | 1010100001 | −2 | Y |
| 351 | 1010111000 | 0 | 0101000111 | 0 | |
| 352 | 1011001001 | 0 | 0100110110 | 0 | |
| 353 | 1010011110 | 2 | 0101100001 | −2 | Y |
| 354 | 1010011101 | 2 | 0101100010 | −2 | Y |
| 355 | 0101100011 | 0 | 1010011100 | 0 | Y |
| 356 | 1010011011 | 2 | 0101100100 | −2 | Y |
| 357 | 0101100101 | 0 | 1010011010 | 0 | Y |
| 358 | 0101100110 | 0 | 1010011001 | 0 | Y |
| 359 | 0101100111 | 2 | 1010011000 | −2 | Y |
| 360 | 1010010111 | 2 | 0101101000 | −2 | Y |
| 361 | 0101101001 | 0 | 1010010110 | 0 | Y |
| 362 | 0101101010 | 0 | 1010010101 | 0 | Y |
| 363 | 0101101011 | 2 | 1010010100 | −2 | Y |
| 364 | 0101101100 | 0 | 1010010011 | 0 | Y |
| 365 | 0101101101 | 2 | 1010010010 | −2 | Y |
| 366 | 0101101110 | 2 | 1010010001 | −2 | Y |
| 367 | 0101101111 | 4 | 1010010000 | −4 | Y |
| 368 | 1010001111 | 2 | 0101110000 | −2 | Y |
| 369 | 0101110001 | 0 | 1010001110 | 0 | Y |
| 370 | 0101110010 | 0 | 1010001101 | 0 | Y |
| 371 | 0101110011 | 2 | 1010001100 | −2 | Y |
| 372 | 0101110100 | 0 | 1010001011 | 0 | Y |
| 373 | 0101110101 | 2 | 1010001010 | −2 | Y |
| 374 | 0101110110 | 2 | 1010001001 | −2 | Y |
| 375 | 0101110111 | 4 | 1010001000 | −4 | Y |
| 376 | 0101111000 | 0 | 1010000111 | 0 | Y |
| 377 | 0101111001 | 2 | 1010000110 | −2 | Y |
| 378 | 0101111010 | 2 | 1010000101 | −2 | Y |
| 379 | 0101111011 | 4 | 1010000100 | −4 | Y |

TABLE 1-continued

| Symbol | Positive Code | Positive Disparity | Negative Code | Negative Disparity | Primary Mapping? |
|---|---|---|---|---|---|
| 380 | 0101111100 | 2 | 1010000011 | −2 | Y |
| 381 | 0101111101 | 4 | 1010000010 | −4 | Y |
| 382 | 0101111110 | 4 | 1010000001 | −4 | Y |
| 383 | 1010011100 | 0 | 0101100011 | 0 | |
| 384 | 1011010001 | 0 | 0100101110 | 0 | |
| 385 | 1001111110 | 4 | 0110000001 | −4 | Y |
| 386 | 1001111101 | 4 | 0110000010 | −4 | Y |
| 387 | 1001111100 | 2 | 0110000011 | −2 | Y |
| 388 | 1001111011 | 4 | 0110000100 | −4 | Y |
| 389 | 1001111010 | 2 | 0110000101 | −2 | Y |
| 390 | 1001111001 | 2 | 0110000110 | −2 | Y |
| 391 | 0110000111 | 0 | 1001111000 | 0 | Y |
| 392 | 1001110111 | 4 | 0110001000 | −4 | Y |
| 393 | 1001110110 | 2 | 0110001001 | −2 | Y |
| 394 | 1001110101 | 2 | 0110001010 | −2 | Y |
| 395 | 0110001011 | 0 | 1001110100 | 0 | Y |
| 396 | 1001110011 | 2 | 0110001100 | −2 | Y |
| 397 | 0110001101 | 0 | 1001110010 | 0 | Y |
| 398 | 0110001110 | 0 | 1001110001 | 0 | Y |
| 399 | 0110001111 | 2 | 1001110000 | −2 | Y |
| 400 | 1001101111 | 4 | 0110010000 | −4 | Y |
| 401 | 1001101110 | 2 | 0110010001 | −2 | Y |
| 402 | 1001101101 | 2 | 0110010010 | −2 | Y |
| 403 | 0110010011 | 0 | 1001101100 | 0 | Y |
| 404 | 1001101011 | 2 | 0110010100 | −2 | Y |
| 405 | 0110010101 | 0 | 1001101010 | 0 | Y |
| 406 | 0110010110 | 0 | 1001101001 | 0 | Y |
| 407 | 0110010111 | 2 | 1001101000 | −2 | Y |
| 408 | 1001100111 | 2 | 0110011000 | −2 | Y |
| 409 | 0110011001 | 0 | 1001100110 | 0 | Y |
| 410 | 0110011010 | 0 | 1001100101 | 0 | Y |
| 411 | 0110011011 | 2 | 1001100100 | −2 | Y |
| 412 | 0110011100 | 0 | 1001100011 | 0 | Y |
| 413 | 0110011101 | 2 | 1001100010 | −2 | Y |
| 414 | 0110011110 | 2 | 1001100001 | −2 | Y |
| 415 | 1001111000 | 0 | 0110000111 | 0 | |
| 416 | 1011100001 | 0 | 0100011110 | 0 | |
| 417 | 1001100001 | 2 | 0110100001 | −2 | Y |
| 418 | 1001011101 | 2 | 0110100010 | −2 | Y |
| 419 | 0110100011 | 0 | 1001011100 | 0 | Y |
| 420 | 1001011011 | 2 | 0110100100 | −2 | Y |
| 421 | 0110100101 | 0 | 1001011010 | 0 | Y |
| 422 | 0110100110 | 0 | 1001011001 | 0 | Y |
| 423 | 0110100111 | 2 | 1001011000 | −2 | Y |
| 424 | 1001010111 | 2 | 0110101000 | −2 | Y |
| 425 | 0110101001 | 0 | 1001010110 | 0 | Y |
| 426 | 0110101010 | 0 | 1001010101 | 0 | Y |
| 427 | 0110101011 | 2 | 1001010100 | −2 | Y |
| 428 | 0110101100 | 0 | 1001010011 | 0 | Y |
| 429 | 0110101101 | 2 | 1001010010 | −2 | Y |
| 430 | 0110101110 | 2 | 1001010001 | −2 | Y |
| 431 | 0110101111 | 4 | 1001010000 | −4 | Y |
| 432 | 1001001111 | 2 | 0110110000 | −2 | Y |
| 433 | 0110110001 | 0 | 1001001110 | 0 | Y |
| 434 | 0110110010 | 0 | 1001001101 | 0 | Y |
| 435 | 0110110011 | 2 | 1001001100 | −2 | Y |
| 436 | 0110110100 | 0 | 1001001011 | 0 | Y |
| 437 | 0110110101 | 2 | 1001001010 | −2 | Y |
| 438 | 0110110110 | 2 | 1001001001 | −2 | Y |
| 439 | 0110110111 | 4 | 1001001000 | −4 | Y |
| 440 | 0110111000 | 0 | 1001000111 | 0 | Y |
| 441 | 0110111001 | 2 | 1001000110 | −2 | Y |
| 442 | 0110111010 | 2 | 1001000101 | −2 | Y |
| 443 | 0110111011 | 4 | 1001000100 | −4 | Y |
| 444 | 0110111100 | 2 | 1001000011 | −2 | Y |
| 445 | 0110111101 | 4 | 1001000010 | −4 | Y |
| 446 | 0110111110 | 4 | 1001000001 | −4 | Y |
| 447 | 1000111100 | 0 | 0111000011 | 0 | |
| 448 | 1010110001 | 0 | 0101001110 | 0 | |
| 449 | 1000111110 | 2 | 0111000001 | −2 | Y |
| 450 | 1000111101 | 2 | 0111000010 | −2 | Y |
| 451 | 0111000011 | 0 | 1000111100 | 0 | Y |
| 452 | 1000111011 | 2 | 0111000100 | −2 | Y |
| 453 | 0111000101 | 0 | 1000111010 | 0 | Y |
| 454 | 0111000110 | 0 | 1000111001 | 0 | Y |
| 455 | 0111000111 | 2 | 1000111000 | −2 | Y |
| 456 | 1000110111 | 2 | 0111001000 | −2 | Y |
| 457 | 0111001001 | 0 | 1000110110 | 0 | Y |
| 458 | 0111001010 | 0 | 1000110101 | 0 | Y |
| 459 | 0111001011 | 2 | 1000110100 | −2 | Y |
| 460 | 0111001100 | 0 | 1000110011 | 0 | Y |
| 461 | 0111001101 | 2 | 1000110010 | −2 | Y |
| 462 | 0111001110 | 2 | 1000110001 | −2 | Y |
| 463 | 0111001111 | 4 | 1000110000 | −4 | Y |
| 464 | 1000101111 | 2 | 0111010000 | −2 | Y |
| 465 | 0111010001 | 0 | 1000101110 | 0 | Y |
| 466 | 0111010010 | 0 | 1000101101 | 0 | Y |
| 467 | 0111010011 | 2 | 1000101100 | −2 | Y |
| 468 | 0111010100 | 0 | 1000101011 | 0 | Y |
| 469 | 0111010101 | 2 | 1000101010 | −2 | Y |
| 470 | 0111010110 | 2 | 1000101001 | −2 | Y |
| 471 | 0111010111 | 4 | 1000101000 | −4 | Y |
| 472 | 0111011000 | 0 | 1000100111 | 0 | Y |
| 473 | 0111011001 | 2 | 1000100110 | −2 | Y |
| 474 | 0111011010 | 2 | 1000100101 | −2 | Y |
| 475 | 0111011011 | 4 | 1000100100 | −4 | Y |
| 476 | 0111011100 | 2 | 1000100011 | −2 | Y |
| 477 | 0111011101 | 4 | 1000100010 | −4 | Y |
| 478 | 0111011110 | 4 | 1000100001 | −4 | Y |
| 479 | 1001011100 | 0 | 0110100011 | 0 | |
| 480 | 1011000110 | 0 | 0100111001 | 0 | |
| 481 | 0111100001 | 0 | 1000011110 | 0 | Y |
| 482 | 0111100010 | 0 | 1000011101 | 0 | Y |
| 483 | 0111100011 | 2 | 1000011100 | −2 | Y |
| 484 | 0111100100 | 0 | 1000011011 | 0 | Y |
| 485 | 0111100101 | 2 | 1000011010 | −2 | Y |
| 486 | 0111100110 | 2 | 1000011001 | −2 | Y |
| 487 | 0111100111 | 4 | 1000011000 | −4 | Y |
| 488 | 0111101000 | 0 | 1000010111 | 0 | Y |
| 489 | 0111101001 | 2 | 1000010110 | −2 | Y |
| 490 | 0111101010 | 2 | 1000010101 | −2 | Y |
| 491 | 0111101011 | 4 | 1000010100 | −4 | Y |
| 492 | 0111101100 | 2 | 1000010011 | −2 | Y |
| 493 | 0111101101 | 4 | 1000010010 | −4 | Y |
| 494 | 0111101110 | 4 | 1000010001 | −4 | Y |
| 495 | 0111101111 | 6 | 1000010000 | −6 | Y |
| 496 | 1011001010 | 0 | 0100110101 | 0 | |
| 497 | 0111110001 | 2 | 1000001110 | −2 | Y |
| 498 | 0111110010 | 2 | 1000001101 | −2 | Y |
| 499 | 0111110011 | 4 | 1000001100 | −4 | Y |
| 500 | 0111110100 | 2 | 1000001011 | −2 | Y |
| 501 | 0111110101 | 4 | 1000001010 | −4 | Y |
| 502 | 0111110110 | 4 | 1000001001 | −4 | Y |
| 503 | 0111110111 | 6 | 1000001000 | −6 | Y |
| 504 | 1000100111 | 0 | 0111011000 | 0 | |
| 505 | 0111111001 | 4 | 1000000110 | −4 | Y |
| 506 | 0111111010 | 4 | 1000000101 | −4 | Y |
| 507 | 0111111011 | 6 | 1000000100 | −6 | Y |
| 508 | 1000110011 | 0 | 0111001100 | 0 | |
| 509 | 0111111101 | 6 | 1000000010 | −6 | Y |
| 510 | 1000111001 | 0 | 0111000110 | 0 | |
| 511 | 1001101100 | 0 | 0110010011 | 0 | |

A "primary" mapping for the 9B/10B code of Table 1 prepends a 0 bit to the input symbol so that disparity of the resulting code word (the number of "one" bits thereof minus the number of "0" bits thereof) is less than the disparity of the input symbol, and complements the resulting code word if its disparity is negative. This determines the 408 code words of the positive disparity codebook (set forth in Table 1 in the second column from the left) to which the input symbols are mapped by the primary mapping. Each code word in the positive disparity codebook (sometimes referred to as the "positive" codebook) has the non-negative disparity indicated (in the third column from the left in Table 1).

Table 1 includes decimal representations of the input symbol. However, in typical implementations of the invention, binary versions of input symbols are encoded using an NB/(N+1)B block code (e.g., the block code of Table 1), and the resulting binary code words are used in accordance with the invention.

With reference to Table 1, the complement of each code word of positive disparity codebook determines the code word of the negative disparity codebook to which the relevant input symbol maps. This determines the 408 code words of the negative disparity codebook (set forth in Table 1 in the fourth column from the left) to which the input symbols are mapped by the primary mapping. Each code word in the negative disparity codebook (sometimes referred to as the "negative" codebook) has the non-positive disparity indicated (in the second column from the right in Table 1).

A secondary mapping for the 9B/10B code of Table 1 determines those code words in each row of Table 1 in which there is no "Y" symbol in the right column. (The primary mapping for this code determines those code words in each row of Table 1 in which there is a "Y" symbol in the right column).

Each input symbol maps to both a code word in the positive disparity codebook and a code word in the negative disparity codebook. The choice of which code word is used to encode each input symbol (in a sequence of input symbols to be encoded) is determined by the cumulative disparity of the code words that have been used to encode the previous input symbols in the sequence. More specifically, the code word from the positive codebook is used if the cumulative disparity is less than zero, and the code word from the negative codebook is used if the cumulative disparity is greater than or equal to zero.

For example, if the first input symbol (in a sequence of input symbols to be encoded) is the symbol "0" (the binary word 000000000), this input symbol is mapped to the code word "1001000111" from the positive codebook. Because this code word is determined by the secondary mapping, a table lookup is typically used to generate the code word in response to the input symbol.

If the next input symbol (in the same sequence) is the symbol "65" (the binary word 001000001), this input symbol is mapped to the code word "1110111110" from the positive codebook. This code word is determined by the primary mapping, so that typically, logic circuitry (rather than table lookup circuitry) is used to generate the code word in response to the input symbol.

If the third input symbol (in the same sequence) is also the symbol "65" (the binary word 001000001), this input symbol is mapped to the code word "0001000001" from the negative codebook (since the cumulative disparity of the two previously generated code words is a positive number, 6).

The code words of the 9B/10B code of Table 1 are selected so that each code word has disparity in the range of [−6, 6] (even values only), so that each sequence of the code words has a maximum run length of 7, a running digital sum variation of 10, a transition density of at least 30% (i.e. at least 3 transitions per code word), and so that only a relative small number of input symbols (i.e., 104 symbols of the total set of 512 symbols) do not have a successful primary mapping (i.e., each of the positive and negative codebooks has 104 symbols that are determined by the secondary mapping). The code of Table 1 has an average of 5.207 transitions per code word (over all legal code word pairs). Error magnification is minimized so that only 16% to 17% of single bit errors result in a burst error of 6, 7, 8, or 9 bits in the decoded symbol.

Table 2 sets forth examples of special characters ("out-of-band" or "OOB" characters) that can be inserted in a stream of code words generated in accordance with the 9B/10B code of Table 1 (or the 9B/10B code of Table 4 or Table 5, described below).

TABLE 2

9B/10B Out-of-Band Codes

| OOB Code | Positive | | Negative | |
| --- | --- | --- | --- | --- |
| | Preamble | Discriminant | Preamble | Discriminant |
| OOB00 | 1100000000 | 1111111001 | 0011111111 | 0000000110 |
| OOB01 | 1100000000 | 1111110011 | 0011111111 | 0000001100 |
| OOB02 | 1100000000 | 1111100111 | 0011111111 | 0000011000 |
| OOB03 | 1100000000 | 1111111010 | 0011111111 | 0000000101 |
| OOB04 | 1100000000 | 1111110101 | 0011111111 | 0000001010 |
| OOB05 | 1100000000 | 1111101011 | 0011111111 | 0000010100 |
| OOB06 | 1100000000 | 1111010111 | 0011111111 | 0000101000 |
| OOB07 | 1100000000 | 1111110110 | 0011111111 | 0000001001 |
| OOB08 | 1100000000 | 1111101101 | 0011111111 | 0000010010 |
| OOB09 | 1100000000 | 1111011011 | 0011111111 | 0000100100 |
| OOB10 | 1100000000 | 1110110111 | 0011111111 | 0001001000 |
| OOB11 | 1100000000 | 1111101110 | 0011111111 | 0000010001 |
| OOB12 | 1100000000 | 1111011101 | 0011111111 | 0000100010 |
| OOB13 | 1100000000 | 1110111011 | 0011111111 | 0001000100 |
| OOB14 | 1100000000 | 1101110111 | 0011111111 | 0010001000 |
| OOB15 | 1100000000 | 1111011110 | 0011111111 | 0000100001 |
| OOB16 | 1100000000 | 1110111101 | 0011111111 | 0001000010 |
| OOB17 | 1100000000 | 1101111011 | 0011111111 | 0010000100 |
| OOB18 | 1100000000 | 1011110111 | 0011111111 | 0100001000 |
| OOB19 | 1100000000 | 1110111110 | 0011111111 | 0001000001 |
| OOB20 | 1100000000 | 1101111101 | 0011111111 | 0010000010 |
| OOB21 | 1100000000 | 1011111011 | 0011111111 | 0100000100 |
| OOB22 | 1100000000 | 1101111110 | 0011111111 | 0010000001 |
| OOB23 | 1100000000 | 1011111101 | 0011111111 | 0100000010 |
| OOB24 | 1100000000 | 1011111110 | 0011111111 | 0100000001 |

In Table 2, each special character consists of a 10-bit preamble followed by a 10-bit discriminant pattern. Each special character is thus a sequence of two, 10-bit words. The preamble contains a run of eight 0s or 1s, which guarantees it never appears in a legal sequence of 9B/10B code words (assuming that the Table 1, Table 4, or Table 5 implementation of the 9B/10B code is employed). Thus, the preamble can be used to establish symbol alignment. The preamble is commonly referred to as the "comma," "comma character," or "comma symbol."

The discriminant identifies the code type. Applications may assign logical meanings to the OOB codes as necessary. For example, one OOB code can be used as an "idle" character (of a type described elsewhere herein) for simplex or duplex flow control, another can be used as a "link training" character (of a type described elsewhere herein), and others can be used as "state exchange" characters ("Si") of a type described elsewhere herein. A particular application may choose to use a subset of the possible OOB values in order to increase the Hamming distance between allowable codes, thereby reducing the probability of missing errors in the transmitted characters.

Each OOB code has a "positive" and "negative" version. "Positive" OOB codes are used when the current running disparity is positive. "Negative" OOB codes are used when the current running disparity is negative. This ensures that the maximum digital sum variation does not grow too large. OOB code bits are transmitted MSB first, where the MSB is depicted on the left in Table 2. It is an error to transmit or receive a sequence with a run of eight (or more) identical bits that does not match an OOB code, and it is also an error to transmit or receive a positive OOB code when current running disparity is negative or a negative OOB code when current running disparity is positive.

Since all the OOB codes start with a run of length two and end with runs of length no more than three, they may be inserted between any pair of 9B/10B code words (assuming that the 9B/10B code words begin and end with runs of length no greater than four in all cases) without producing a run of length greater than seven (except for the run of length eight within the preamble).

We next describe the 7B/8B code whose code words are set forth as Table 3.

TABLE 3

| Symbol | Positive Code | Positive Disparity | Negative Code | Negative Disparity | Primary Mapping? |
|---|---|---|---|---|---|
| 0 | 11000011 | 0 | 00111100 | 0 | |
| 1 | 10001110 | 0 | 01110001 | 0 | |
| 2 | 10001101 | 0 | 01110010 | 0 | |
| 3 | 11100100 | 0 | 00011011 | 0 | |
| 4 | 10001011 | 0 | 01110100 | 0 | |
| 5 | 11101000 | 0 | 00010111 | 0 | |
| 6 | 11000101 | 0 | 00111010 | 0 | |
| 7 | 11000110 | 0 | 00111001 | 0 | |
| 8 | 10000111 | 0 | 01111000 | 0 | |
| 9 | 11001010 | 0 | 00110101 | 0 | |
| 10 | 11001001 | 0 | 00110110 | 0 | |
| 11 | 11010100 | 0 | 00101011 | 0 | |
| 12 | 10010011 | 0 | 01101100 | 0 | |
| 13 | 11011000 | 0 | 00100111 | 0 | |
| 14 | 10010101 | 0 | 01101010 | 0 | |
| 15 | 10011010 | 0 | 01100101 | 0 | |
| 16 | 11100001 | 0 | 00011110 | 0 | |
| 17 | 11101110 | 4 | 00010001 | −4 | Y |
| 18 | 11101101 | 4 | 00010010 | −4 | Y |
| 19 | 11101100 | 2 | 00010011 | −2 | Y |
| 20 | 11101011 | 4 | 00010100 | −4 | Y |
| 21 | 11101010 | 2 | 00010101 | −2 | Y |
| 22 | 11101001 | 2 | 00010110 | −2 | Y |
| 23 | 00010111 | 0 | 11101000 | 0 | Y |
| 24 | 11100111 | 4 | 00011000 | −4 | Y |
| 25 | 11100110 | 2 | 00011001 | −2 | Y |
| 26 | 11100101 | 2 | 00011010 | −2 | Y |
| 27 | 00011011 | 0 | 11100100 | 0 | Y |
| 28 | 11100011 | 2 | 00011100 | −2 | Y |
| 29 | 00011101 | 0 | 11100010 | 0 | Y |
| 30 | 00011110 | 0 | 11100001 | 0 | Y |
| 31 | 11100010 | 0 | 00011101 | 0 | |
| 32 | 11010001 | 0 | 00101110 | 0 | |
| 33 | 11011110 | 4 | 00100001 | −4 | Y |
| 34 | 11011101 | 4 | 00100010 | −4 | Y |
| 35 | 11011100 | 2 | 00100011 | −2 | Y |
| 36 | 11011011 | 4 | 00100100 | −4 | Y |
| 37 | 11011010 | 2 | 00100101 | −2 | Y |
| 38 | 11011001 | 2 | 00100110 | −2 | Y |
| 39 | 00100111 | 0 | 11011000 | 0 | Y |
| 40 | 11010111 | 4 | 00101000 | −4 | Y |
| 41 | 11010110 | 2 | 00101001 | −2 | Y |
| 42 | 11010101 | 2 | 00101010 | −2 | Y |
| 43 | 00101011 | 0 | 11010100 | 0 | Y |
| 44 | 11010011 | 2 | 00101100 | −2 | Y |
| 45 | 00101101 | 0 | 11010010 | 0 | Y |
| 46 | 00101110 | 0 | 11010001 | 0 | Y |
| 47 | 11010010 | 0 | 00101101 | 0 | |
| 48 | 10100011 | 0 | 01011100 | 0 | |
| 49 | 11001110 | 2 | 00110001 | −2 | Y |
| 50 | 11001101 | 2 | 00110010 | −2 | Y |
| 51 | 00110011 | 0 | 11001100 | 0 | Y |
| 52 | 11001011 | 2 | 00110100 | −2 | Y |
| 53 | 00110101 | 0 | 11001010 | 0 | Y |
| 54 | 00110110 | 0 | 11001001 | 0 | Y |
| 55 | 00110111 | 2 | 11001000 | −2 | Y |
| 56 | 11000111 | 2 | 00111000 | −2 | Y |
| 57 | 00111001 | 0 | 11000110 | 0 | Y |
| 58 | 00111010 | 0 | 11000101 | 0 | Y |
| 59 | 00111011 | 2 | 11000100 | −2 | Y |
| 60 | 00111100 | 0 | 11000011 | 0 | Y |
| 61 | 00111101 | 2 | 11000010 | −2 | Y |
| 62 | 00111110 | 2 | 11000001 | −2 | Y |
| 63 | 11001100 | 0 | 00110011 | 0 | |

TABLE 3-continued

| Symbol | Positive Code | Positive Disparity | Negative Code | Negative Disparity | Primary Mapping? |
|---|---|---|---|---|---|
| 64 | 10110001 | 0 | 01001110 | 0 | |
| 65 | 10111110 | 4 | 01000001 | −4 | Y |
| 66 | 10111101 | 4 | 01000010 | −4 | Y |
| 67 | 10111100 | 2 | 01000011 | −2 | Y |
| 68 | 10111011 | 4 | 01000100 | −4 | Y |
| 69 | 10111010 | 2 | 01000101 | −2 | Y |
| 70 | 10111001 | 2 | 01000110 | −2 | Y |
| 71 | 01000111 | 0 | 10111000 | 0 | Y |
| 72 | 10110111 | 4 | 01001000 | −4 | Y |
| 73 | 10110110 | 2 | 01001001 | −2 | Y |
| 74 | 10110101 | 2 | 01001010 | −2 | Y |
| 75 | 01001011 | 0 | 10110100 | 0 | Y |
| 76 | 10110011 | 2 | 01001100 | −2 | Y |
| 77 | 01001101 | 0 | 10110010 | 0 | Y |
| 78 | 01001110 | 0 | 10110001 | 0 | Y |
| 79 | 10110010 | 0 | 01001101 | 0 | |
| 80 | 10100100 | 0 | 01001011 | 0 | |
| 81 | 10101110 | 2 | 01010001 | −2 | Y |
| 82 | 10101101 | 2 | 01010010 | −2 | Y |
| 83 | 01010011 | 0 | 10101100 | 0 | Y |
| 84 | 10101011 | 2 | 01010100 | −2 | Y |
| 85 | 01010101 | 0 | 10101010 | 0 | Y |
| 86 | 01010110 | 0 | 10101001 | 0 | Y |
| 87 | 01010111 | 2 | 10101000 | −2 | Y |
| 88 | 10100111 | 2 | 01011000 | −2 | Y |
| 89 | 01011001 | 0 | 10100110 | 0 | Y |
| 90 | 01011010 | 0 | 10100101 | 0 | Y |
| 91 | 01011011 | 2 | 10100100 | −2 | Y |
| 92 | 01011100 | 0 | 10100011 | 0 | Y |
| 93 | 01011101 | 2 | 10100010 | −2 | Y |
| 94 | 01011110 | 2 | 10100001 | −2 | Y |
| 95 | 10101100 | 0 | 01010011 | 0 | |
| 96 | 10011001 | 0 | 01100110 | 0 | |
| 97 | 10011110 | 2 | 01100001 | −2 | Y |
| 98 | 10011101 | 2 | 01100010 | −2 | Y |
| 99 | 01100011 | 0 | 10011100 | 0 | Y |
| 100 | 10011011 | 2 | 01100100 | −2 | Y |
| 101 | 01100101 | 0 | 10011010 | 0 | Y |
| 102 | 01100110 | 0 | 10011001 | 0 | Y |
| 103 | 01100111 | 2 | 10011000 | −2 | Y |
| 104 | 10010111 | 2 | 01101000 | −2 | Y |
| 105 | 01101001 | 0 | 10010110 | 0 | Y |
| 106 | 01101010 | 0 | 10010101 | 0 | Y |
| 107 | 01101011 | 2 | 10010100 | −2 | Y |
| 108 | 01101100 | 0 | 10010011 | 0 | Y |
| 109 | 01101101 | 2 | 10010010 | −2 | Y |
| 110 | 01101110 | 2 | 10010001 | −2 | Y |
| 111 | 10011100 | 0 | 01100011 | 0 | |
| 112 | 10100101 | 0 | 01011010 | 0 | |
| 113 | 01110001 | 0 | 10001110 | 0 | Y |
| 114 | 01110010 | 0 | 10001101 | 0 | Y |
| 115 | 01110011 | 2 | 10001100 | −2 | Y |
| 116 | 01110100 | 0 | 10001011 | 0 | Y |
| 117 | 01110101 | 2 | 10001010 | −2 | Y |
| 118 | 01110110 | 2 | 10001001 | −2 | Y |
| 119 | 01110111 | 4 | 10001000 | −4 | Y |
| 120 | 01111000 | 0 | 10000111 | 0 | Y |
| 121 | 01111001 | 2 | 10000110 | −2 | Y |
| 122 | 01111010 | 2 | 10000101 | −2 | Y |
| 123 | 01111011 | 4 | 10000100 | −4 | Y |
| 124 | 01111100 | 2 | 10000011 | −2 | Y |
| 125 | 01111101 | 4 | 10000010 | −4 | Y |
| 126 | 01111110 | 4 | 10000001 | −4 | Y |
| 127 | 10010110 | 0 | 01101001 | 0 | |

The primary mapping for the 7B/8B code of Table 3 also prepends a 0 bit to the input symbol so that disparity of the resulting code word (the number of "one" bits thereof minus the number of "0" bits thereof) is less than the disparity of the input symbol, and complements the resulting code word if its disparity is negative. This determines the 98 code words of the positive disparity codebook (set forth in Table 3 in the second column from the left) to which the input symbols are mapped by the primary mapping. Each code word in the positive disparity codebook (sometimes referred to as the "positive" codebook) has the non-negative disparity indicated (in the third column from the left in Table 3).

The complement of each code word of positive disparity codebook determines the code word of the negative disparity codebook to which the relevant input symbol maps. This determines the 98 code words of the negative disparity codebook (set forth in Table 3 in the fourth column from the left) to which the input symbols are mapped by the primary mapping. Each code word in the negative disparity codebook (sometimes referred to as the "negative" codebook) has the non-positive disparity indicated (in the second column from the right in Table 3).

The secondary mapping for the 7B/8B code of Table 3 determines those code words in each row of Table 3 in which there is no "Y" symbol in the right column. (The primary mapping for this code determines those code words in each row of Table 3 in which there is a "Y" symbol in the right column).

Each input symbol maps to both a code word in the positive disparity codebook and a code word in the negative disparity codebook. The choice of which code word is used to encode each input symbol (in a sequence of input symbols to be encoded) is determined by the cumulative disparity of the code words that have been used to encode the previous input symbols in the sequence. More specifically, the code word from the positive codebook is used if the cumulative disparity is less than zero, and the code word from the negative codebook is used if the cumulative disparity is greater than or equal to zero.

The code words of the 7B/8B code of Table 3 are selected so that each code word has disparity in the range of [−4, 4] (even values only), so that each sequence of the code words has a maximum run length of 6, a running digital sum range of 16, a minimum transition density of 25% (i.e. at least 2 transitions per code word), and an average transition density of 4.181 transitions per code word (over all legal code word pairs) so that only a relative small number of input symbols (i.e., 30 symbols of the total set of 128 symbols) do not have a successful primary mapping (i.e., each of the positive and negative codebooks has 30 symbols that are determined by the secondary mapping). The normalized DC offset is 4.75. Error magnification is minimized so that only 10% of single bit errors result in a burst error of 6 or 7 bits in the decoded symbol.

In variations on the code set forth in Table 3 (or Table 1), the positive and negative codebooks are not strictly complements of each other. Rather, the code words having nonzero disparity are identical to those of Table 3 (or 1), so that the code words of the negative codebook having nonzero disparity are complements of corresponding code words of the positive codebook, but the code words of the negative codebook that have zero disparity are identical to corresponding code words of the positive codebook. The code words having zero disparity can be either the zero-disparity code words of the positive codebook of Table 3 (or 1) or the zero-disparity code words of the negative codebook of Table 3 (or 1).

We next describe the 9B/10B code whose code words are set forth as Table 4.

TABLE 4

| Symbol | Positive Code | Positive Disparity | Negative Code | Negative Disparity | Primary Mapping? |
| --- | --- | --- | --- | --- | --- |
| 0 | 1100010011 | 0 | 0011101100 | 0 | N |
| 1 | 1000011110 | 0 | 0111100001 | 0 | N |

TABLE 4-continued

| Symbol | Positive Code | Positive Disparity | Negative Code | Negative Disparity | Primary Mapping? |
| --- | --- | --- | --- | --- | --- |
| 2 | 1000011101 | 0 | 0111100010 | 0 | N |
| 3 | 1110000110 | 0 | 0001111001 | 0 | N |
| 4 | 1000011011 | 0 | 0111100100 | 0 | N |
| 5 | 1110001010 | 0 | 0001110101 | 0 | N |
| 6 | 1110000101 | 0 | 0001111010 | 0 | N |
| 7 | 1110010010 | 0 | 0001101101 | 0 | N |
| 8 | 1000010111 | 0 | 0111101000 | 0 | N |
| 9 | 1110010100 | 0 | 0001101011 | 0 | N |
| 10 | 1110001001 | 0 | 0001110110 | 0 | N |
| 11 | 1100010110 | 0 | 0011101001 | 0 | N |
| 12 | 1100100011 | 0 | 0011011100 | 0 | N |
| 13 | 1100011010 | 0 | 0011100101 | 0 | N |
| 14 | 1110010001 | 0 | 0001101110 | 0 | N |
| 15 | 1100100110 | 0 | 0011011001 | 0 | N |
| 16 | 1101000011 | 0 | 0010111100 | 0 | N |
| 17 | 1100001110 | 0 | 0011110001 | 0 | N |
| 18 | 1100001101 | 0 | 0011110010 | 0 | N |
| 19 | 1100101010 | 0 | 0011010101 | 0 | N |
| 20 | 1100001011 | 0 | 0011110100 | 0 | N |
| 21 | 1100110010 | 0 | 0011001101 | 0 | N |
| 22 | 1100010101 | 0 | 0011101010 | 0 | N |
| 23 | 1101000110 | 0 | 0010111001 | 0 | N |
| 24 | 1100000111 | 0 | 0011111000 | 0 | N |
| 25 | 1101001010 | 0 | 0010110101 | 0 | N |
| 26 | 1100011001 | 0 | 0011100110 | 0 | N |
| 27 | 1101010010 | 0 | 0010101101 | 0 | N |
| 28 | 1000110011 | 0 | 0111001100 | 0 | N |
| 29 | 1101010100 | 0 | 0010101011 | 0 | N |
| 30 | 1100100101 | 0 | 0011011010 | 0 | N |
| 31 | 1001110010 | 0 | 0110001101 | 0 | N |
| 32 | 1001010011 | 0 | 0110101100 | 0 | N |
| 33 | 1000101110 | 0 | 0111010001 | 0 | N |
| 34 | 1000101101 | 0 | 0111010010 | 0 | N |
| 35 | 1111011100 | 4 | 0000100011 | −4 | Y |
| 36 | 1000101011 | 0 | 0111010100 | 0 | N |
| 37 | 1111011010 | 4 | 0000100101 | −4 | Y |
| 38 | 1111011001 | 4 | 0000100110 | −4 | Y |
| 39 | 1111011000 | 2 | 0000100111 | −2 | Y |
| 40 | 1000100111 | 0 | 0111011000 | 0 | N |
| 41 | 1111010110 | 4 | 0000101001 | −4 | Y |
| 42 | 1111010101 | 4 | 0000101010 | −4 | Y |
| 43 | 1111010100 | 2 | 0000101011 | −2 | Y |
| 44 | 1111010011 | 4 | 0000101100 | −4 | Y |
| 45 | 1111010010 | 2 | 0000101101 | −2 | Y |
| 46 | 1111010001 | 2 | 0000101110 | −2 | Y |
| 47 | 1010010110 | 0 | 0101101001 | 0 | N |
| 48 | 1001100011 | 0 | 0110011100 | 0 | N |
| 49 | 1111001110 | 4 | 0000110001 | −4 | Y |
| 50 | 1111001101 | 4 | 0000110010 | −4 | Y |
| 51 | 1111001100 | 2 | 0000110011 | −2 | Y |
| 52 | 1111001011 | 4 | 0000110100 | −4 | Y |
| 53 | 1111001010 | 2 | 0000110101 | −2 | Y |
| 54 | 1111001001 | 2 | 0000110110 | −2 | Y |
| 55 | 1010011010 | 0 | 0101100101 | 0 | N |
| 56 | 1111000111 | 4 | 0000111000 | −4 | Y |
| 57 | 1111000110 | 2 | 0000111001 | −2 | Y |
| 58 | 1111000101 | 2 | 0000111010 | −2 | Y |
| 59 | 1010100110 | 0 | 0101011001 | 0 | N |
| 60 | 1111000011 | 2 | 0000111100 | −2 | Y |
| 61 | 1010101010 | 0 | 0101010101 | 0 | N |
| 62 | 1100101001 | 0 | 0011010110 | 0 | N |
| 63 | 1010110010 | 0 | 0101001101 | 0 | N |
| 64 | 1110100001 | 0 | 0001011110 | 0 | N |
| 65 | 1001001110 | 0 | 0110110001 | 0 | N |
| 66 | 1001001101 | 0 | 0110110010 | 0 | N |
| 67 | 1110111100 | 4 | 0001000011 | −4 | Y |
| 68 | 1110000011 | 0 | 0001111100 | 0 | N |
| 69 | 1110111010 | 4 | 0001000101 | −4 | Y |
| 70 | 1110111001 | 4 | 0001000110 | −4 | Y |
| 71 | 1110111000 | 2 | 0001000111 | −2 | Y |
| 72 | 1001000111 | 0 | 0110111000 | 0 | N |
| 73 | 1110110110 | 4 | 0001001001 | −4 | Y |
| 74 | 1110110101 | 4 | 0001001010 | −4 | Y |
| 75 | 1110110100 | 2 | 0001001011 | −2 | Y |
| 76 | 1110110011 | 4 | 0001001100 | −4 | Y |
| 77 | 1110110010 | 2 | 0001001101 | −2 | Y |

TABLE 4-continued

| Symbol | Positive Code | Positive Disparity | Negative Code | Negative Disparity | Primary Mapping? |
|---|---|---|---|---|---|
| 78 | 1110110001 | 2 | 0001001110 | −2 | Y |
| 79 | 1110100010 | 0 | 0001011101 | 0 | N |
| 80 | 1110101000 | 0 | 0001010111 | 0 | N |
| 81 | 1110101110 | 4 | 0001010001 | −4 | Y |
| 82 | 1110101101 | 4 | 0001010010 | −4 | Y |
| 83 | 1110101100 | 2 | 0001010011 | −2 | Y |
| 84 | 1110101011 | 4 | 0001010100 | −4 | Y |
| 85 | 1110101010 | 2 | 0001010101 | −2 | Y |
| 86 | 1110101001 | 2 | 0001010110 | −2 | Y |
| 87 | 0001010111 | 0 | 1110101000 | 0 | Y |
| 88 | 1110100111 | 4 | 0001011000 | −4 | Y |
| 89 | 1110100110 | 2 | 0001011001 | −2 | Y |
| 90 | 1110100101 | 2 | 0001011010 | −2 | Y |
| 91 | 0001011011 | 0 | 1110100100 | 0 | Y |
| 92 | 1110100011 | 2 | 0001011100 | −2 | Y |
| 93 | 0001011101 | 0 | 1110100010 | 0 | Y |
| 94 | 0001011110 | 0 | 1110100001 | 0 | Y |
| 95 | 1110100100 | 0 | 0001011011 | 0 | N |
| 96 | 1010010011 | 0 | 0101101100 | 0 | N |
| 97 | 1110011110 | 4 | 0001100001 | −4 | Y |
| 98 | 1110011101 | 4 | 0001100010 | −4 | Y |
| 99 | 1110011100 | 2 | 0001100011 | −2 | Y |
| 100 | 1110011011 | 4 | 0001100100 | −4 | Y |
| 101 | 1110011010 | 2 | 0001100101 | −2 | Y |
| 102 | 1110011001 | 2 | 0001100110 | −2 | Y |
| 103 | 0001100111 | 0 | 1110011000 | 0 | Y |
| 104 | 1110010111 | 4 | 0001101000 | −4 | Y |
| 105 | 1110010110 | 2 | 0001101001 | −2 | Y |
| 106 | 1110010101 | 2 | 0001101010 | −2 | Y |
| 107 | 0001101011 | 0 | 1110010100 | 0 | Y |
| 108 | 1110010011 | 2 | 0001101100 | −2 | Y |
| 109 | 0001101101 | 0 | 1110010010 | 0 | Y |
| 110 | 0001101110 | 0 | 1110010001 | 0 | Y |
| 111 | 1110010000 | 0 | 0001100111 | 0 | N |
| 112 | 1010100011 | 0 | 0101011100 | 0 | N |
| 113 | 1110001110 | 2 | 0001110001 | −2 | Y |
| 114 | 1110001101 | 2 | 0001110010 | −2 | Y |
| 115 | 0001110011 | 0 | 1110001100 | 0 | Y |
| 116 | 1110001011 | 2 | 0001110100 | −2 | Y |
| 117 | 0001110101 | 0 | 1110001010 | 0 | Y |
| 118 | 0001110110 | 0 | 1110001001 | 0 | Y |
| 119 | 0001110111 | 2 | 1110001000 | −2 | Y |
| 120 | 1110000111 | 2 | 0001111000 | −2 | Y |
| 121 | 0001111001 | 0 | 1110000110 | 0 | Y |
| 122 | 0001111010 | 0 | 1110000101 | 0 | Y |
| 123 | 0001111011 | 2 | 1110000100 | −2 | Y |
| 124 | 0001111100 | 0 | 1110000011 | 0 | Y |
| 125 | 0001111101 | 2 | 1110000010 | −2 | Y |
| 126 | 0001111110 | 2 | 1110000001 | −2 | Y |
| 127 | 1110001100 | 0 | 0001110011 | 0 | N |
| 128 | 1101100001 | 0 | 0010011110 | 0 | N |
| 129 | 1010001110 | 0 | 0101110001 | 0 | N |
| 130 | 1010001101 | 0 | 0101110010 | 0 | N |
| 131 | 1101111100 | 4 | 0010000011 | −4 | Y |
| 132 | 1001001011 | 0 | 0110010100 | 0 | N |
| 133 | 1101111010 | 4 | 0010000101 | −4 | Y |
| 134 | 1101111001 | 4 | 0010000110 | −4 | Y |
| 135 | 1101111000 | 2 | 0010000111 | −2 | Y |
| 136 | 1010000111 | 0 | 0101111000 | 0 | N |
| 137 | 1101110110 | 4 | 0010001001 | −4 | Y |
| 138 | 1101110101 | 4 | 0010001010 | −4 | Y |
| 139 | 1101110100 | 2 | 0010001011 | −2 | Y |
| 140 | 1101110011 | 4 | 0010001100 | −4 | Y |
| 141 | 1101110010 | 2 | 0010001101 | −2 | Y |
| 142 | 1101110001 | 2 | 0010001110 | −2 | Y |
| 143 | 1101100010 | 0 | 0010011101 | 0 | N |
| 144 | 1101101000 | 0 | 0010010111 | 0 | N |
| 145 | 1101101110 | 4 | 0010010001 | −4 | Y |
| 146 | 1101101101 | 4 | 0010010010 | −4 | Y |
| 147 | 1101101100 | 2 | 0010010011 | −2 | Y |
| 148 | 1101101011 | 4 | 0010010100 | −4 | Y |
| 149 | 1101101010 | 2 | 0010010101 | −2 | Y |
| 150 | 1101101001 | 2 | 0010010110 | −2 | Y |
| 151 | 0010010111 | 0 | 1101101000 | 0 | Y |
| 152 | 1101100111 | 4 | 0010011000 | −4 | Y |
| 153 | 1101100110 | 2 | 0010011001 | −2 | Y |
| 154 | 1101100101 | 2 | 0010011010 | −2 | Y |
| 155 | 0010011011 | 0 | 1101100100 | 0 | Y |
| 156 | 1101100011 | 2 | 0010011100 | −2 | Y |
| 157 | 0010011101 | 0 | 1101100010 | 0 | Y |
| 158 | 0010011110 | 0 | 1101100001 | 0 | Y |
| 159 | 1101100100 | 0 | 0010011011 | 0 | N |
| 160 | 1011000011 | 0 | 0100111100 | 0 | N |
| 161 | 1101011110 | 4 | 0010100001 | −4 | Y |
| 162 | 1101011101 | 4 | 0010100010 | −4 | Y |
| 163 | 1101011100 | 2 | 0010100011 | −2 | Y |
| 164 | 1101011011 | 4 | 0010100100 | −4 | Y |
| 165 | 1101011010 | 2 | 0010100101 | −2 | Y |
| 166 | 1101011001 | 2 | 0010100110 | −2 | Y |
| 167 | 0010100111 | 0 | 1101011000 | 0 | Y |
| 168 | 1101010111 | 4 | 0010101000 | −4 | Y |
| 169 | 1101010110 | 2 | 0010101001 | −2 | Y |
| 170 | 1101010101 | 2 | 0010101010 | −2 | Y |
| 171 | 0010101011 | 0 | 1101010100 | 0 | Y |
| 172 | 1101010011 | 2 | 0010101100 | −2 | Y |
| 173 | 0010101101 | 0 | 1101010010 | 0 | Y |
| 174 | 0010101110 | 0 | 1101010001 | 0 | Y |
| 175 | 1101011000 | 0 | 0010100111 | 0 | N |
| 176 | 1100110001 | 0 | 0011001110 | 0 | N |
| 177 | 1101001110 | 2 | 0010110001 | −2 | Y |
| 178 | 1101001101 | 2 | 0010110010 | −2 | Y |
| 179 | 0010110011 | 0 | 1101001100 | 0 | Y |
| 180 | 1101001011 | 2 | 0010110100 | −2 | Y |
| 181 | 0010110101 | 0 | 1101001010 | 0 | Y |
| 182 | 0010110110 | 0 | 1101001001 | 0 | Y |
| 183 | 0010110111 | 2 | 1101001000 | −2 | Y |
| 184 | 1101000111 | 2 | 0010111000 | −2 | Y |
| 185 | 0010111001 | 0 | 1101000110 | 0 | Y |
| 186 | 0010111010 | 0 | 1101000101 | 0 | Y |
| 187 | 0010111011 | 2 | 1101000100 | −2 | Y |
| 188 | 0010111100 | 0 | 1101000011 | 0 | Y |
| 189 | 0010111101 | 2 | 1101000010 | −2 | Y |
| 190 | 0010111110 | 2 | 1101000001 | −2 | Y |
| 191 | 1101001100 | 0 | 0010110011 | 0 | N |
| 192 | 1101000101 | 0 | 0010111010 | 0 | N |
| 193 | 1100111110 | 4 | 0011000001 | −4 | Y |
| 194 | 1100111101 | 4 | 0011000010 | −4 | Y |
| 195 | 1100111100 | 2 | 0011000011 | −2 | Y |
| 196 | 1100111011 | 4 | 0011000100 | −4 | Y |
| 197 | 1100111010 | 2 | 0011000101 | −2 | Y |
| 198 | 1100111001 | 2 | 0011000110 | −2 | Y |
| 199 | 0011000111 | 0 | 1100111000 | 0 | Y |
| 200 | 1100110111 | 4 | 0011001000 | −4 | Y |
| 201 | 1100110110 | 2 | 0011001001 | −2 | Y |
| 202 | 1100110101 | 2 | 0011001010 | −2 | Y |
| 203 | 0011001011 | 0 | 1100110100 | 0 | Y |
| 204 | 1100110011 | 2 | 0011001100 | −2 | Y |
| 205 | 0011001101 | 0 | 1100110010 | 0 | Y |
| 206 | 0011001110 | 0 | 1100110001 | 0 | Y |
| 207 | 1100111000 | 0 | 0011000111 | 0 | N |
| 208 | 1101001001 | 0 | 0010110110 | 0 | N |
| 209 | 1100101110 | 2 | 0011010001 | −2 | Y |
| 210 | 1100101101 | 2 | 0011010010 | −2 | Y |
| 211 | 0011010011 | 0 | 1100101100 | 0 | Y |
| 212 | 1100101011 | 2 | 0011010100 | −2 | Y |
| 213 | 0011010101 | 0 | 1100101010 | 0 | Y |
| 214 | 0011010110 | 0 | 1100101001 | 0 | Y |
| 215 | 0011010111 | 2 | 1100101000 | −2 | Y |
| 216 | 1100100111 | 2 | 0011011000 | −2 | Y |
| 217 | 0011011001 | 0 | 1100100110 | 0 | Y |
| 218 | 0011011010 | 0 | 1100100101 | 0 | Y |
| 219 | 0011011011 | 2 | 1100100100 | −2 | Y |
| 220 | 0011011100 | 0 | 1100100011 | 0 | Y |
| 221 | 0011011101 | 2 | 1100100010 | −2 | Y |
| 222 | 0011011110 | 2 | 1100100001 | −2 | Y |
| 223 | 1100011100 | 0 | 0011100011 | 0 | N |
| 224 | 1101010001 | 0 | 0010101110 | 0 | N |
| 225 | 1100011110 | 2 | 0011100001 | −2 | Y |
| 226 | 1100011101 | 2 | 0011100010 | −2 | Y |
| 227 | 0011100011 | 0 | 1100011100 | 0 | Y |
| 228 | 1100011011 | 2 | 0011100100 | −2 | Y |
| 229 | 0011100101 | 0 | 1100011010 | 0 | Y |

TABLE 4-continued

| Symbol | Positive Code | Positive Disparity | Negative Code | Negative Disparity | Primary Mapping? |
|---|---|---|---|---|---|
| 230 | 0011100110 | 0 | 1100011001 | 0 | Y |
| 231 | 0011100111 | 2 | 1100011000 | −2 | Y |
| 232 | 1100010111 | 2 | 0011101000 | −2 | Y |
| 233 | 0011101001 | 0 | 1100010110 | 0 | Y |
| 234 | 0011101010 | 0 | 1100010101 | 0 | Y |
| 235 | 0011101011 | 2 | 1100010100 | −2 | Y |
| 236 | 0011101100 | 0 | 1100010011 | 0 | Y |
| 237 | 0011101101 | 2 | 1100010010 | −2 | Y |
| 238 | 0011101110 | 2 | 1100010001 | −2 | Y |
| 239 | 1100101100 | 0 | 0011010011 | 0 | N |
| 240 | 1000110101 | 0 | 0111001010 | 0 | N |
| 241 | 0011110001 | 0 | 1100001110 | 0 | Y |
| 242 | 0011110010 | 0 | 1100001101 | 0 | Y |
| 243 | 0011110011 | 2 | 1100001100 | −2 | Y |
| 244 | 0011110100 | 0 | 1100001011 | 0 | Y |
| 245 | 0011110101 | 2 | 1100001010 | −2 | Y |
| 246 | 0011110110 | 2 | 1100001001 | −2 | Y |
| 247 | 0011110111 | 4 | 1100001000 | −4 | Y |
| 248 | 0011111000 | 0 | 1100000111 | 0 | Y |
| 249 | 0011111001 | 2 | 1100000110 | −2 | Y |
| 250 | 0011111010 | 2 | 1100000101 | −2 | Y |
| 251 | 0011111011 | 4 | 1100000100 | −4 | Y |
| 252 | 0011111100 | 2 | 1100000011 | −2 | Y |
| 253 | 0011111101 | 4 | 1100000010 | −4 | Y |
| 254 | 0011111110 | 4 | 1100000001 | −4 | Y |
| 255 | 1100110100 | 0 | 0011001011 | 0 | N |
| 256 | 1011100001 | 0 | 0100011110 | 0 | N |
| 257 | 1011100010 | 0 | 0100011101 | 0 | N |
| 258 | 1011101000 | 0 | 0100010111 | 0 | N |
| 259 | 1011111100 | 4 | 0100000011 | −4 | Y |
| 260 | 1010001011 | 0 | 0101110100 | 0 | N |
| 261 | 1011111010 | 4 | 0100000101 | −4 | Y |
| 262 | 1011111001 | 4 | 0100000110 | −4 | Y |
| 263 | 1011111000 | 2 | 0100000111 | −2 | Y |
| 264 | 1001010101 | 0 | 0110101010 | 0 | N |
| 265 | 1011110110 | 4 | 0100001001 | −4 | Y |
| 266 | 1011110101 | 4 | 0100001010 | −4 | Y |
| 267 | 1011110100 | 2 | 0100001011 | −2 | Y |
| 268 | 1011110011 | 4 | 0100001100 | −4 | Y |
| 269 | 1011110010 | 2 | 0100001101 | −2 | Y |
| 270 | 1011110001 | 2 | 0100001110 | −2 | Y |
| 271 | 1011011000 | 0 | 0100100111 | 0 | N |
| 272 | 1001011001 | 0 | 0110100110 | 0 | N |
| 273 | 1011101110 | 4 | 0100010001 | −4 | Y |
| 274 | 1011101101 | 4 | 0100010010 | −4 | Y |
| 275 | 1011101100 | 2 | 0100010011 | −2 | Y |
| 276 | 1011101011 | 4 | 0100010100 | −4 | Y |
| 277 | 1011101010 | 2 | 0100010101 | −2 | Y |
| 278 | 1011101001 | 2 | 0100010110 | −2 | Y |
| 279 | 0100010111 | 0 | 1011101000 | 0 | Y |
| 280 | 1011100111 | 4 | 0100011000 | −4 | Y |
| 281 | 1011100110 | 2 | 0100011001 | −2 | Y |
| 282 | 1011100101 | 2 | 0100011010 | −2 | Y |
| 283 | 0100011011 | 0 | 1011100100 | 0 | Y |
| 284 | 1011100011 | 2 | 0100011100 | −2 | Y |
| 285 | 0100011101 | 0 | 1011100010 | 0 | Y |
| 286 | 0100011110 | 0 | 1011100001 | 0 | Y |
| 287 | 1011100100 | 0 | 0100011011 | 0 | N |
| 288 | 1001100101 | 0 | 0110011010 | 0 | N |
| 289 | 1011011110 | 4 | 0100100001 | −4 | Y |
| 290 | 1011011101 | 4 | 0100100010 | −4 | Y |
| 291 | 1011011100 | 2 | 0100100011 | −2 | Y |
| 292 | 1011011011 | 4 | 0100100100 | −4 | Y |
| 293 | 1011011010 | 2 | 0100100101 | −2 | Y |
| 294 | 1011011001 | 2 | 0100100110 | −2 | Y |
| 295 | 0100100111 | 0 | 1011011000 | 0 | Y |
| 296 | 1011010111 | 4 | 0100101000 | −4 | Y |
| 297 | 1011010110 | 2 | 0100101001 | −2 | Y |
| 298 | 1011010101 | 2 | 0100101010 | −2 | Y |
| 299 | 0100101011 | 0 | 1011010100 | 0 | Y |
| 300 | 1011010011 | 2 | 0100101100 | −2 | Y |
| 301 | 0100101101 | 0 | 1011010010 | 0 | Y |
| 302 | 0100101110 | 0 | 1011010001 | 0 | Y |
| 303 | 1010011100 | 0 | 0101100011 | 0 | N |
| 304 | 1001101001 | 0 | 0110010110 | 0 | N |
| 305 | 1011001110 | 2 | 0100110001 | −2 | Y |
| 306 | 1011001101 | 2 | 0100110010 | −2 | Y |
| 307 | 0100110011 | 0 | 1011001100 | 0 | Y |
| 308 | 1011001011 | 2 | 0100110100 | −2 | Y |
| 309 | 0100110101 | 0 | 1011001010 | 0 | Y |
| 310 | 0100110110 | 0 | 1011001001 | 0 | Y |
| 311 | 0100110111 | 2 | 1011001000 | −2 | Y |
| 312 | 1011000111 | 2 | 0100111000 | −2 | Y |
| 313 | 0100111001 | 0 | 1011000110 | 0 | Y |
| 314 | 0100111010 | 0 | 1011000101 | 0 | Y |
| 315 | 0100111011 | 2 | 1011000100 | −2 | Y |
| 316 | 0100111100 | 0 | 1011000011 | 0 | Y |
| 317 | 0100111101 | 2 | 1011000010 | −2 | Y |
| 318 | 0100111110 | 2 | 1011000001 | −2 | Y |
| 319 | 1010101100 | 0 | 0101010011 | 0 | N |
| 320 | 1001110001 | 0 | 0110001110 | 0 | N |
| 321 | 1010111110 | 4 | 0101000001 | −4 | Y |
| 322 | 1010111101 | 4 | 0101000010 | −4 | Y |
| 323 | 1010111100 | 2 | 0101000011 | −2 | Y |
| 324 | 1010111011 | 4 | 0101000100 | −4 | Y |
| 325 | 1010111010 | 2 | 0101000101 | −2 | Y |
| 326 | 1010111001 | 2 | 0101000110 | −2 | Y |
| 327 | 0101000111 | 0 | 1010111000 | 0 | Y |
| 328 | 1010110111 | 4 | 0101001000 | −4 | Y |
| 329 | 1010110110 | 2 | 0101001001 | −2 | Y |
| 330 | 1010110101 | 2 | 0101001010 | −2 | Y |
| 331 | 0101001011 | 0 | 1010110100 | 0 | Y |
| 332 | 1010110011 | 2 | 0101001100 | −2 | Y |
| 333 | 0101001101 | 0 | 1010110010 | 0 | Y |
| 334 | 0101001110 | 0 | 1010110001 | 0 | Y |
| 335 | 1010111000 | 0 | 0101000111 | 0 | N |
| 336 | 1010010101 | 0 | 0101101010 | 0 | N |
| 337 | 1010101110 | 2 | 0101010001 | −2 | Y |
| 338 | 1010101101 | 2 | 0101010010 | −2 | Y |
| 339 | 0101010011 | 0 | 1010101100 | 0 | Y |
| 340 | 1010101011 | 2 | 0101010100 | −2 | Y |
| 341 | 0101010101 | 0 | 1010101010 | 0 | Y |
| 342 | 0101010110 | 0 | 1010101001 | 0 | Y |
| 343 | 0101010111 | 2 | 1010101000 | −2 | Y |
| 344 | 1010100111 | 2 | 0101011000 | −2 | Y |
| 345 | 0101011001 | 0 | 1010100110 | 0 | Y |
| 346 | 0101011010 | 0 | 1010100101 | 0 | Y |
| 347 | 0101011011 | 2 | 1010100100 | −2 | Y |
| 348 | 0101011100 | 0 | 1010100011 | 0 | Y |
| 349 | 0101011101 | 2 | 1010100010 | −2 | Y |
| 350 | 0101011110 | 2 | 1010100001 | −2 | Y |
| 351 | 1010110100 | 0 | 0101001011 | 0 | N |
| 352 | 1010011001 | 0 | 0101100110 | 0 | N |
| 353 | 1010011110 | 2 | 0101100001 | −2 | Y |
| 354 | 1010011101 | 2 | 0101100010 | −2 | Y |
| 355 | 0101100011 | 0 | 1010011100 | 0 | Y |
| 356 | 1010011011 | 2 | 0101100100 | −2 | Y |
| 357 | 0101100101 | 0 | 1010011010 | 0 | Y |
| 358 | 0101100110 | 0 | 1010011001 | 0 | Y |
| 359 | 0101100111 | 2 | 1010011000 | −2 | Y |
| 360 | 1010010111 | 2 | 0101101000 | −2 | Y |
| 361 | 0101101001 | 0 | 1010010110 | 0 | Y |
| 362 | 0101101010 | 0 | 1010010101 | 0 | Y |
| 363 | 0101101011 | 2 | 1010010100 | −2 | Y |
| 364 | 0101101100 | 0 | 1010010011 | 0 | Y |
| 365 | 0101101101 | 2 | 1010010010 | −2 | Y |
| 366 | 0101101110 | 2 | 1010010001 | −2 | Y |
| 367 | 1011001100 | 0 | 0100110011 | 0 | N |
| 368 | 1010100110 | 0 | 0101011010 | 0 | N |
| 369 | 0101110001 | 0 | 1010001110 | 0 | Y |
| 370 | 0101110010 | 0 | 1010001101 | 0 | Y |
| 371 | 0101110011 | 2 | 1010001100 | −2 | Y |
| 372 | 0101110100 | 0 | 1010001011 | 0 | Y |
| 373 | 0101110101 | 2 | 1010001010 | −2 | Y |
| 374 | 0101110110 | 2 | 1010001001 | −2 | Y |
| 375 | 0101110111 | 4 | 1010001000 | −4 | Y |
| 376 | 0101111000 | 0 | 1010000111 | 0 | Y |
| 377 | 0101111001 | 2 | 1010000110 | −2 | Y |
| 378 | 0101111010 | 2 | 1010000101 | −2 | Y |
| 379 | 0101111011 | 4 | 1010000100 | −4 | Y |
| 380 | 0101111100 | 2 | 1010000011 | −2 | Y |
| 381 | 0101111101 | 4 | 1010000010 | −4 | Y |

TABLE 4-continued

| Symbol | Positive Code | Positive Disparity | Negative Code | Negative Disparity | Primary Mapping? |
|---|---|---|---|---|---|
| 382 | 0101111110 | 4 | 1010000001 | −4 | Y |
| 383 | 1011010100 | 0 | 0100101011 | 0 | N |
| 384 | 1010101001 | 0 | 0101010110 | 0 | N |
| 385 | 1001111110 | 4 | 0110000001 | −4 | Y |
| 386 | 1001111101 | 4 | 0110000010 | −4 | Y |
| 387 | 1001111100 | 2 | 0110000011 | −2 | Y |
| 388 | 1001111011 | 4 | 0110000100 | −4 | Y |
| 389 | 1001111010 | 2 | 0110000101 | −2 | Y |
| 390 | 1001111001 | 2 | 0110000110 | −2 | Y |
| 391 | 0110000111 | 0 | 1001111000 | 0 | Y |
| 392 | 1001110111 | 4 | 0110001000 | −4 | Y |
| 393 | 1001110110 | 2 | 0110001001 | −2 | Y |
| 394 | 1001110101 | 2 | 0110001010 | −2 | Y |
| 395 | 0110001011 | 0 | 1001110100 | 0 | Y |
| 396 | 1001110011 | 2 | 0110001100 | −2 | Y |
| 397 | 0110001101 | 0 | 1001110010 | 0 | Y |
| 398 | 0110001110 | 0 | 1001110001 | 0 | Y |
| 399 | 1001111000 | 0 | 0110000111 | 0 | N |
| 400 | 1010110001 | 0 | 0101001110 | 0 | N |
| 401 | 1001101110 | 2 | 0110010001 | −2 | Y |
| 402 | 1001101101 | 2 | 0110010010 | −2 | Y |
| 403 | 0110010011 | 0 | 1001101100 | 0 | Y |
| 404 | 1001101011 | 2 | 0110010100 | −2 | Y |
| 405 | 0110010101 | 0 | 1001101010 | 0 | Y |
| 406 | 0110010110 | 0 | 1001101001 | 0 | Y |
| 407 | 0110010111 | 2 | 1001101000 | −2 | Y |
| 408 | 1001100111 | 2 | 0110011000 | −2 | Y |
| 409 | 0110011001 | 0 | 1001100110 | 0 | Y |
| 410 | 0110011010 | 0 | 1001100101 | 0 | Y |
| 411 | 0110011011 | 2 | 1001100100 | −2 | Y |
| 412 | 0110011100 | 0 | 1001100011 | 0 | Y |
| 413 | 0110011101 | 2 | 1001100010 | −2 | Y |
| 414 | 0110011110 | 2 | 1001100001 | −2 | Y |
| 415 | 1001100110 | 0 | 0110100011 | 0 | N |
| 416 | 1011000101 | 0 | 0100111010 | 0 | N |
| 417 | 1001011110 | 2 | 0110100001 | −2 | Y |
| 418 | 1001011101 | 2 | 0110100010 | −2 | Y |
| 419 | 0110100100 | 0 | 1001011100 | 0 | Y |
| 420 | 1001011011 | 2 | 0110100100 | −2 | Y |
| 421 | 0110100101 | 0 | 1001011010 | 0 | Y |
| 422 | 0110100110 | 0 | 1001011001 | 0 | Y |
| 423 | 0110100111 | 2 | 1001011000 | −2 | Y |
| 424 | 1001010111 | 2 | 0110101000 | −2 | Y |
| 425 | 0110101001 | 0 | 1001010110 | 0 | Y |
| 426 | 0110101010 | 0 | 1001010101 | 0 | Y |
| 427 | 0110101011 | 2 | 1001010100 | −2 | Y |
| 428 | 0110101100 | 0 | 1001010011 | 0 | Y |
| 429 | 0110101101 | 2 | 1001010010 | −2 | Y |
| 430 | 0110101110 | 2 | 1001010001 | −2 | Y |
| 431 | 1001101100 | 0 | 0110010011 | 0 | N |
| 432 | 1011001001 | 0 | 0100110110 | 0 | N |
| 433 | 0110110001 | 0 | 1001001110 | 0 | Y |
| 434 | 0110110010 | 0 | 1001001101 | 0 | Y |
| 435 | 0110110011 | 2 | 1001001100 | −2 | Y |
| 436 | 0110110100 | 0 | 1001001011 | 0 | Y |
| 437 | 0110110101 | 2 | 1001001010 | −2 | Y |
| 438 | 0110110110 | 2 | 1001001001 | −2 | Y |
| 439 | 0110110111 | 4 | 1001001000 | −4 | Y |
| 440 | 0110111000 | 0 | 1001000111 | 0 | Y |
| 441 | 0110111001 | 2 | 1001000110 | −2 | Y |
| 442 | 0110111010 | 2 | 1001000101 | −2 | Y |
| 443 | 0110111011 | 4 | 1001000100 | −4 | Y |
| 444 | 0110111100 | 2 | 1001000011 | −2 | Y |
| 445 | 0110111101 | 4 | 1001000010 | −4 | Y |
| 446 | 0110111110 | 4 | 1001000001 | −4 | Y |
| 447 | 1001110100 | 0 | 0110001011 | 0 | N |
| 448 | 1011010001 | 0 | 0100101110 | 0 | N |
| 449 | 1000111110 | 2 | 0111000001 | −2 | Y |
| 450 | 1000111101 | 2 | 0111000010 | −2 | Y |
| 451 | 0111000011 | 0 | 1000111100 | 0 | Y |
| 452 | 1000111011 | 2 | 0111000100 | −2 | Y |
| 453 | 0111000101 | 0 | 1000111010 | 0 | Y |
| 454 | 0111000110 | 0 | 1000111001 | 0 | Y |
| 455 | 0111000111 | 2 | 1000111000 | −2 | Y |
| 456 | 1000110111 | 2 | 0111001000 | −2 | Y |
| 457 | 0111001001 | 0 | 1000110110 | 0 | Y |
| 458 | 0111001010 | 0 | 1000110101 | 0 | Y |
| 459 | 0111001011 | 2 | 1000110100 | −2 | Y |
| 460 | 0111001100 | 0 | 1000110011 | 0 | Y |
| 461 | 0111001101 | 2 | 1000110010 | −2 | Y |
| 462 | 0111001110 | 2 | 1000110001 | −2 | Y |
| 463 | 1000110110 | 0 | 0111001001 | 0 | N |
| 464 | 1011000110 | 0 | 0100111001 | 0 | N |
| 465 | 0111010001 | 0 | 1000101110 | 0 | Y |
| 466 | 0111010010 | 0 | 1000101101 | 0 | Y |
| 467 | 0111010011 | 2 | 1000101100 | −2 | Y |
| 468 | 0111010100 | 0 | 1000101011 | 0 | Y |
| 469 | 0111010101 | 2 | 1000101010 | −2 | Y |
| 470 | 0111010110 | 2 | 1000101001 | −2 | Y |
| 471 | 0111010111 | 4 | 1000101000 | −4 | Y |
| 472 | 0111011000 | 0 | 1000100111 | 0 | Y |
| 473 | 0111011001 | 2 | 1000100110 | −2 | Y |
| 474 | 0111011010 | 2 | 1000100101 | −2 | Y |
| 475 | 0111011011 | 4 | 1000100100 | −4 | Y |
| 476 | 0111011100 | 2 | 1000100011 | −2 | Y |
| 477 | 0111011101 | 4 | 1000100010 | −4 | Y |
| 478 | 0111011110 | 4 | 1000100001 | −4 | Y |
| 479 | 1001010110 | 0 | 0110101001 | 0 | N |
| 480 | 1011001010 | 0 | 0100110101 | 0 | N |
| 481 | 0111100001 | 0 | 1000011110 | 0 | Y |
| 482 | 0111100010 | 0 | 1000011101 | 0 | Y |
| 483 | 0111100011 | 2 | 1000011100 | −2 | Y |
| 484 | 0111100100 | 0 | 1000011011 | 0 | Y |
| 485 | 0111100101 | 2 | 1000011010 | −2 | Y |
| 486 | 0111100110 | 2 | 1000011001 | −2 | Y |
| 487 | 0111100111 | 4 | 1000011000 | −4 | Y |
| 488 | 0111101000 | 0 | 1000010111 | 0 | Y |
| 489 | 0111101001 | 2 | 1000010110 | −2 | Y |
| 490 | 0111101010 | 2 | 1000010101 | −2 | Y |
| 491 | 0111101011 | 4 | 1000010100 | −4 | Y |
| 492 | 0111101100 | 2 | 1000010011 | −2 | Y |
| 493 | 0111101101 | 4 | 1000010010 | −4 | Y |
| 494 | 0111101110 | 4 | 1000010001 | −4 | Y |
| 495 | 1001011100 | 0 | 0110100011 | 0 | N |
| 496 | 1011010010 | 0 | 0100101101 | 0 | N |
| 497 | 0111110001 | 2 | 1000001110 | −2 | Y |
| 498 | 0111110010 | 2 | 1000001101 | −2 | Y |
| 499 | 0111110011 | 4 | 1000001100 | −4 | Y |
| 500 | 0111110100 | 2 | 1000001011 | −2 | Y |
| 501 | 0111110101 | 4 | 1000001010 | −4 | Y |
| 502 | 0111110110 | 4 | 1000001001 | −4 | Y |
| 503 | 1001100100 | 0 | 0110011001 | 0 | N |
| 504 | 0111111000 | 2 | 1000000111 | −2 | Y |
| 505 | 0111111001 | 4 | 1000000110 | −4 | Y |
| 506 | 0111111010 | 4 | 1000000101 | −4 | Y |
| 507 | 1000111100 | 0 | 0111000011 | 0 | N |
| 508 | 0111111100 | 4 | 1000000011 | −4 | Y |
| 509 | 1000111010 | 0 | 0111000101 | 0 | N |
| 510 | 1000111001 | 0 | 0111000110 | 0 | N |
| 511 | 1001101010 | 0 | 0110010101 | 0 | N |

In Table 4, the 512 code words set forth in the second column from the left determine the positive disparity codebook of the Table 4 code to which the input symbols map. Each code word in the positive disparity codebook (sometimes referred to as the "positive" codebook) has the non-negative disparity indicated (in the third column from the left in Table 4). The complement of each code word of positive disparity codebook determines the code word of the negative disparity codebook to which the relevant input symbol maps. This determines the 512 code words of the negative disparity codebook (set forth in Table 4 in the fourth column from the left) to which the input symbols map. Each code word in the negative disparity codebook (sometimes referred to as the "negative" codebook) has the non-positive disparity indicated (in the second column from the right in Table 4).

The secondary mapping for the 9B/10B code of Table 4 determines those code words in each row of Table 4 in which there is an "N" symbol in the right column. (The primary mapping for this code determines those code words in each row of Table 4 in which there is a "Y" symbol in the right column).

The Table 4 code favors lower digital sum variation over higher transition density with the goal of providing better EMI characteristics for transmission of long distances. The code space is defined as follows:

each code word having disparity 0 has a run of length three or less on either end, and includes no run of length greater than six away from its ends;

each code word having disparity 2, −2, 4, or −4 has a run of length four or less on the left, a run of length three or less on the right, and includes no run of length greater than seven away from its ends;

no code word has disparity greater than 4 or less than −4; and no code word has less than 2 transitions.

The code set forth in Table 4 has a maximum run length of 7, a running digital sum variation of 16, an average of 5.248 transitions per code word (over all legal code word pairs), and a normalized DC offset of 4.9. Of the 512 code words in the positive codebook, only 116 are not determined by the primary mapping.

In variations on the code set forth in Table 4, the positive and negative codebooks are not strictly complements of each other. Rather, the code words having nonzero disparity are identical to those of Table 4 (the code words of the negative codebook having nonzero disparity are complements of corresponding code words of the positive codebook) but the code words of the negative codebook that have zero disparity are identical to corresponding code words of the positive codebook. The code words having zero disparity can be either the zero-disparity code words of the positive codebook of Table 4 or the zero-disparity code words of the negative codebook of Table 4.

We next describe the 9B/10B code whose code words are set forth as Table 5.

TABLE 5

| Symbol | Positive Code | Positive Disparity | Negative Code | Negative Disparity | Primary Mapping? |
|---|---|---|---|---|---|
| 0 | 1001000111 | 0 | 0110111000 | 0 | N |
| 1 | 1000011110 | 0 | 0111100001 | 0 | N |
| 2 | 1000011101 | 0 | 0111100010 | 0 | N |
| 3 | 1100010110 | 0 | 0011101001 | 0 | N |
| 4 | 1000011011 | 0 | 0111100100 | 0 | N |
| 5 | 1100011010 | 0 | 0011100101 | 0 | N |
| 6 | 1100010101 | 0 | 0011101010 | 0 | N |
| 7 | 1100100110 | 0 | 0011011001 | 0 | N |
| 8 | 1000010111 | 0 | 0111101000 | 0 | N |
| 9 | 1110000110 | 0 | 0001111001 | 0 | N |
| 10 | 1110000101 | 0 | 0001111010 | 0 | N |
| 11 | 1100101010 | 0 | 0011010101 | 0 | N |
| 12 | 1100100011 | 0 | 0011011100 | 0 | N |
| 13 | 1100101100 | 0 | 0011010011 | 0 | N |
| 14 | 1100100101 | 0 | 0011011010 | 0 | N |
| 15 | 1100110010 | 0 | 0011001101 | 0 | N |
| 16 | 1000101011 | 0 | 0111010100 | 0 | N |
| 17 | 1100001110 | 0 | 0011110001 | 0 | N |
| 18 | 1100001101 | 0 | 0011110010 | 0 | N |
| 19 | 1100110100 | 0 | 0011001011 | 0 | N |
| 20 | 1100001011 | 0 | 0011110100 | 0 | N |
| 21 | 1101010010 | 0 | 0010101101 | 0 | N |
| 22 | 1100101001 | 0 | 0011010110 | 0 | N |
| 23 | 1101010100 | 0 | 0010101011 | 0 | N |
| 24 | 1001001011 | 0 | 0110110100 | 0 | N |
| 25 | 1101011000 | 0 | 0010100111 | 0 | N |

TABLE 5-continued

| Symbol | Positive Code | Positive Disparity | Negative Code | Negative Disparity | Primary Mapping? |
|---|---|---|---|---|---|
| 26 | 1100110001 | 0 | 0011001110 | 0 | N |
| 27 | 1101100010 | 0 | 0010011101 | 0 | N |
| 28 | 1001010011 | 0 | 0110101100 | 0 | N |
| 29 | 1101101000 | 0 | 0010010111 | 0 | N |
| 30 | 1000101101 | 0 | 0111010010 | 0 | N |
| 31 | 1000101110 | 0 | 0111010001 | 0 | N |
| 32 | 1001100011 | 0 | 0110011100 | 0 | N |
| 33 | 1000110110 | 0 | 0111001001 | 0 | N |
| 34 | 1000110101 | 0 | 0111001010 | 0 | N |
| 35 | 1001001110 | 0 | 0110110001 | 0 | N |
| 36 | 1010001011 | 0 | 0101110100 | 0 | N |
| 37 | 1001010110 | 0 | 0110101001 | 0 | N |
| 38 | 1001001101 | 0 | 0110110010 | 0 | N |
| 39 | 1001011010 | 0 | 0110100101 | 0 | N |
| 40 | 1010010011 | 0 | 0101101100 | 0 | N |
| 41 | 1001100110 | 0 | 0110011001 | 0 | N |
| 42 | 1001010101 | 0 | 0110101010 | 0 | N |
| 43 | 1001101010 | 0 | 0110010101 | 0 | N |
| 44 | 1010100011 | 0 | 0101011100 | 0 | N |
| 45 | 1001110010 | 0 | 0110001101 | 0 | N |
| 46 | 1001011001 | 0 | 0110100110 | 0 | N |
| 47 | 1001110100 | 0 | 0110001011 | 0 | N |
| 48 | 1001100101 | 0 | 0110011010 | 0 | N |
| 49 | 1010001110 | 0 | 0101110001 | 0 | N |
| 50 | 1001101001 | 0 | 0110010110 | 0 | N |
| 51 | 1010010110 | 0 | 0101101001 | 0 | N |
| 52 | 1001110001 | 0 | 0110001110 | 0 | N |
| 53 | 1010011010 | 0 | 0101100101 | 0 | N |
| 54 | 1010001101 | 0 | 0101110010 | 0 | N |
| 55 | 1010100110 | 0 | 0101011001 | 0 | N |
| 56 | 1010010101 | 0 | 0101101010 | 0 | N |
| 57 | 1010101010 | 0 | 0101010101 | 0 | N |
| 58 | 1010011001 | 0 | 0101100110 | 0 | N |
| 59 | 1010101100 | 0 | 0101010011 | 0 | N |
| 60 | 1010100101 | 0 | 0101011010 | 0 | N |
| 61 | 1010110010 | 0 | 0101001101 | 0 | N |
| 62 | 1010101001 | 0 | 0101010110 | 0 | N |
| 63 | 1010110100 | 0 | 0101001011 | 0 | N |
| 64 | 1110100001 | 0 | 0001011110 | 0 | N |
| 65 | 1110111110 | 6 | 0001000001 | −6 | Y |
| 66 | 1110111101 | 6 | 0001000010 | −6 | Y |
| 67 | 1110111100 | 4 | 0001000011 | −4 | Y |
| 68 | 1110111011 | 6 | 0001000100 | −6 | Y |
| 69 | 1110111010 | 4 | 0001000101 | −4 | Y |
| 70 | 1110111001 | 4 | 0001000110 | −4 | Y |
| 71 | 1110111000 | 2 | 0001000111 | −2 | Y |
| 72 | 1110110111 | 6 | 0001001000 | −6 | Y |
| 73 | 1110110110 | 4 | 0001001001 | −4 | Y |
| 74 | 1110110101 | 4 | 0001001010 | −4 | Y |
| 75 | 1110110100 | 2 | 0001001011 | −2 | Y |
| 76 | 1110110011 | 4 | 0001001100 | −4 | Y |
| 77 | 1110110010 | 2 | 0001001101 | −2 | Y |
| 78 | 1110110001 | 2 | 0001001110 | −2 | Y |
| 79 | 1110100010 | 0 | 0001011101 | 0 | N |
| 80 | 1110101111 | 6 | 0001010000 | −6 | Y |
| 81 | 1110101110 | 4 | 0001010001 | −4 | Y |
| 82 | 1110101101 | 4 | 0001010010 | −4 | Y |
| 83 | 1110101100 | 2 | 0001010011 | −2 | Y |
| 84 | 1110101011 | 4 | 0001010100 | −4 | Y |
| 85 | 1110101010 | 2 | 0001010101 | −2 | Y |
| 86 | 1110101001 | 2 | 0001010110 | −2 | Y |
| 87 | 0001010111 | 0 | 1110101000 | 0 | Y |
| 88 | 1110101000 | 2 | 0001010111 | −2 | Y |
| 89 | 1110100110 | 2 | 0001011001 | −2 | Y |
| 90 | 1110100101 | 2 | 0001011010 | −2 | Y |
| 91 | 0001011011 | 0 | 1110100100 | 0 | Y |
| 92 | 1110100011 | 2 | 0001011100 | −2 | Y |
| 93 | 0001011101 | 0 | 1110100010 | 0 | Y |
| 94 | 0001011110 | 0 | 1110100001 | 0 | Y |
| 95 | 1110100100 | 0 | 0001011011 | 0 | N |
| 96 | 1110010001 | 0 | 0001101110 | 0 | N |
| 97 | 1110011110 | 4 | 0001100001 | −4 | Y |
| 98 | 1110011101 | 4 | 0001100010 | −4 | Y |
| 99 | 1110011100 | 2 | 0001100011 | −2 | Y |
| 100 | 1110011011 | 4 | 0001100100 | −4 | Y |
| 101 | 1110011010 | 2 | 0001100101 | −2 | Y |

TABLE 5-continued

| Symbol | Positive Code | Positive Disparity | Negative Code | Negative Disparity | Primary Mapping? |
|---|---|---|---|---|---|
| 102 | 1110011001 | 2 | 0001100110 | −2 | Y |
| 103 | 0001100111 | 0 | 1110011000 | 0 | Y |
| 104 | 1110010111 | 4 | 0001101000 | −4 | Y |
| 105 | 1110010110 | 2 | 0001101001 | −2 | Y |
| 106 | 1110010101 | 2 | 0001101010 | −2 | Y |
| 107 | 0001101011 | 0 | 1110010100 | 0 | Y |
| 108 | 1110010011 | 2 | 0001101100 | −2 | Y |
| 109 | 0001101101 | 0 | 1110010010 | 0 | Y |
| 110 | 0001101110 | 0 | 1110010001 | 0 | Y |
| 111 | 1110010100 | 0 | 0001101011 | 0 | N |
| 112 | 1110101000 | 0 | 0001010111 | 0 | N |
| 113 | 1110001110 | 2 | 0001110001 | −2 | Y |
| 114 | 1110001101 | 2 | 0001110010 | −2 | Y |
| 115 | 0001110011 | 0 | 1110001100 | 0 | Y |
| 116 | 1110001011 | 2 | 0001110100 | −2 | Y |
| 117 | 0001110101 | 0 | 1110001010 | 0 | Y |
| 118 | 0001110110 | 0 | 1110001001 | 0 | Y |
| 119 | 1110001100 | 0 | 0001110011 | 0 | N |
| 120 | 1010110001 | 0 | 0101001110 | 0 | N |
| 121 | 0001111001 | 0 | 1110000110 | 0 | Y |
| 122 | 0001111010 | 0 | 1110000101 | 0 | Y |
| 123 | 1110010010 | 0 | 0001101101 | 0 | N |
| 124 | 1011011000 | 0 | 0100100111 | 0 | N |
| 125 | 1110001010 | 0 | 0001110101 | 0 | N |
| 126 | 1110001001 | 0 | 0001110110 | 0 | N |
| 127 | 1110011000 | 0 | 0001100111 | 0 | N |
| 128 | 1101000011 | 0 | 0010111100 | 0 | N |
| 129 | 1101111110 | 6 | 0010000001 | −6 | Y |
| 130 | 1101111101 | 6 | 0010000010 | −6 | Y |
| 131 | 1101111100 | 4 | 0010000011 | −4 | Y |
| 132 | 1101111011 | 6 | 0010000100 | −6 | Y |
| 133 | 1101111010 | 4 | 0010000101 | −4 | Y |
| 134 | 1101111001 | 4 | 0010000110 | −4 | Y |
| 135 | 1101111000 | 2 | 0010000111 | −2 | Y |
| 136 | 1101110111 | 6 | 0010001000 | −6 | Y |
| 137 | 1101110110 | 4 | 0010001001 | −4 | Y |
| 138 | 1101110101 | 4 | 0010001010 | −4 | Y |
| 139 | 1101110100 | 2 | 0010001011 | −2 | Y |
| 140 | 1101110011 | 4 | 0010001100 | −4 | Y |
| 141 | 1101110010 | 2 | 0010001101 | −2 | Y |
| 142 | 1101110001 | 2 | 0010001110 | −2 | Y |
| 143 | 0010001111 | 0 | 1101110000 | 0 | N |
| 144 | 1101101111 | 6 | 0010010000 | −6 | Y |
| 145 | 1101101110 | 4 | 0010010001 | −4 | Y |
| 146 | 1101101101 | 4 | 0010010010 | −4 | Y |
| 147 | 1101101100 | 2 | 0010010011 | −2 | Y |
| 148 | 1101101011 | 4 | 0010010100 | −4 | Y |
| 149 | 1101101010 | 2 | 0010010101 | −2 | Y |
| 150 | 1101101001 | 2 | 0010010110 | −2 | Y |
| 151 | 0010010111 | 0 | 1101101000 | 0 | Y |
| 152 | 1101100111 | 4 | 0010011000 | −4 | Y |
| 153 | 1101100110 | 2 | 0010011001 | −2 | Y |
| 154 | 1101100101 | 2 | 0010011010 | −2 | Y |
| 155 | 0010011011 | 0 | 1101100100 | 0 | Y |
| 156 | 1101100011 | 2 | 0010011100 | −2 | Y |
| 157 | 0010011101 | 0 | 1101100010 | 0 | Y |
| 158 | 0010011110 | 0 | 1101100001 | 0 | Y |
| 159 | 1101100100 | 0 | 0010011011 | 0 | N |
| 160 | 1101000101 | 0 | 0010111010 | 0 | N |
| 161 | 1101011110 | 4 | 0010100001 | −4 | Y |
| 162 | 1101011101 | 4 | 0010100010 | −4 | Y |
| 163 | 1101011100 | 2 | 0010100011 | −2 | Y |
| 164 | 1101011011 | 4 | 0010100100 | −4 | Y |
| 165 | 1101011010 | 2 | 0010100101 | −2 | Y |
| 166 | 1101011001 | 2 | 0010100110 | −2 | Y |
| 167 | 0010100111 | 0 | 1101011000 | 0 | Y |
| 168 | 1101010111 | 4 | 0010101000 | −4 | Y |
| 169 | 1101010110 | 2 | 0010101001 | −2 | Y |
| 170 | 1101010101 | 2 | 0010101010 | −2 | Y |
| 171 | 0010101011 | 0 | 1101010100 | 0 | Y |
| 172 | 1101010011 | 2 | 0010101100 | −2 | Y |
| 173 | 0010101101 | 0 | 1101010010 | 0 | Y |
| 174 | 0010101110 | 0 | 1101010001 | 0 | Y |
| 175 | 0010101111 | 2 | 1101010000 | −2 | Y |
| 176 | 1101001111 | 4 | 0010110000 | −4 | Y |
| 177 | 1101001110 | 2 | 0010110001 | −2 | Y |
| 178 | 1101001101 | 2 | 0010110010 | −2 | Y |
| 179 | 0010110011 | 0 | 1101001100 | 0 | Y |
| 180 | 1101001011 | 2 | 0010110100 | −2 | Y |
| 181 | 0010110101 | 0 | 1101001010 | 0 | Y |
| 182 | 0010110110 | 0 | 1101001001 | 0 | Y |
| 183 | 0010110111 | 2 | 1101001000 | −2 | Y |
| 184 | 1101000111 | 2 | 0010111000 | −2 | Y |
| 185 | 0010111001 | 0 | 1101000110 | 0 | Y |
| 186 | 0010111010 | 0 | 1101000101 | 0 | Y |
| 187 | 0010111011 | 2 | 1101000100 | −2 | Y |
| 188 | 0010111100 | 0 | 1101000011 | 0 | Y |
| 189 | 0010111101 | 2 | 1101000010 | −2 | Y |
| 190 | 0010111110 | 2 | 1101000001 | −2 | Y |
| 191 | 1101001100 | 0 | 0010110011 | 0 | N |
| 192 | 1101001001 | 0 | 0010110110 | 0 | N |
| 193 | 1100111110 | 4 | 0011000001 | −4 | Y |
| 194 | 1100111101 | 4 | 0011000010 | −4 | Y |
| 195 | 1100111100 | 2 | 0011000011 | −2 | Y |
| 196 | 1100111011 | 4 | 0011000100 | −4 | Y |
| 197 | 1100111010 | 2 | 0011000101 | −2 | Y |
| 198 | 1100111001 | 2 | 0011000110 | −2 | Y |
| 199 | 0011000111 | 0 | 1100111000 | 0 | Y |
| 200 | 1100110111 | 4 | 0011001000 | −4 | Y |
| 201 | 1100110110 | 2 | 0011001001 | −2 | Y |
| 202 | 1100110101 | 2 | 0011001010 | −2 | Y |
| 203 | 0011001011 | 0 | 1100110100 | 0 | Y |
| 204 | 1100110011 | 2 | 0011001100 | −2 | Y |
| 205 | 0011001101 | 0 | 1100110010 | 0 | Y |
| 206 | 0011001110 | 0 | 1100110001 | 0 | Y |
| 207 | 0011001111 | 2 | 1100110000 | −2 | Y |
| 208 | 1100101111 | 4 | 0011010000 | −4 | Y |
| 209 | 1100101110 | 2 | 0011010001 | −2 | Y |
| 210 | 1100101101 | 2 | 0011010010 | −2 | Y |
| 211 | 0011010011 | 0 | 1100101100 | 0 | Y |
| 212 | 1100101011 | 2 | 0011010100 | −2 | Y |
| 213 | 0011010101 | 0 | 1100101010 | 0 | Y |
| 214 | 0011010110 | 0 | 1100101001 | 0 | Y |
| 215 | 0011010111 | 2 | 1100101000 | −2 | Y |
| 216 | 1100100111 | 2 | 0011011000 | −2 | Y |
| 217 | 0011011001 | 0 | 1100100110 | 0 | Y |
| 218 | 0011011010 | 0 | 1100100101 | 0 | Y |
| 219 | 0011011011 | 2 | 1100100100 | −2 | Y |
| 220 | 0011011100 | 0 | 1100100011 | 0 | Y |
| 221 | 0011011101 | 2 | 1100100010 | −2 | Y |
| 222 | 0011011110 | 2 | 1100100001 | −2 | Y |
| 223 | 1100100011 | 0 | 0011000111 | 0 | N |
| 224 | 1101010001 | 0 | 0010101110 | 0 | N |
| 225 | 1100011110 | 2 | 0011100001 | −2 | Y |
| 226 | 1100011101 | 2 | 0011100010 | −2 | Y |
| 227 | 0011100011 | 0 | 1100011100 | 0 | Y |
| 228 | 1100011011 | 2 | 0011100100 | −2 | Y |
| 229 | 0011100101 | 0 | 1100011010 | 0 | Y |
| 230 | 0011100110 | 0 | 1100011001 | 0 | Y |
| 231 | 0011100111 | 2 | 1100011000 | −2 | Y |
| 232 | 1100011011 | 2 | 0011101000 | −2 | Y |
| 233 | 0011101001 | 0 | 1100010110 | 0 | Y |
| 234 | 0011101010 | 0 | 1100010101 | 0 | Y |
| 235 | 0011101011 | 2 | 1100010100 | −2 | Y |
| 236 | 0011101100 | 0 | 1100010011 | 0 | Y |
| 237 | 0011101101 | 2 | 1100010010 | −2 | Y |
| 238 | 0011101110 | 2 | 1100010001 | −2 | Y |
| 239 | 0011101111 | 4 | 1100010000 | −4 | Y |
| 240 | 1101000100 | 0 | 0010111001 | 0 | N |
| 241 | 0011110001 | 0 | 1100001110 | 0 | Y |
| 242 | 0011110010 | 0 | 1100001101 | 0 | Y |
| 243 | 0011110011 | 2 | 1100001100 | −2 | Y |
| 244 | 0011110100 | 0 | 1100001011 | 0 | Y |
| 245 | 0011110101 | 2 | 1100001010 | −2 | Y |
| 246 | 0011110110 | 2 | 1100001001 | −2 | Y |
| 247 | 0011110111 | 4 | 1100001000 | −4 | Y |
| 248 | 1101010010 | 0 | 0010110101 | 0 | N |
| 249 | 0011111001 | 2 | 1100000110 | −2 | Y |
| 250 | 0011111010 | 2 | 1100000101 | −2 | Y |
| 251 | 0011111011 | 4 | 1100000100 | −4 | Y |
| 252 | 1100010011 | 0 | 0011101100 | 0 | N |
| 253 | 0011111101 | 4 | 1100000010 | −4 | Y |

TABLE 5-continued

| Symbol | Positive Code | Positive Disparity | Negative Code | Negative Disparity | Primary Mapping? |
|---|---|---|---|---|---|
| 254 | 1100011001 | 0 | 0011100110 | 0 | N |
| 255 | 1100011100 | 0 | 0011100011 | 0 | N |
| 256 | 1010000111 | 0 | 0101111000 | 0 | N |
| 257 | 1011100001 | 0 | 0100011110 | 0 | N |
| 258 | 1011111101 | 6 | 0100000010 | −6 | Y |
| 259 | 1011111100 | 4 | 0100000011 | −4 | Y |
| 260 | 1011111011 | 6 | 0100000100 | −6 | Y |
| 261 | 1011111010 | 4 | 0100000101 | −4 | Y |
| 262 | 1011111001 | 4 | 0100000110 | −4 | Y |
| 263 | 1011111000 | 2 | 0100000111 | −2 | Y |
| 264 | 1011110111 | 6 | 0100001000 | −6 | Y |
| 265 | 1011110110 | 4 | 0100001001 | −4 | Y |
| 266 | 1011110101 | 4 | 0100001010 | −4 | Y |
| 267 | 1011110100 | 2 | 0100001011 | −2 | Y |
| 268 | 1011110011 | 4 | 0100001100 | −4 | Y |
| 269 | 1011110010 | 2 | 0100001101 | −2 | Y |
| 270 | 1011110001 | 2 | 0100001110 | −2 | Y |
| 271 | 1011100010 | 0 | 0100011101 | 0 | N |
| 272 | 1011101111 | 6 | 0100010000 | −6 | Y |
| 273 | 1011101110 | 4 | 0100010001 | −4 | Y |
| 274 | 1011101101 | 4 | 0100010010 | −4 | Y |
| 275 | 1011101100 | 2 | 0100010011 | −2 | Y |
| 276 | 1011101011 | 4 | 0100010100 | −4 | Y |
| 277 | 1011101010 | 2 | 0100010101 | −2 | Y |
| 278 | 1011101001 | 2 | 0100010110 | −2 | Y |
| 279 | 0100010111 | 0 | 1011101000 | 0 | Y |
| 280 | 1011100111 | 4 | 0100011000 | −4 | Y |
| 281 | 1011100110 | 2 | 0100011001 | −2 | Y |
| 282 | 1011100101 | 2 | 0100011010 | −2 | Y |
| 283 | 0100011011 | 0 | 1011100100 | 0 | Y |
| 284 | 1011100011 | 2 | 0100011100 | −2 | Y |
| 285 | 0100011101 | 0 | 1011100010 | 0 | Y |
| 286 | 0100011110 | 0 | 1011100001 | 0 | Y |
| 287 | 1011100100 | 0 | 0100011011 | 0 | N |
| 288 | 1011000011 | 0 | 0100111100 | 0 | N |
| 289 | 1011011110 | 4 | 0100100001 | −4 | Y |
| 290 | 1011011101 | 4 | 0100100010 | −4 | Y |
| 291 | 1011011100 | 2 | 0100100011 | −2 | Y |
| 292 | 1011011011 | 4 | 0100100100 | −4 | Y |
| 293 | 1011011010 | 2 | 0100100101 | −2 | Y |
| 294 | 1011011001 | 2 | 0100100110 | −2 | Y |
| 295 | 0100101000 | 0 | 1011010111 | 0 | Y |
| 296 | 1011010111 | 4 | 0100101000 | −4 | Y |
| 297 | 1011010110 | 2 | 0100101001 | −2 | Y |
| 298 | 1011010101 | 2 | 0100101010 | −2 | Y |
| 299 | 0100101011 | 0 | 1011010100 | 0 | Y |
| 300 | 1011010011 | 2 | 0100101100 | −2 | Y |
| 301 | 0100101101 | 0 | 1011010010 | 0 | Y |
| 302 | 0100101110 | 0 | 1011010001 | 0 | Y |
| 303 | 0100101111 | 2 | 1011010000 | −2 | Y |
| 304 | 1011001111 | 4 | 0100110000 | −4 | Y |
| 305 | 1011001110 | 2 | 0100110001 | −2 | Y |
| 306 | 1011001101 | 2 | 0100110010 | −2 | Y |
| 307 | 0100110011 | 0 | 1011001100 | 0 | Y |
| 308 | 1011001011 | 2 | 0100110100 | −2 | Y |
| 309 | 0100110101 | 0 | 1011001010 | 0 | Y |
| 310 | 0100110110 | 0 | 1011001001 | 0 | Y |
| 311 | 0100110111 | 2 | 1011001000 | −2 | Y |
| 312 | 1011000111 | 2 | 0100111000 | −2 | Y |
| 313 | 0100111001 | 0 | 1011000110 | 0 | Y |
| 314 | 0100111010 | 0 | 1011000101 | 0 | Y |
| 315 | 0100111011 | 2 | 1011000100 | −2 | Y |
| 316 | 1011000100 | 0 | 1011000011 | 0 | Y |
| 317 | 0100111101 | 2 | 1011000010 | −2 | Y |
| 318 | 0100111110 | 2 | 1011000001 | −2 | Y |
| 319 | 1011001100 | 0 | 0100110011 | 0 | N |
| 320 | 1011000101 | 0 | 0100111010 | 0 | N |
| 321 | 1010111110 | 4 | 0101000001 | −4 | Y |
| 322 | 1010111101 | 4 | 0101000010 | −4 | Y |
| 323 | 1010111100 | 2 | 0101000011 | −2 | Y |
| 324 | 1010111011 | 4 | 0101000100 | −4 | Y |
| 325 | 1010111010 | 2 | 0101000101 | −2 | Y |
| 326 | 1010111001 | 2 | 0101000110 | −2 | Y |
| 327 | 0101000111 | 0 | 1010111000 | 0 | Y |
| 328 | 1010110111 | 4 | 0101001000 | −4 | Y |
| 329 | 1010110110 | 2 | 0101001001 | −2 | Y |
| 330 | 1010110101 | 2 | 0101001010 | −2 | Y |
| 331 | 0101001011 | 0 | 1010110100 | 0 | Y |
| 332 | 1010110011 | 2 | 0101001100 | −2 | Y |
| 333 | 0101001101 | 0 | 1010110010 | 0 | Y |
| 334 | 0101001110 | 0 | 1010110001 | 0 | Y |
| 335 | 0101001111 | 2 | 1010110000 | −2 | Y |
| 336 | 1010101111 | 4 | 0101010000 | −4 | Y |
| 337 | 1010101110 | 2 | 0101010001 | −2 | Y |
| 338 | 1010101101 | 2 | 0101010010 | −2 | Y |
| 339 | 0101010011 | 0 | 1010101100 | 0 | Y |
| 340 | 1010101011 | 2 | 0101010100 | −2 | Y |
| 341 | 0101010101 | 0 | 1010101010 | 0 | Y |
| 342 | 0101010110 | 0 | 1010101001 | 0 | Y |
| 343 | 0101010111 | 2 | 1010101000 | −2 | Y |
| 344 | 1010100111 | 2 | 0101011000 | −2 | Y |
| 345 | 0101011001 | 0 | 1010100110 | 0 | Y |
| 346 | 0101011010 | 0 | 1010100101 | 0 | Y |
| 347 | 0101011011 | 2 | 1010100100 | −2 | Y |
| 348 | 0101011100 | 0 | 1010100011 | 0 | Y |
| 349 | 0101011101 | 2 | 1010100010 | −2 | Y |
| 350 | 0101011110 | 2 | 1010100001 | −2 | Y |
| 351 | 1010111000 | 0 | 0101000111 | 0 | N |
| 352 | 1011001001 | 0 | 0100110110 | 0 | N |
| 353 | 1010011110 | 2 | 0101100001 | −2 | Y |
| 354 | 1010011101 | 2 | 0101100010 | −2 | Y |
| 355 | 0101100011 | 0 | 1010011100 | 0 | Y |
| 356 | 1010011011 | 2 | 0101100100 | −2 | Y |
| 357 | 0101100101 | 0 | 1010011010 | 0 | Y |
| 358 | 0101100110 | 0 | 1010011001 | 0 | Y |
| 359 | 0101100111 | 2 | 1010011000 | −2 | Y |
| 360 | 1010010111 | 2 | 0101101000 | −2 | Y |
| 361 | 0101101001 | 0 | 1010010110 | 0 | Y |
| 362 | 0101101010 | 0 | 1010010101 | 0 | Y |
| 363 | 0101101011 | 2 | 1010010100 | −2 | Y |
| 364 | 0101101100 | 0 | 1010010011 | 0 | Y |
| 365 | 0101101101 | 2 | 1010010010 | −2 | Y |
| 366 | 0101101110 | 2 | 1010010001 | −2 | Y |
| 367 | 0101101111 | 4 | 1010010000 | −4 | Y |
| 368 | 1010001111 | 2 | 0101110000 | −2 | Y |
| 369 | 0101110001 | 0 | 1010001110 | 0 | Y |
| 370 | 0101110010 | 0 | 1010001101 | 0 | Y |
| 371 | 0101110011 | 2 | 1010001100 | −2 | Y |
| 372 | 0101110100 | 0 | 1010001011 | 0 | Y |
| 373 | 0101110101 | 2 | 1010001010 | −2 | Y |
| 374 | 0101110110 | 2 | 1010001001 | −2 | Y |
| 375 | 0101110111 | 4 | 1010001000 | −4 | Y |
| 376 | 0101111000 | 0 | 1010000111 | 0 | Y |
| 377 | 0101111001 | 2 | 1010000110 | −2 | Y |
| 378 | 0101111010 | 2 | 1010000101 | −2 | Y |
| 379 | 0101111011 | 4 | 1010000100 | −4 | Y |
| 380 | 0101111100 | 2 | 1010000011 | −2 | Y |
| 381 | 0101111101 | 4 | 1010000010 | −4 | Y |
| 382 | 0101111110 | 4 | 1010000001 | −4 | Y |
| 383 | 1010011100 | 0 | 0101100011 | 0 | N |
| 384 | 1011010001 | 0 | 0100101110 | 0 | N |
| 385 | 1001111110 | 4 | 0110000001 | −4 | Y |
| 386 | 1001111101 | 4 | 0110000010 | −4 | Y |
| 387 | 1001111100 | 2 | 0110000011 | −2 | Y |
| 388 | 1001111011 | 4 | 0110000100 | −4 | Y |
| 389 | 1001111010 | 2 | 0110000101 | −2 | Y |
| 390 | 1001111001 | 2 | 0110000110 | −2 | Y |
| 391 | 0110000111 | 0 | 1001111000 | 0 | Y |
| 392 | 1001110111 | 4 | 0110001000 | −4 | Y |
| 393 | 1001110110 | 2 | 0110001001 | −2 | Y |
| 394 | 1001110101 | 2 | 0110001010 | −2 | Y |
| 395 | 0110001011 | 0 | 1001110100 | 0 | Y |
| 396 | 1001110011 | 2 | 0110001100 | −2 | Y |
| 397 | 0110001101 | 0 | 1001110010 | 0 | Y |
| 398 | 0110001110 | 0 | 1001110001 | 0 | Y |
| 399 | 0110001111 | 2 | 1001110000 | −2 | Y |
| 400 | 1001101111 | 4 | 0110010000 | −4 | Y |
| 401 | 1001101110 | 2 | 0110010001 | −2 | Y |
| 402 | 1001101101 | 2 | 0110010010 | −2 | Y |
| 403 | 0110010011 | 0 | 1001101100 | 0 | Y |
| 404 | 1001101011 | 2 | 0110010100 | −2 | Y |
| 405 | 0110010101 | 0 | 1001101010 | 0 | Y |

TABLE 5-continued

| Symbol | Positive Code | Positive Disparity | Negative Code | Negative Disparity | Primary Mapping? |
|---|---|---|---|---|---|
| 406 | 0110010110 | 0 | 1001101001 | 0 | Y |
| 407 | 0110010111 | 2 | 1001101000 | −2 | Y |
| 408 | 1001100111 | 2 | 0110011000 | −2 | Y |
| 409 | 0110011001 | 0 | 1001100110 | 0 | Y |
| 410 | 0110011010 | 0 | 1001100101 | 0 | Y |
| 411 | 0110011011 | 2 | 1001100100 | −2 | Y |
| 412 | 0110011100 | 0 | 1001100011 | 0 | Y |
| 413 | 0110011101 | 2 | 1001100010 | −2 | Y |
| 414 | 0110011110 | 2 | 1001100001 | −2 | Y |
| 415 | 1001111000 | 0 | 0110000111 | 0 | N |
| 416 | 1011000110 | 0 | 0100111001 | 0 | N |
| 417 | 1001011110 | 2 | 0110100001 | −2 | Y |
| 418 | 1001011101 | 2 | 0110100010 | −2 | Y |
| 419 | 0110100011 | 0 | 1001011100 | 0 | Y |
| 420 | 1001011011 | 2 | 0110100100 | −2 | Y |
| 421 | 0110100101 | 0 | 1001011010 | 0 | Y |
| 422 | 0110100110 | 0 | 1001011001 | 0 | Y |
| 423 | 0110100111 | 2 | 1001011000 | −2 | Y |
| 424 | 1001010111 | 2 | 0110101000 | −2 | Y |
| 425 | 0110101001 | 0 | 1001010110 | 0 | Y |
| 426 | 0110101010 | 0 | 1001010101 | 0 | Y |
| 427 | 0110101011 | 2 | 1001010100 | −2 | Y |
| 428 | 0110101100 | 0 | 1001010011 | 0 | Y |
| 429 | 0110101101 | 2 | 1001010010 | −2 | Y |
| 430 | 0110101110 | 2 | 1001010001 | −2 | Y |
| 431 | 0110101111 | 4 | 1001010000 | −4 | Y |
| 432 | 1001001111 | 2 | 0110110000 | −2 | Y |
| 433 | 0110110001 | 0 | 1001001110 | 0 | Y |
| 434 | 0110110010 | 0 | 1001001101 | 0 | Y |
| 435 | 0110110011 | 2 | 1001001100 | −2 | Y |
| 436 | 0110110100 | 0 | 1001001011 | 0 | Y |
| 437 | 0110110101 | 2 | 1001001010 | −2 | Y |
| 438 | 0110110110 | 2 | 1001001001 | −2 | Y |
| 439 | 0110110111 | 4 | 1001001000 | −4 | Y |
| 440 | 0110111000 | 0 | 1001000111 | 0 | Y |
| 441 | 0110111001 | 2 | 1001000110 | −2 | Y |
| 442 | 0110111010 | 2 | 1001000101 | −2 | Y |
| 443 | 0110111011 | 4 | 1001000100 | −4 | Y |
| 444 | 0110111100 | 2 | 1001000011 | −2 | Y |
| 445 | 0110111101 | 4 | 1001000010 | −4 | Y |
| 446 | 0110111110 | 4 | 1001000001 | −4 | Y |
| 447 | 1000111100 | 0 | 0111000011 | 0 | N |
| 448 | 1011001010 | 0 | 0100110101 | 0 | N |
| 449 | 1000111110 | 2 | 0111000001 | −2 | Y |
| 450 | 1000111101 | 2 | 0111000010 | −2 | Y |
| 451 | 0111000011 | 0 | 1000111100 | 0 | Y |
| 452 | 1000111011 | 2 | 0111000100 | −2 | Y |
| 453 | 0111000101 | 0 | 1000111010 | 0 | Y |
| 454 | 0111000110 | 0 | 1000111001 | 0 | Y |
| 455 | 0111000111 | 2 | 1000111000 | −2 | Y |
| 456 | 1000110111 | 2 | 0111001000 | −2 | Y |
| 457 | 0111001001 | 0 | 1000110110 | 0 | Y |
| 458 | 0111001010 | 0 | 1000110101 | 0 | Y |
| 459 | 0111001011 | 2 | 1000110100 | −2 | Y |
| 460 | 0111001100 | 0 | 1000110011 | 0 | Y |
| 461 | 0111001101 | 2 | 1000110010 | −2 | Y |
| 462 | 0111001110 | 2 | 1000110001 | −2 | Y |
| 463 | 0111001111 | 4 | 1000110000 | −4 | Y |
| 464 | 1000101111 | 2 | 0111010000 | −2 | Y |
| 465 | 0111010001 | 0 | 1000101110 | 0 | Y |
| 466 | 0111010010 | 0 | 1000101101 | 0 | Y |
| 467 | 0111010011 | 2 | 1000101100 | −2 | Y |
| 468 | 0111010100 | 0 | 1000101011 | 0 | Y |
| 469 | 0111010101 | 2 | 1000101010 | −2 | Y |
| 470 | 0111010110 | 2 | 1000101001 | −2 | Y |
| 471 | 0111010111 | 4 | 1000101000 | −4 | Y |
| 472 | 0111011000 | 0 | 1000100111 | 0 | Y |
| 473 | 0111011001 | 2 | 1000100110 | −2 | Y |
| 474 | 0111011010 | 2 | 1000100101 | −2 | Y |
| 475 | 0111011011 | 4 | 1000100100 | −4 | Y |
| 476 | 0111011100 | 2 | 1000100011 | −2 | Y |
| 477 | 0111011101 | 4 | 1000100010 | −4 | Y |
| 478 | 0111011110 | 4 | 1000100001 | −4 | Y |
| 479 | 1001011100 | 0 | 0110100011 | 0 | N |
| 480 | 1011010010 | 0 | 0100101101 | 0 | N |
| 481 | 0111100001 | 0 | 1000011110 | 0 | Y |
| 482 | 0111100010 | 0 | 1000011101 | 0 | Y |
| 483 | 0111100011 | 2 | 1000011100 | −2 | Y |
| 484 | 0111100100 | 0 | 1000011011 | 0 | Y |
| 485 | 0111100101 | 2 | 1000011010 | −2 | Y |
| 486 | 0111100110 | 2 | 1000011001 | −2 | Y |
| 487 | 0111100111 | 4 | 1000011000 | −4 | Y |
| 488 | 0111101000 | 0 | 1000010111 | 0 | Y |
| 489 | 0111101001 | 2 | 1000010110 | −2 | Y |
| 490 | 0111101010 | 2 | 1000010101 | −2 | Y |
| 491 | 0111101011 | 4 | 1000010100 | −4 | Y |
| 492 | 0111101100 | 2 | 1000010011 | −2 | Y |
| 493 | 0111101101 | 4 | 1000010010 | −4 | Y |
| 494 | 0111101110 | 4 | 1000010001 | −4 | Y |
| 495 | 0111101111 | 6 | 1000010000 | −6 | Y |
| 496 | 1011010100 | 0 | 0100101011 | 0 | N |
| 497 | 0111110001 | 2 | 1000001110 | −2 | Y |
| 498 | 0111110010 | 2 | 1000001101 | −2 | Y |
| 499 | 0111110011 | 4 | 1000001100 | −4 | Y |
| 500 | 0111110100 | 2 | 1000001011 | −2 | Y |
| 501 | 0111110101 | 4 | 1000001010 | −4 | Y |
| 502 | 0111110110 | 4 | 1000001001 | −4 | Y |
| 503 | 0111110111 | 6 | 1000001000 | −6 | Y |
| 504 | 1000100111 | 0 | 0111011000 | 0 | N |
| 505 | 0111111001 | 4 | 1000000110 | −4 | Y |
| 506 | 0111111010 | 4 | 1000000101 | −4 | Y |
| 507 | 0111111011 | 6 | 1000000100 | −6 | Y |
| 508 | 1000110011 | 0 | 0111001100 | 0 | N |
| 509 | 1000111010 | 0 | 0111000101 | 0 | N |
| 510 | 1000111001 | 0 | 0111000110 | 0 | N |
| 511 | 1001101100 | 0 | 0110010011 | 0 | N |

In Table 5, the 512 code words set forth in the second column from the left determine the positive disparity codebook of the Table 5 code to which the input symbols map. Each code word in the positive disparity codebook (sometimes referred to as the "positive" codebook) has the non-negative disparity indicated (in the third column from the left in Table 5). The complement of each code word of positive disparity codebook determines the code word of the negative disparity codebook to which the relevant input symbol maps. This determines the 512 code words of the negative disparity codebook (set forth in Table 5 in the fourth column from the left) to which the input symbols map. Each code word in the negative disparity codebook (sometimes referred to as the "negative" codebook) has the non-positive disparity indicated (in the second column from the right in Table 5).

The secondary mapping for the 9B/10B code of Table 5 determines those code words in each row of Table 5 in which there is an "N" symbol in the right column. (The primary mapping for this code determines those code words in each row of Table 4 in which there is a "Y" symbol in the right column).

The Table 5 code favors higher transition density over lower digital sum variation with the goal of providing better clock data recovery performance for transmission over short distances. The code space is defined as follows:

each code word having disparity 0 has a run of length three or less on either end, and includes no run of length greater than six away from its ends;

each code word having disparity 2, −2, 4, −4, 6, or −6 that has a run of zeroes on the left has a run of zeroes of length two or less on the left;

each code word having disparity 2, −2, 4, −4, 6, or −6 that has a run of zeroes on the right has a run of zeroes of length three or less on the right;

each code word having disparity 2, −2, 4, −4, 6, or −6 that has a run of ones on the left has a run of ones of length three or less on the left;

each code word having disparity 2, −2, 4, −4, 6, or −6 that has a run of ones on the right has a run of ones of length four or less on the right;

no code word having disparity 2, −2, 4, −4, 6, or −6 has a run of zeroes of length greater than six away from its ends;

no code word having disparity 2, −2, 4, −4, 6, or −6 has a run of ones of length greater than seven away from its ends;

no code word has disparity greater than 6 or less than −6; and no code word has less than 3 transitions.

These rules select 513 code words out of the 1024 possible 10-bit code words.

The code set forth in Table 5 has a maximum run length of 7, a running digital sum variation of 20, an average of 5.29 transitions per code word (over all legal code pairs), and a normalized DC offset of 6.9. Of the 512 code words in the positive codebook, only 113 are not determined by the primary mapping.

In variations on the code set forth in Table 5, the positive and negative codebooks are not strictly complements of each other. Rather, the code words having nonzero disparity are identical to those of Table 5 (the code words of the negative codebook having nonzero disparity are complements of corresponding code words of the positive codebook) but the code words of the negative codebook that have zero disparity are identical to corresponding code words of the positive codebook. The code words having zero disparity can be either the zero-disparity code words of the positive codebook of Table 5 or the zero-disparity code words of the negative codebook of Table 5.

For both the Table 4 code and the Table 5 code, the same prefixes for denoting control/out-of-band characters are used. In particular, when current running disparity is <0, the prefix is 0011111111. The prefix is 1100000000 when current running disparity is >0. A comma or control code contains a 10-bit code following this prefix so that the total disparity across the 20 bits is 0 and so that it does not end with a run of length greater than 3. This gives 25 possible combinations for each prefix, i.e. 25 possible 20-bit out-of-band characters. If one allows the OOB characters to be longer than 20 bits, one can have more possible values.

Other embodiments of the invention employ other spectral coding approaches which reduce channel coding overhead. For example, bits could be inserted to force transitions, a polarity bit can be used to ensure DC balance, and additional transitions can be guaranteed by controlling the use of parity bits for error control coding or by forcing transitions in other back channel fields.

Inclusion of control bits (with application data) in predetermined slots of input words (e.g., inclusion of control bits as the least significant bits, or most significant bits, of input words whose other bits are application data, as described with reference to FIG. 2), encoding the input words to generate code words, and transmitting sequences of the code words indicative of cells in accordance with the invention provides additional link layer and higher layer functionality as described herein. Use of a low overhead block code (e.g., a 9-bit-to-10-bit code) to generate the code words, rather than a higher overhead block code (e.g., a conventional 8-bit-to-10-bit code), provides such link layer and higher layer functionality without reducing the effective bandwidth of the serial link over which the code words are transmitted.

The special characters (e.g., "idle" characters used for simplex or duplex link flow control, and "link training" characters) transmitted in accordance with the invention are preferably chosen to be easily recognizable and distinguishable from the code words indicative of cells that are also transmitted. Typically, only a small number of special characters are used. Preferably, the set of code words employed to encode cells and the special characters are chosen such that no special character can unintentionally occur in a sequence of code words indicative of a cell (i.e., no special character matches any of the code words, and no sequence of bits from any possible sequence of consecutively transmitted code words matches any of the special characters). This allows intentional transmission of any special character at any time (including by interrupting transmission of a cell to transmit the special character), and allows the circuitry employed for receiving and decoding code words to be configured (e.g., to include simple logic configured) to recognize each transmitted special character regardless of whether transmission of the special character has or has not interrupted transmission of a cell.

In a system having the OSI seven-layer (or TCP/IP) architecture, the link layer is responsible for point-to-point communication. Point-to-point communication can be subdivided into duplex (which herein denotes both full duplex and dual simplex) communication and simplex communication. In such systems, transmission in accordance with the invention of code word sequences (indicative of cells) and special characters (that are distinguishable from the bit sequences that can occur in such code word sequences) allows transmitters and receivers to provide improved link layer functionality. We next describe examples of this improved link layer functionality, including examples of improved framing, simplex link flow control, simplex link error detection and correction, and duplex link flow control.

"Framing" denotes the process of determining the boundaries of blocks of data utilized by higher-layer protocols. At the physical layer, these blocks are referred to as symbols or characters. Examples of characters are the 10-bit code words described with reference to FIG. 2. At the link layer, the blocks whose boundaries are determined are referred to as cells or frames. Examples of frames are ethernet frames and the 144-bit cells described with reference to FIG. 2. In preferred embodiments of the invention, the link layer frames are cells consisting of a fixed, predetermined number of physical layer symbols (i.e., cells consisting of a fixed number of code words). Preferred embodiments of the inventive system, that include two communication endpoints (e.g., transceivers) and a serial link between them, use at least one special character (e.g., a "link training" character and typically also a "state exchange" character) to perform framing both at the physical layer and link layer. Such a system enters a training state at startup (power on) or after detection of an uncorrectable error. Typically in the training state, a first endpoint begins transmitting a special character or set of special characters (e.g., a link training character, or link training and state exchange characters) to the second endpoint. The second endpoint responds by transmitting a special character or set of special characters to the first endpoint, and one or more additional cycles of special character transmission between the endpoints can also occur. Once a specific pattern of special characters has been received at both endpoints, both endpoints exit the training state and enter a normal operating state. In the normal operating state, each endpoint can reliably determine the proper symbol and cell framing for the stream of code bits (indicative of cells) that it receives over the link. Several examples of a link training operation (which accomplishes framing both at the physical layer and link layer) are described herein.

A transmitter (e.g., circuit 32 of transmitter 10) can insert a special idle character, 1, between valid code words (each indicative of contents of a cell) for plesiosynchronous communication. In response to an idle character, the receiver enters a wait state and resumes processing of a sequence of code words in response to receiving the first valid code word after an idle character.

We next describe how simplex link flow control can be accomplished at the link level in accordance with the invention. In typical systems that embody the invention, transmitters and receivers operate in different clock domains. To ensure that a transmitter does not overrun a receiver's input buffer, a plesiosynchronous communication technique can be employed. Based on maximum allowable clock skew between transmitter and receiver, the transmitter inserts special characters (referred to herein as "idle" characters) between cells at appropriate intervals. A slow receiver can drop (ignore) the idle characters to catch up to a faster transmitter. For example, circuit 43, in an implementation of receiver 20 (of FIG. 1) that operates in response to a slower clock than does transmitter 10, is configured to drop the idle characters that it receives over channel 51 (thereby allowing the decoding circuitry within circuit 43 to stay caught up with transmitter 10). In the example, circuit 32 of transmitter 10 inserts the idle characters in the bit stream transmitted over channel 51 at appropriate intervals, and the decision as to when to transmit idle characters is made at the link layer (e.g., by circuits 32, 33, 34, and/or 35 in transmitter 10; not by circuitry 30).

We next describe how simplex link error detection can be accomplished at the link level in accordance with the invention. Error code bits (e.g., parity bits, or the CRC bits discussed with reference to FIG. 2) are generated for the entire amount of data to be transmitted in a cell (or a fixed number of cells), and the error control bits are encoded with the other bits (application and control bits) of the cell or cells. The transmitted code words (indicative of the cell or cells) are thus indicative of the error control bits. In link layer circuitry in the receiver, the error control bits are extracted from decoded versions of the code words and used to detect errors in the cell (or across the fixed number of cells). For example, the receiver can perform a cyclic redundancy check using the error control bits. The number of error control bits and cell coverage can be determined based on the error detection performance and latency requirements of the communication environment, as well as the allowable overhead. When a receiver detects an error, application-specific actions can be applied. In preferred embodiments which incorporate transport layer functionality (as described below), a low latency re-transmission of the cell(s) can be requested.

Simplex link error correction can also be accomplished at the link level in accordance with the invention. The error control bits described in the previous paragraph can be used by link layer circuitry in the receiver to implement error correction instead of (or in addition to) error detection. The number of error control bits and cell coverage can be determined based on the error correction performance and latency requirements of the communication environment, as well as the allowable overhead. In preferred embodiments which incorporate transport layer functionality (as described below), re-transmission of a cell or cells will not be necessary when detected errors are corrected by link layer circuitry in the receiver.

We next describe how duplex link flow control can be accomplished at the link level in accordance with the invention. When an embodiment of the inventive system treats pairs of simplex channels (e.g., channels 51 and 52 of FIG. 1) as a single bidirectional link, the coordination between the channels is most efficiently supported by the line code. In preferred embodiments, the inventive system employs an implicit credit-based scheme to synchronize flow control between the two simplex channels. At startup, an initial credit allocation (e.g., four credits) is assigned to each endpoint. The amount of the initial credit allocation will depend on link speed, logic clock rate, cell length, and typically also other factors. For each cell transmitted by the endpoint, the allocation is decremented by one by link layer circuitry. For each cell received by the endpoint, the allocation is incremented by one by link layer circuitry.

In one class of embodiments, each endpoint transmits idle characters when its credit allocation is exhausted. This ensures that rate mismatches between the channels are normalized to the slower channel, and serves to minimize buffering required to allow re-transmission of cells when necessary (e.g., a two-credit allocation implies four cell buffers). Some method should be employed to ensure that the idle character-receiving endpoint will increment its credit allocation appropriately even when it is not receiving cells from the other endpoint. For example, the endpoint that transmits idle characters can transmit additional special characters ("credit-incrementing" characters Ci) with the idle characters to cause the receiving endpoint to increment its credit allocation in response to each credit-incrementing character (Ci). Just as in the case of link training in which multiple symbols are used (e.g., the training character T and state exchange characters Si, each of which typically includes a common preamble pattern useful for physical framing, and a discriminant pattern for distinguishing itself from the other characters), each idle character 1 and each credit-incrementing character Ci used for duplex flow control can have the same preamble pattern, and each credit-incrementing character can include a distinctive credit-incrementing value. In response to each credit-incrementing value, the receiving endpoint increments its credit allocation by a predetermined amount.

For example, in an implementation of transmitter 10 (of FIG. 1), circuit 32 is configured to decrement a credit allocation by one whenever it transmits a cell on channel 51, and to increment the allocation by one whenever a control signal (transmitted to it by circuit 34 or 35) indicates that circuit 35 has received a cell (or circuit 34 or 35 has received a credit-incrementing character Ci) that has propagated to transmitter 10 over channel 52. When the allocation drops to zero, circuit 32 would insert one or more idle characters (and credit characters Ci) in the bit stream it transmits over channel 51. Circuit 43 of receiver 20 would be configured to drop the idle characters that it receives over channel 51, and to increment its credit allocation in response to each credit character Ci.

In another class of embodiments, duplex flow control is implemented as follows. An endpoint whose credit allocation has dropped to zero transmits one or more empty cells (rather than idle and credit-incrementing characters as in the embodiments described above) when its credit allocation is exhausted. Each empty cell includes one or more of the above-mentioned "Valid" bits, each such "Valid" bit being set to indicate that the cell include no valid application data. The receiving endpoint increments its credit allocation in response to each such empty cell, just as it does in response to a non-empty cell.

In a third class of embodiments, duplex flow control is implemented as follows. An endpoint transmits special flow control characters (XON and XOFF characters) when a rate mismatch occurs between it and another endpoint. The XON and XOFF characters would not be exposed to application layer circuitry as are the above-described FLOW bits. Rather, the XON and XOFF characters can be used to implement a TCP window style flow control, whereas the FLOW bits are used by the application to implement end-to-end flow control across potentially multiple hops. To accomplish duplex flow control using XON/XOFF characters, a transmitter sends cells at will during normal operation. If the receiver does not consume the cells fast enough (i.e., if the receiver's buffers fill up before application layer circuitry in the receiver drains them), then the receiver sends an XOFF character back to the transmitter and the receiver drops any subsequently received cells. When physical (or link) layer circuitry in the transmitter notices the XOFF character, it ceases normal cell transmission and instead sends idle characters or empty cells. Once the receiver's buffers have drained a sufficient amount, the receiver sends an XON character to the transmitter. In response to the XON character, physical (or link) layer circuitry in the transmitter causes the transmitter to resume normal cell transmission. The XON character should include embedded state information (or be accompanied by state information) so that the transmitter knows at which cell to begin re-transmission. This can be accomplished with multiple XONi characters (each identifying a different cell as the first cell to be re-transmitted) or by sending a state exchange character ("XONSi") with the XON character. Note that if the XONSi characters are identical to state exchange characters ("Si") used in a link training context, then the state machine must include extra states to disambiguate between an error condition (in which the transmitter should enter a link training state) and receipt of an XONSi character with an XON character (in which case normal cell transmission should simply be re-enabled). Preferably, the XONSi characters are distinguishable from (i.e., are different characters than) any state exchange characters ("Si") used in a link training context. Each XONSi character can be sent multiple times to guard against bit errors.

We next describe an example of improved network layer functionality that is provided by some embodiments of the invention. The point-to-point communication facilitated by the link layer can be extended by including addressing support within the line code employed in accordance with the invention, to enable routing of cells (by network layer circuitry) to appropriate addresses in a network of interconnected endpoints. For example, a control bit (e.g., the XTND bit discussed with reference to FIG. 2) in a non-extended cell can enable an enhanced mode of operation in which an address is appended to a code word sequence indicative of the non-extended cell, to form an extended version of the non-extended cell. In other words, the control bit can indicate whether the cell containing it has an address extension. For example, in an implementation of receiver 20 of FIG. 1, de-packetizing circuit 45 (which is an element of the link layer circuitry of receiver 20) can identify an XTND bit in each sequence of decoded words (indicative of a cell) that it receives from circuit 44. Such an implementation of circuit 45 would assert to circuitry 40 a control signal indicative of the XTND bit's value, and would also assert to circuitry 40 the decoded data bits comprising each address extension. In response, network layer circuitry within circuitry 40 would route (e.g., to other endpoint devices, not shown in FIG. 1, of a network that includes receiver 20) cells (including application data and typically also control bits) that are received by circuitry 40 from circuit 45 in the manner determined by the address extensions of the cells. When only point-to-point communication (e.g., between transmitter 10 and receiver 20) is desired, the XTND bit would be forced (e.g., by circuit 32 of an implementation of transmitter 10) to a value indicating that no cell has an address extension, transmitter 10 would transmit cells without address extensions, and receiver 20 would not operate to route cells to devices determined by address extensions. Even when only point-to-point communication is desired, inclusion of a control bit (e.g., an XTND=0 bit) in each cell is the only added overhead resulting from configuration of the link layer circuitry in accordance with the invention to be capable of supporting the network layer function of routing cells to appropriate addresses in a network of interconnected endpoints.

In variations on the implementation described in the previous paragraph, at least one control bit in a predetermined position within each cell is used by a transmitter or receiver to enable another enhanced mode of operation (i.e., an enhanced mode of operation other than the routing of cells, by network layer circuitry, to appropriate addresses in a network of interconnected endpoints).

We next describe an example of improved transport layer functionality provided by some embodiments of the invention. The hallmark of the transport layer is its ability to provide sequenced, reliable delivery of user data across a connection (e.g. a bidirectional channel), including by handling all error control, ordering, and flow control issues. At least some of these functions can be implemented using a line code in accordance with the invention as follows. As previously described, duplex link flow control and link training can be implemented in accordance with the invention in a manner in which link layer circuitry in each endpoint (e.g., circuits 32 and 35 of transmitter 10 and circuits 42 and 45 of receiver 20 in FIG. 1) is configured such that each endpoint keeps a running count of the cells transmitted and received thereby. In each direction of communication, the sequence in which cells are transmitted is never re-ordered. At the end of a link training operation, or when normal cell transmission resumes after an interruption for the purpose of duplex link flow control, the transmitting endpoint begins to transmit cells beginning with the first cell that was not received by the receiving endpoint. Thus, transport layer functionality in both endpoints is enhanced in the sense that the transport layer protocol does not require support for handling the re-ordering of cells, and thus the transport layer circuitry can be implemented more simply than if it had to be capable of handling the re-ordering of cells.

Several embodiments have been described in which the inventive line code allows the transmitting endpoint to begin to transmit cells beginning with the first cell that was not received by the receiving endpoint, at the end of a link training operation or when normal cell transmission resumes after an interruption for the purpose of duplex link flow control. For example, if an uncorrectable error is detected in a cell, link re-training is initiated and the endpoint that detects the error can send a link training character (as described above) to force the other endpoint to enter a training phase. By the end of the training phase, each endpoint has sent at least one state exchange character (e.g., a version of the "Si" characters described above) to the other endpoint. Embedded within each state exchange character is the sequence number of the last cell received by the endpoint that sends the state exchange character. Alternatively, a sequence of the state exchange characters can be indicative of the sequence number of the last cell received by the endpoint that sends the state exchange character sequence (e.g., if each state exchange character in the sequence is indicative of a binary "1" or "0" and the sequence consists of N characters, the sequence number of the cell can be an N-bit binary number determined by the N-character sequence). At the end of the training phase, normal transmission resumes with the first cell that was not received. This is a version of a go-back-N ARQ scheme, and requires the link-layer circuitry within each endpoint to buffer a sufficient number of cells to allow for re-transmission of the cells when necessary. In typical implementations of the inventive system that include two endpoints configured for point-to-point communication with each other via a serial link, no more than four cells must be buffered in each endpoint. For example, in an implementation of receiver 20 (of FIG. 1), circuit 45 is configured to increment a sequence number whenever it receives a cell on channel 51, and during a training phase, circuit 42 operates to send a state exchange character over channel 52 that is indicative of the current sequence number (in response to a control signal indicative of the sequence number received from circuit 45). Circuit 32 of transmitter 10 stores in a buffer memory the four cells most recently transmitted thereby, and a sequence number of each cell. At the end of the training phase, circuit 32 resumes normal transmission starting with the first cell that was not received by receiver 20.

We next describe examples of improved application layer functionality provided by some embodiments of the invention. Application-specific protocols can be efficiently implemented by embedding control signals within the line code employed in accordance with the invention.

One such application-specific protocol is end-to-end flow control. While link level flow control ensures that transmitters and receivers will not overflow their buffers, applications may not be able to consume data at the line rate. One or more control bits (e.g., the above-discussed FLOW bit or bits) can be included in each cell and exposed to application layer circuitry in the endpoint that receives the cell, to allow application layer circuitry in both endpoints to maintain end-to-end flow control.

For example, in an implementation of the FIG. 1 system, circuitry 40 of receiver 20 provides (to packetizing circuit 41) control data (generated by application layer circuitry within circuitry 40) that determine the FLOW bit of each cell to be transmitted over channel 52. In response to each such cell, circuit 35 of transmitter 10 asserts a control signal indicative of the value of the FLOW bit to circuitry 30. Application layer circuitry within circuitry 30 responds to the control signal by causing transmitter 10 to enter either a "data transmitting" state in which it sends code words indicative of cells to receiver 20 over channel 51, or a state in which it suspends transmission of such code words to receiver 20 over channel 51.

In a variation on this example, each cell includes two or more FLOW bits. Where there are N blocks of application data per cell, each block having a different priority, there can be (N−1) FLOW bits per cell (one FLOW bit for each block of application data except the block having the highest priority, since flow control is typically not allowed at the highest priority level). In this case, transmitter 10 responds to each FLOW bit by sending cells that include or do not include application data of each relevant priority level. Typically, flow control at one priority level would affect flow control at each lower priority level.

In other variations, "M" FLOW bits (where M>1) are evenly distributed in each cell, and each FLOW bit applies to all priority levels of data. This provides M granularity for controlling flow (e.g., the flow control state for the next cell transmitted from the far side is the last interpreted incoming flow control value) and can reduce flow control latency, reduce receiver buffering, and provide faster response time at the receiver. For example, if receiver 20 wishes to assert a FLOW bit having the value XOFF, but can include only one FLOW bit in each cell and has just started to serialize another FLOW bit in a cell, it would need to wait an entire cell time before it can insert the FLOW bit that indicates XOFF. If receiver 20 could instead include multiple FLOW bits in each cell, response time can be greatly reduced, which in turn reduces buffering requirements. If each cell includes two evenly spaced FLOW bits (each applying to all priority levels of application data), no more than half a cell time would be wasted on either endpoint when the value of the FLOW bit is to be changed, which would reduce system buffering requirements by one cell.

In variations on the embodiments described in the three previous paragraphs, a special flow control character (chosen such that its bit pattern cannot unintentionally occur in a sequence of code words indicative of a cell) is transmitted (e.g., between cells) for use in application level end-to-end flow control, rather than a flow control bit (e.g., a FLOW bit) within a cell. However, transmission of a flow control bit within a cell for this purpose will typically have greater reliability (e.g., when the cell also includes CRC bits or other error control coding that covers the flow control bit as well as application data within the cell) without compromising (or significantly compromising) available data bandwidth.

Another application-specific protocol is out-of-band signaling. Applications typically incorporate a control/command stream and a data stream that are logically separate (with one stream having higher priority than the other). Similarly, some application data may be considered out-of-band or otherwise at higher priority than other application data. In accordance with the invention, for each block of application data in a cell, a command bit (e.g., the "OOB" bits described with reference to FIG. 2) is included within the cell to indicate the priority level of the data (e.g., to indicate whether the data are in-band or out-of-band), or simply to create a different logical channel (all having the same priority level) for each block of application data. The granularity of the application data within each cell (e.g., the number of separate blocks of the application data) is chosen based on expected demands. The priority-level-indicating bit is exposed to application layer circuitry in the endpoint that receives the cell, to allow the application layer circuitry to determine the priority level of each block of application data in the cell.

For example, in an implementation of the FIG. 1 system, circuitry 30 of transmitter 10 provides (to packetizing circuit 31) control data (generated by application layer circuitry within circuitry 30) that determine the priority level of each block of application data to be included in each cell to be transmitted over channel 51. In response to such control data, circuit 31 includes in the cell an OOB bit for each block of application data. After transmission of the cell, circuit 45 in receiver 20 asserts to circuitry 40 not only the application data, but also at least one control signal indicative of the value of each OOB bit. Application layer circuitry within circuitry 40 responds to the control signal(s) by determining the priority level for the relevant block of application data.

Inclusion in a cell of one binary priority-level-indicating bit for each block of application data in the cell implements two priority levels for the data. At least one additional binary priority-level-indicating bit for each block of application data would allow the application data to be categorized into more than two priority levels. A transmitter that embodies the invention can be implemented to transmit higher priority traffic before lower priority traffic, and a receiver that embodies the invention can be implemented to pass or process higher priority traffic before lower priority traffic. This is important because it is often necessary to enable control traffic to pass data traffic to avoid deadlocks, enable command pipelining, and efficiently utilize link bandwidth.

In a class of embodiments, the invention is a method of encoding data, including the steps of generating M-bit input words, where the input words are indicative of application data and control bits; and encoding the input words in accordance with a block code to generate a code word sequence of N-bit code words, wherein N>M, the code word sequence is indicative of at least one cell of the input words, the cell includes at least some of the application data and at least two of the control bits, and said at least two of the control bits have multiple levels of communication protocol functionality. In some such embodiments, the block code is specified by a line code, the line code also specifies special characters, and the method also includes the step of generating encoded data such that the encoded data are a sequence of at least one of the special characters and the code words of the code word sequence. Preferably, each cell has a predetermined structure such that the position of a bit within the cell determines whether the bit is an application data bit or a control bit, and the position of each control bit within the cell determines a function of said control bit. In preferred embodiments, N=M+1.

In some embodiments of the inventive system, the serial link between two endpoints includes a single simplex (or half duplex) channel, or a single duplex channel (e.g., a pair of simplex channels which are used as a single bidirectional link). However, in other embodiments of the inventive system, the serial link between two endpoints includes any number of channels. For example, if one endpoint includes N transmitters (which work together) and the other endpoint includes M receivers (which work together), the serial link between the endpoints can include a channel between each transmitter-receiver pair (e.g., the serial link can include six channels, when N=2 and M=3). If one endpoint has N transmitters and the other endpoint has M receivers (and N is not equal to M), then either all N transmitters or all M receivers cannot be connected simultaneously to the other endpoint. In some embodiments, one endpoint has N transmitters and M receivers. In some embodiments, one endpoint has N transmitters and the other endpoint has M transmitters. As a more specific example, the serial link of an embodiment of the inventive system could have groups of one downstream and three upstream channels together in a DRAM architecture (e.g., one write/command channel for transmitting encoded data to a DRAM and three read channels for receiving encoded data from the DRAM).

It should be appreciated that in a class of embodiments the invention provides a reliable link embedded within a line code, in the sense that it allows physical and link layer circuitry to provide the abstraction of a communication channel that provides sequenced, reliable delivery of application data streams. For example, a system that implements an embodiment in this class can employ a lossy serial interface, rather than a standard parallel interface that is assumed to be 100% reliable, to provide the reliable link. Error detection functionality and re-transmission at the physical and link layer can be efficiently incorporated within the line code to allow a system implementing the invention to be assumed to be 100% reliable. To facilitate the creation of command/response protocols on top of the reliable link, the line code can implement virtual channels (e.g., using OOB bits indicative of the virtual channels) in accordance with the invention to distinguish commands from data, and can also implement flow control in accordance with the invention. If NB/(N+1)B block coding is employed, all this enhanced functionality can be fully encapsulated within the physical and link layer with no more overhead than that of typical conventional line codes (e.g., conventional line codes using a conventional 8B/10B block code).

The term "includes" as used in the claims denotes "consists of or includes."

It should be understood that while certain forms of the present invention are illustrated and described herein, the invention is defined by the claims and is not to be limited to the specific embodiments described and shown.

What is claimed is:

1. A communication system, including:
a first endpoint;
a second endpoint, including physical and link layer circuitry and higher level circuitry coupled to the physical and link layer circuitry; and
a serial link between the first endpoint and the second endpoint, wherein the first endpoint is configured to generate encoded data in accordance with a line code, and to transmit the encoded data over the link to the second endpoint, and
wherein the physical and link layer circuitry of the second endpoint is coupled to the link and configured to decode the encoded data to recover application data and control bits, to perform at least one link level function in response to at least one of the control bits, and to assert at least one control signal indicative of at least another one of the control bits to the higher level circuitry, and wherein the higher level circuitry is configured to perform at least one higher level function in response to the at least one control signal.

2. The system of claim 1, wherein the line code specifies a block code and special characters, the first endpoint is configured to encode M-bit input words in accordance with the block code to generate a code word sequence of N-bit code words, where N>M, the code word sequence is indicative of at least one cell of the input words, and the encoded data are a sequence of at least one of the special characters and the code words of the code word sequence.

3. The system of claim 2, wherein the physical and link layer circuitry is configured to distinguish each of the special characters of the encoded data from each bit sequence of the code word sequence.

4. The system of claim 2, wherein said at least one of the special characters is a link training character, and the physical and link layer circuitry is configured to perform physical level framing and link level framing in response to the link training character.

5. The system of claim 2, wherein said at least one of the special characters is a state exchange character.

6. The system of claim 2, wherein said at least one of the special characters is an idle character.

7. The system of claim 6, wherein the physical and link layer circuitry is configured to perform simplex link flow control by inserting idle characters between subsequences of the code word sequence, where each of the subsequences is indicative of a different cell of the input words.

8. The system of claim 2, wherein said at least one of the special characters is a flow control character.

9. The system of claim 2, wherein the input words of each said cell are indicative of application data and control bits, and the control bits have multiple levels of communication protocol functionality.

10. The system of claim 9, wherein each of the input words is indicative of at least some of the application data and at least one of the control bits.

11. The system of claim 9, wherein each said cell has a predetermined structure such that position of each bit within the cell determines whether the bit is an application data bit or a control bit, and position of each control bit within the cell determines a function of said control bit.

12. The system of claim 9, wherein each said cell includes at least one block of the application data, and the control bits of each said cell include at least one of a priority-level-indicating bit, and a virtual-channel-identifying bit, for each said block of application data.

13. The system of claim 9, wherein each said cell includes a base portion, the control bits of the cell include an extension-indicating bit in the base portion, the extension-indicating bit has a value indicative of whether the cell also includes an extension, and the physical and link layer circuitry is configured to assert to the higher level circuitry an extension-indicating control signal indicative of the value of the extension-indicating bit.

14. The system of claim 13, wherein at least one said cell also includes an address extension, the value of the extension-indicating bit in said cell indicates that said cell includes the address extension, and the higher level circuitry includes network layer circuitry configured to perform at least one network level function in response to the extension-indicating control signal.

15. The system of claim 9, wherein each of the first endpoint and the second endpoint is a transceiver, the second endpoint is configured to generate additional encoded data in accordance with the line code including by encoding M-bit input words in accordance with the block code to generate a code word sequence of N-bit code words, the code word sequence is indicative of at least one cell of the input words, and the input words of each said cell are indicative of application data and control bits, and wherein the second endpoint is configured to transmit the additional encoded data over the link to the first endpoint, and wherein the first endpoint includes physical and link layer circuitry and higher level circuitry coupled to the physical and link layer circuitry, the physical and link layer circuitry of the first endpoint is coupled to the link and configured to decode the additional encoded data transmitted by the second endpoint to recover application data and control bits therefrom, to perform at least one link level function in response to at least one of the control bits, and to assert at least one control signal indicative of at least another one of the control bits to the higher level circuitry of the first endpoint, and the higher level circuitry of the first endpoint is configured to perform at least one higher level function in response to the at least one control signal.

16. The system of claim 15, wherein the control bits of each said cell include an end-to-end flow control bit, the physical and link layer circuitry of the first endpoint is configured to assert, to the higher level circuitry of the first endpoint, at least one flow control signal indicative of at least one said end-to-end flow control bit recovered by the physical and link layer circuitry of the first endpoint, and the higher level circuitry of the first endpoint includes application layer circuitry configured to perform at least one flow control operation in response to the at least one flow control signal.

17. The system of claim 15, wherein the additional encoded data are a sequence of the code words of the code word sequence and at least one of the special characters specified by the line code, the special characters include at least one link training character, and the physical and link layer circuitry of the first endpoint and the physical and link layer circuitry of the second endpoint are configured to perform physical level and link level framing during a training phase in response to at least one said link training character in the encoded data and at least one said link training character in the additional encoded data.

18. The system of claim 17, wherein the link has at least a first channel and a second channel, the physical and link layer circuitry of the first endpoint is coupled and configured to transmit the encoded data over the first channel to the physical and link layer circuitry of the second endpoint, the physical and link layer circuitry of the second endpoint is coupled and configured to transmit the additional encoded data over the second channel to the physical and link layer circuitry of the first endpoint, the special characters include at least one state exchange character indicative of a received cell sequence number, the physical and link layer circuitry of the first endpoint is configured to resume transmission of the encoded data over the first channel after the training phase by transmitting a sequence of the code words indicative of a cell whose sequence number is determined by the received cell sequence number indicated by at least one said state exchange character received from the second endpoint during the training phase, and the physical and link layer circuitry of the second endpoint is configured to resume transmission of the additional encoded data over the second channel after the training phase by transmitting a sequence of the code words indicative of a cell whose sequence number is determined by the received cell sequence number indicated by at least one said state exchange character received from the first endpoint during the training phase.

19. The system of claim 15, wherein the link has at least a first channel and a second channel, the physical and link layer circuitry of the first endpoint is coupled and configured to transmit the encoded data over the first channel to the physical and link layer circuitry of the second endpoint, and the physical and link layer circuitry of the second endpoint is coupled and configured to transmit the additional encoded data over the second channel to the physical and link layer circuitry of the first endpoint, and the special characters include an idle character, and wherein the physical and link layer circuitry of the first endpoint and the physical and link layer circuitry of the second endpoint are configured to perform duplex link flow control in which the physical and link layer circuitry of the first endpoint inserts idle characters between subsequences of the code word sequence of the encoded data and the physical and link layer circuitry of the second endpoint inserts idle characters between subsequences of the code word sequence of the additional encoded data, where each of the subsequences is indicative of a different cell of the input words.

20. The system of claim 15, wherein the link has at least a first channel and a second channel, the physical and link layer circuitry of the first endpoint is coupled and configured to transmit the encoded data over the first channel to the physical and link layer circuitry of the second endpoint, and the physical and link layer circuitry of the second endpoint is coupled and configured to transmit the additional encoded data over the second channel to the physical and link layer circuitry of the first endpoint, wherein at least one of the control bits is a data-validity indicating bit, each said cell is indicative of at least one said data-validity indicating bit, and the physical and link layer circuitry of the first endpoint is configured to cause each cell of the encoded data to include at least one said data-validity indicating bit indicating that the cell includes no valid application data and the physical and link layer circuitry of the second endpoint is configured to cause each cell of the additional encoded data to include at least one said data-indicating bit indicating that the cell includes no valid application data, at times sufficient to accomplish duplex link flow control.

21. The system of claim 9, wherein the control bits of each said cell include error control bits, and the physical and link layer circuitry of the second endpoint is configured to perform at least one of error detection and error correction, on the application data and at least some of the control bits recovered from the encoded data, using the error control bits.

22. The system of claim 2, wherein N=M+1.

23. A communication system, including:
a first endpoint;
a second endpoint; and
a serial link between the first endpoint and the second endpoint, wherein the first endpoint is configured to encode M-bit input words in accordance with a block code to generate a code word sequence of N-bit code words, where N>M, the code word sequence is indicative of at least one cell of the input words, the input words of each said cell are indicative of application data and control bits, the control bits have multiple levels of communication protocol functionality, and the first endpoint is configured to transmit encoded data including the code words of the code word sequence over the link to the second endpoint.

24. The system of claim 23, wherein each of the input words is indicative of at least some of the application data and at least one of the control bits.

25. The system of claim 23, wherein the block code is specified by a line code that also specifies special characters, the encoded data are a sequence of at least one of the special characters and the code words of the code word sequence, and none of the special characters of the encoded data matches a bit sequence of the code word sequence.

26. The system of claim 25, wherein said at least one of the special characters is a link training character.

27. The system of claim 25, wherein said at least one of the special characters is a state exchange character.

28. The system of claim 25, wherein said at least one of the special characters is an idle character.

29. The system of claim 25, wherein said at least one of the special characters is a flow control character.

30. The system of claim 25, wherein the link has at least a first channel and a second channel, the first endpoint includes physical and link layer circuitry coupled and configured to transmit the encoded data over the first channel to the second endpoint, the second endpoint includes physical and link layer circuitry coupled and configured to transmit additional encoded data over the second channel to the physical and link layer circuitry of the first endpoint, the additional encoded data include N-bit code words of a second code word sequence, and at least one of the special characters is an idle character, and the physical and link layer circuitry of the first endpoint and the physical and link layer circuitry of the second endpoint are configured to perform duplex link flow control in which the physical and link layer circuitry of the first endpoint inserts idle characters between code words of the encoded data and the physical and link layer circuitry of the second endpoint inserts idle characters between code words of the additional encoded data.

31. The system of claim 23, wherein each of the first endpoint and the second endpoint is a transceiver, and the second endpoint is configured to generate additional encoded data in response to input words in accordance with the line code and to transmit the encoded data over the link to the first endpoint.

32. The system of claim 23, wherein the cell has a predetermined structure such that the position of a bit within the cell determines whether the bit is an application data bit or a control bit, and the position of each control bit within the cell determines a function of said control bit.

33. The system of claim 23, wherein N=M+1.

34. The system of claim 23, wherein each said cell includes at least one block of the application data, and the control bits of each said cell include at least one of a priority-level-indicating bit, and a virtual-channel-identifying bit, for each said block of application data.

35. The system of claim 23, wherein each said cell includes a base portion, the control bits of the cell include an extension-indicating bit in the base portion, the extension-indicating bit has a value indicative of whether the cell also includes an extension, the second endpoint includes physical and link layer circuitry coupled to the link and higher level circuitry coupled to the physical and link layer circuitry, and the physical and link layer circuitry is configured to identify each extension-indicating bit indicated by the encoded data and assert to the higher level circuitry an extension-indicating control signal indicative of the value of each said extension-indicating bit.

36. The system of claim 23, wherein at least one said cell also includes an address extension, the value of the extension-indicating bit in said cell indicates that said cell includes the address extension, and the higher level circuitry of the second endpoint includes network layer circuitry configured to perform at least one network level function in response to the extension-indicating control signal.

37. The system of claim 23, wherein each of the first endpoint and the second endpoint is a transceiver, the second endpoint is configured to generate additional encoded data in accordance with the line code including by encoding M-bit input words in accordance with the block code to generate a code word sequence of N-bit code words, the code word sequence is indicative of at least one cell of the input words, and the input words of each said cell are indicative of application data and control bits, and wherein the second endpoint is configured to transmit the additional encoded data over the link to the first endpoint, and wherein the first endpoint includes physical and link layer circuitry and higher level circuitry coupled to the physical and link layer circuitry, the physical and link layer circuitry of the first endpoint is coupled to the link and configured to decode the additional encoded data transmitted by the second endpoint to recover application data and control bits therefrom, to perform at least one link level function in response to at least one of the control bits, and to assert at least one control signal indicative of at least another one of the control bits to the higher level circuitry of the first endpoint, and the higher level circuitry of the first endpoint is configured to perform at least one higher level function in response to the at least one control signal.

38. The system of claim 37, wherein the control bits of each said cell include an end-to-end flow control bit, the physical and link layer circuitry of the first endpoint is configured to assert, to the higher level circuitry of the first endpoint, at least one flow control signal indicative of at least one said end-to-end flow control bit recovered by the physical and link layer circuitry of the first endpoint, and the higher level circuitry of the first endpoint includes application layer circuitry configured to perform at least one flow control operation in response to the at least one flow control signal.

39. The system of claim 23, wherein the link has at least a first channel and a second channel, the first endpoint includes physical and link layer circuitry coupled and configured to transmit the encoded data over the first channel, the second endpoint includes physical and link layer circuitry coupled and configured to transmit additional encoded data over the second channel to the physical and link layer circuitry of the first endpoint, the additional encoded data include N-bit code words of a second code word sequence, the second code word sequence is indicative of at least one cell of M-bit input words, at least one of the control bits is a data-validity indicating bit, each said cell is indicative of at least one said data-validity indicating bit, and the physical and link layer circuitry of the first endpoint is configured to cause each cell of the encoded data to include at least one said data-validity indicating bit indicating that the cell includes no valid application data and the physical and link layer circuitry of the second endpoint is configured to cause each cell of the additional encoded data to include at least one said data-validity indicating bit indicating that the cell includes no valid application data, at times sufficient to accomplish duplex link flow control.

40. The system of claim 23, wherein the control bits of each said cell include error control bits, the second endpoint includes physical and link layer circuitry coupled to the link and higher level circuitry coupled to the physical and link layer circuitry, and the physical and link layer circuitry is configured is configured to perform at least one of error detection and error correction, on the application data and at least some of the control bits recovered from the encoded data, using the error control bits.

41. A communication system, including:
a first endpoint;
a second endpoint; and
a serial link between the first endpoint and the second endpoint, wherein the first endpoint is configured to generate encoded data, including by encoding M-bit input words in accordance with a block code to generate a code word sequence of N-bit code words, wherein N>M, the input words are indicative of application data and control bits, the code word sequence is indicative of at least one cell of the input words, the cell includes at least one block of the application data and at least one of the control bits, the block code is specified by a line code that also specifies special characters, the encoded data are a sequence of at least one of the special characters and the code words of the code word sequence, and the first endpoint is configured to transmit the encoded data over the link to the second endpoint, wherein the control bits indicated by the encoded data, with said at least one of the special characters of the encoded data, have multiple levels of communication protocol functionality.

42. The system of claim 41, wherein none of the special characters of the encoded data matches a bit sequence of the code word sequence.

43. The system of claim 41, wherein said at least one of the special characters is a link training character.

44. The system of claim 41, wherein said at least one of the special characters is a state exchange character.

45. The system of claim 41, wherein said at least one of the special characters is an idle character.

46. The system of claim 41, wherein said at least one of the special characters is a flow control character.

47. The system of claim 41, wherein each of the first endpoint and the second endpoint is a transceiver, and the second endpoint is configured to generate additional encoded data in response to input words in accordance with the line code and to transmit the additional encoded data over the link to the first endpoint.

48. The system of claim 41, wherein each said cell has a predetermined structure such that the position of a bit within the cell determines whether the bit is an application data bit or a control bit, and the position of each control bit within the cell determines a function of said control bit.

49. The system of claim 41, wherein N=M+1.

50. The system of claim 41, wherein each said cell includes at least one block of the application data, and the control bits of each said cell include at least one of a priority-level-indicating bit, and a virtual-channel-identifying bit, for each said block of application data.

51. The system of claim 41, wherein each of the first endpoint and the second endpoint is a transceiver, the second endpoint is configured to generate additional encoded data in accordance with the line code including by encoding M-bit input words in accordance with the block code to generate a code word sequence of N-bit code words, the input words are indicative of application data and control bits, the code word sequence is indicative of at least one cell of the input words, each said cell includes at least one block of the application data and at least one of the control bits, the additional encoded data are a sequence of the code words of the code word sequence and at least one of the special characters, the second endpoint is configured to transmit the additional encoded data over the link to the first endpoint, the first endpoint includes physical and link layer circuitry and higher level circuitry coupled to the physical and link layer circuitry, and the physical and link layer circuitry of the first endpoint is coupled to the link and configured to decode the additional encoded data transmitted by the second endpoint to recover application data and control bits therefrom, and the second endpoint includes physical and link layer circuitry and higher level circuitry coupled to the physical and link layer circuitry, and the physical and link layer circuitry of the second endpoint is coupled to the link and configured to decode the encoded data transmitted by the first endpoint to recover application data and control bits therefrom, wherein the special characters include at least one link training character, and the physical and link layer circuitry of the first endpoint and the physical and link layer circuitry of the second endpoint are configured to perform physical level and link level framing during a training phase in response to at least one said link training character in the encoded data and at least one said link training character in the additional encoded data.

52. The system of claim 51, wherein the link has at least a first channel and a second channel, the physical and link layer circuitry of the first endpoint is coupled and configured to transmit the encoded data over the first channel to the physical and link layer circuitry of the second endpoint, the physical and link layer circuitry of the second endpoint is coupled and configured to transmit the additional encoded data over the second channel to the physical and link layer circuitry of the first endpoint, the special characters include at least one state exchange character indicative of a received cell sequence number, the physical and link layer circuitry of the first endpoint is configured to resume transmission of the encoded data over the first channel after the training phase by transmitting a sequence of the code words indicative of a cell whose sequence number is determined by the received cell sequence number indicated by at least one said state exchange character received from the second endpoint during the training phase, and the physical and link layer circuitry of the second endpoint is configured to resume transmission of the additional encoded data over the second channel after the training phase by transmitting a sequence of the code words indicative of a cell whose sequence number is determined by the received cell sequence number indicated by at least one said state exchange character received from the first endpoint during the training phase.

53. A receiver for receiving encoded data that have propagated over a serial link, the encoded data having been generated in accordance with a line code, said receiver including:

physical and link layer circuitry, coupled and configured to receive and decode the encoded data to recover application data and control bits, to perform at least one link level function in response to at least one of the control bits; and higher level circuitry coupled to the physical and link layer circuitry, wherein the physical and link layer circuitry is coupled and configured to assert at least one control signal indicative of at least another one of the control bits to the higher level circuitry, and the higher level circuitry is configured to perform at least one higher level function in response to the at least one control signal.

54. The receiver of claim 53, wherein the line code specifies a block code and special characters, the encoded data are a sequence of at least one of the special characters and N-bit code words of a code word sequence, where each of the code words has been generated by encoding an M-bit input word in accordance with the block code, wherein N>M, the code word sequence is indicative of at least one cell of the input words, and the physical and link layer circuitry is configured to distinguish each of the special characters of the encoded data from each bit sequence of the code word sequence.

55. The receiver of claim 54, wherein each said cell includes a base portion, the control bits of the cell include an extension-indicating bit in the base portion, the extension-indicating bit has a value indicative of whether the cell also includes an extension, and the physical and link layer circuitry is configured to assert to the higher level circuitry an extension-indicating control signal indicative of the value of the extension-indicating bit.

56. The receiver of claim 55, wherein at least one said cell also includes an address extension, the value of the extension-indicating bit in said cell indicates that said cell includes the address extension, and the higher level circuitry includes network layer circuitry configured to perform at least one network level function in response to the extension-indicating control signal.

57. The receiver of claim 54, wherein the control bits of each said cell include an end-to-end flow control bit, the physical and link layer circuitry is configured to assert to the higher level circuitry at least one flow control signal indicative of at least one said end-to-end flow control bit recovered by the physical and link layer circuitry, and the higher level circuitry includes application layer circuitry configured to perform at least one flow control operation in response to the at least one flow control signal.

58. The receiver of claim 54, wherein the special characters include at least one link training character, and the physical and link layer circuitry is configured to perform physical level and link level framing during a training phase in response to at least one said link training character in the encoded data.

59. The receiver of claim 54, wherein the control bits of each said cell include error control bits, and the physical and link layer circuitry is configured to perform at least one of error detection and error correction, on the application data and at least some of the control bits recovered from the encoded data, using the error control bits.

60. The receiver of claim 54, wherein the special characters include at least one flow control character.

61. The receiver of claim 53, wherein the receiver is a transceiver, the transceiver is configured to generate additional encoded data in accordance with the line code including by encoding M-bit input words in accordance with a block code to generate a code word sequence of N-bit code words, where N>M, the code word sequence is indicative of at least one cell of the input words, the input words are indicative of application data and control bits, each said cell includes at least one block of the application data and at least one of the control bits, and the transceiver is configured to transmit the additional encoded data over the link, wherein the line code also specifies special characters, the additional encoded data are a sequence of at least one of the special characters and the code words of the code word sequence.

62. The receiver of claim 61, wherein said at least one of the special characters is an idle character, and the physical and link layer circuitry is configured to perform link flow control by inserting idle characters between subsequences of the code word sequence of the additional encoded data, where each of the subsequences is indicative of a different cell of the input words.

63. The receiver of claim 61, wherein each cell of the code word sequence of the additional encoded data has a predetermined structure such that position of each bit within the cell determines whether the bit is an application data bit or a control bit, and position of each control bit within the cell determines a function of said control bit.

64. The receiver of claim 61, wherein each cell of the code word sequence of the additional encoded data includes at least one block of the application data, and the control bits of each said cell include at least one of a priority-level-indicating bit, and a virtual-channel-identifying bit, for each said block of application data.

65. The receiver of claim 61, wherein the special characters include at least one link training character, the physical and link layer circuitry is configured to cease transmission of the additional encoded data and enter a training phase in response to at least one said link training character in the encoded data, and the physical and link layer circuitry is configured to perform physical level and link level framing during the training phase.

66. The receiver of claim 65, wherein the special characters include at least one state exchange character indicative of a received cell sequence number, and the physical and link layer circuitry is configured to resume transmission of the additional encoded data over the first channel after the training phase by transmitting a sequence of the code words indicative of a cell whose sequence number is determined by the received cell sequence number indicated by at least one said state exchange character received over the link during the training phase.

67. The receiver of claim 65, wherein the physical and link layer circuitry is configured to resume transmission of the additional encoded data over the first channel after the training phase by transmitting a sequence of the code words indicative of a cell whose sequence number is determined by a cell sequence number indicated by data received over the link during the training phase.

68. A transmitter including physical and link layer circuitry, wherein the physical and link layer circuitry include:
   packetizing circuitry configured to generate M-bit input words, wherein the input words are indicative of application data and control bits; and
   encoding and transmission circuitry coupled to the packetizing circuitry and configured to encode the input words in accordance with a block code to generate a code word sequence of N-bit code words, where N>M, the code word sequence is indicative of at least one cell of the input words, the cell includes at least two of the control bits, and said at least two of the control bits have multiple levels of communication protocol functionality, wherein the encoding and transmission circuitry is configured to be coupled to a serial link and to transmit encoded data over the serial link, said encoded data including the code words of the code word sequence.

69. The transmitter of claim 68, wherein each of the input words is indicative of at least some of the application data and at least one of the control bits.

70. The transmitter of claim 68, wherein the block code is specified by a line code, the line code also specifies special characters, and the encoding and transmission circuitry is configured to generate the encoded data such that said encoded data are a sequence of at least one of the special characters and the code words of the code word sequence.

71. The transmitter of claim 70, wherein none of the special characters of the encoded data matches a bit sequence of the code word sequence.

72. The transmitter of claim 70, wherein said at least one of the special characters is a link training character.

73. The transmitter of claim 70, wherein said at least one of the special characters is a state exchange character.

74. The transmitter of claim 70, wherein said at least one of the special characters is an idle character.

75. The transmitter of claim 70, wherein said at least one of the special characters is a flow control character.

76. The transmitter of claim 68, wherein the cell has a predetermined structure such that the position of a bit within the cell determines whether the bit is an application data bit or a control bit, and the position of each control bit within the cell determines a function of said control bit.

77. The transmitter of claim 68, wherein N=M+1.

78. The transmitter of claim 68, wherein at least one of the control bits of each said cell includes at least one block of the application data, and the control bits of each said cell include at least one of a priority-level-indicating bit, and a virtual-channel-identifying bit, for each said block of application data.

79. The transmitter of claim 68, wherein each said cell includes a base portion, the control bits of the cell include an extension-indicating bit in the base portion, the extension-indicating bit has a value indicative of whether the cell also includes an extension.

80. The transmitter of claim 79, wherein at least one said cell also includes an address extension, and the value of the extension-indicating bit in said cell indicates that said cell includes the address extension.

81. The transmitter of claim 68, wherein the control bits of each said cell include an end-to-end flow control bit.

82. The transmitter of claim 68, wherein the control bits of each said cell include error control bits.

83. The transmitter of claim 68, wherein the transmitter is a transceiver and the transmitter also includes:
   higher level circuitry coupled to the physical and link layer circuitry, and wherein the physical and link layer circuitry also includes:
   receiving and decoding circuitry configured to be coupled to the serial link and configured to receive and decode additional encoded data that have been generated in accordance with the line code and propagated over the serial link, thereby recovering application data and control bits from the additional encoded data, wherein the receiving and decoding circuitry is coupled and configured to perform at least one link level function in response to at least one of the control bits recovered from the additional encoded data, and to assert at least one control signal indicative of at least another one of the control bits recovered from the additional encoded data to the higher level circuitry, wherein the higher level circuitry is configured to perform at least one higher level function in response to the at least one control signal.

84. A method of encoding data, including the steps of:
   generating M-bit input words, wherein the input words are indicative of application data and control bits; and
   encoding the input words in accordance with a block code to generate a code word sequence of N-bit code words, wherein N>M, the code word sequence is indicative of at least one cell of the input words, the cell includes at least some of the application data and at least two of the control bits, and said at least two of the control bits have multiple levels of communication protocol functionality.

85. The method of claim 84, wherein the block code is specified by a line code, the line code also specifies special characters, said method also including the step of:
   generating encoded data such that the encoded data are a sequence of at least one of the special characters and the code words of the code word sequence.

86. The method of claim 85, wherein none of the special characters of the encoded data matches a bit sequence of the code word sequence.

87. The method of claim 85, wherein said at least one of the special characters is a link training character.

88. The method of claim 85, wherein said at least one of the special characters is a state exchange character.

89. The method of claim 85, wherein said at least one of the special characters is an idle character.

90. The method of claim 84, also including the step of transmitting the encoded data over a serial link.

91. The method of claim 84, wherein the cell has a predetermined structure such that the position of a bit within the cell determines whether the bit is an application data bit or a control bit, and the position of each control bit within the cell determines a function of said control bit.

92. The method of claim 84, wherein N=M+1.

93. The method of claim 84, wherein each said cell includes at least one block of the application data, and the control bits of each said cell include at least one of a priority-level-indicating bit, and a virtual-channel-identifying bit, for each said block of application data.

94. The method of claim 84, wherein each said cell includes a base portion, the control bits of the cell include an extension-indicating bit in the base portion, the extension-indicating bit has a value indicative of whether the cell also includes an extension.

95. The method of claim 84, wherein at least one said cell also includes an address extension, and the value of the extension-indicating bit in said cell indicates that said cell includes the address extension.

96. The method of claim 84, wherein the control bits of each said cell include an end-to-end flow control bit.

97. The method of claim 84, wherein the control bits of each said cell include error control bits.

98. The method of claim 84, wherein the code words of each said cell belong to a virtual control channel, each said cell includes at least one block of the application data, and each said block belongs to different virtual data channel.

99. The method of claim 84, wherein the levels of communication protocol functionality include at least one level of communication protocol functionality higher than link level functionality.

100. A method for encoding data, including the steps of:
    generating M-bit input words, wherein the input words are indicative of application data and control bits; and
    encoding the input words in accordance with a block code to generate a code word sequence of N-bit code words, wherein N>M, the code word sequence is indicative of at least one cell of the input words, the cell includes at least some of the application data and at least one of the control bits, and the block code is specified by a line code that also specifies special characters; and
    generating encoded data, such that the encoded data are a sequence of at least one of the special characters and the code words of the code word sequence, wherein the control bits indicated by the encoded data, with said at least one of the special characters of the encoded data, have multiple levels of communication protocol functionality.

101. The method of claim 100, wherein said at least one of the special characters is a link training character.

102. The method of claim 100, wherein said at least one of the special characters is a state exchange character.

103. The method of claim 100, wherein said at least one of the special characters is an idle character.

104. The method of claim 100, wherein said at least one of the special characters is a flow control character.

105. The method of claim 100, wherein the cell has a predetermined structure such that the position of a bit within the cell determines whether the bit is an application data bit or a control bit, and the position of each control bit within the cell determines a function of said control bit.

106. The method of claim 100, wherein N=M+1.

107. The method of claim 100, wherein each said cell includes at least one block of the application data, and the control bits of each said cell include at least one of a priority-level-indicating bit, and a virtual-channel-identifying bit, for each said block of application data.

108. The method of claim 100, wherein the control bits of each said cell include an end-to-end flow control bit.

109. The method of claim 100, wherein the levels of communication protocol functionality include at least one level of communication protocol functionality higher than link level functionality.

* * * * *